(12) United States Patent
Mihara et al.

(10) Patent No.: US 7,177,094 B2
(45) Date of Patent: Feb. 13, 2007

(54) ZOOM LENS, AND ELECTRONIC IMAGING SYSTEM USING THE SAME

(75) Inventors: Shinichi Mihara, Tama (JP); Ayami Imamura, Hachioji (JP)

(73) Assignee: Olympus Corporation, Tokyo (JP)

( * ) Notice: Subject to any disclaimer, the term of this patent is extended or adjusted under 35 U.S.C. 154(b) by 296 days.

(21) Appl. No.: 10/406,497

(22) Filed: Apr. 4, 2003

(65) Prior Publication Data
US 2003/0206352 A1 Nov. 6, 2003

(30) Foreign Application Priority Data
Apr. 5, 2002 (JP) ............................. 2002-103594
May 29, 2002 (JP) ............................. 2002-156209
Jan. 23, 2003 (JP) ............................. 2003-014458

(51) Int. Cl.
*G02B 15/177* (2006.01)
(52) U.S. Cl. ...................... 359/686; 359/689; 359/691; 359/726; 359/727
(58) Field of Classification Search ................ 359/678, 359/679, 684, 686, 689, 694, 708, 726–728, 359/732, 735
See application file for complete search history.

(56) References Cited

U.S. PATENT DOCUMENTS

| | | | | |
|---|---|---|---|---|
| 5,570,229 A | 10/1996 | Kanamori | .................... | 359/431 |
| 5,668,668 A | 9/1997 | Shibayama et al. | ......... | 359/683 |
| 5,914,819 A * | 6/1999 | Kondo et al. | ................ | 359/679 |
| 6,016,228 A | 1/2000 | Uzawa | ........................ | 359/687 |
| 6,075,653 A * | 6/2000 | Narimatsu et al. | .......... | 359/686 |
| 6,088,169 A | 7/2000 | Ohno | .......................... | 359/682 |
| 6,104,432 A | 8/2000 | Nakamura et al. | .......... | 348/360 |
| 6,124,987 A | 9/2000 | Kayanuma et al. | ......... | 359/692 |
| 6,185,048 B1 | 2/2001 | Ishii et al. | .................. | 359/687 |
| 6,204,976 B1 * | 3/2001 | Nagahara | .................... | 359/686 |

(Continued)

FOREIGN PATENT DOCUMENTS

EP    0 906 587    9/2002

(Continued)

OTHER PUBLICATIONS

Shashin Kogyo (Photographic Industry), Mar. 2002, pp. 104-105.

(Continued)

*Primary Examiner*—Scott J. Sugarman
*Assistant Examiner*—Darryl J. Collins
(74) *Attorney, Agent, or Firm*—Kenyon & Kenyon

(57) ABSTRACT

The invention relates to a zoom lens that has high optical performance specifications such as high zoom ratios, wide angles of view, reduced F-numbers and limited aberrations, and enables an optical path to be easily bent. The zoom lens comprises a moving lens group B(G2) that has positive refracting power and moves only toward the object side upon zooming from the wide-angle end to the telephoto end, and a lens group A(G1) remaining fixed during zooming, which is located on the object side of the zoom lens with respect to the moving lens group B and has negative refracting power. The moving lens group B is composed of, in order from its object side, a positive lens element, a positive lens element and a negative lens element, three lens elements in all.

123 Claims, 31 Drawing Sheets

U.S. PATENT DOCUMENTS

| | | |
|---|---|---|
| 6,308,011 B1 | 10/2001 | Wachi et al. .................. 396/72 |
| 6,349,002 B1 | 2/2002 | Shibayama et al. ......... 359/689 |
| 6,414,791 B1 | 7/2002 | Sugawara .................. 359/497 |
| 2001/0017734 A1* | 8/2001 | Ori ............................. 359/687 |
| 2002/0008920 A1 | 1/2002 | Mihara et al. .............. 359/684 |
| 2002/0027721 A1 | 3/2002 | Mihara ....................... 359/686 |
| 2003/0165019 A1* | 9/2003 | Yamamoto .................. 359/683 |
| 2003/0197949 A1* | 10/2003 | Eguchi ....................... 359/680 |
| 2003/0210471 A1* | 11/2003 | Mihara et al. .............. 359/691 |

FOREIGN PATENT DOCUMENTS

| | | |
|---|---|---|
| GB | 1 366 326 | 9/1974 |
| JP | 63-292106 | 11/1988 |
| JP | 03-139607 | 6/1991 |
| JP | 03-158817 | 7/1991 |
| JP | 3203709 | 9/1991 |
| JP | 08-070400 | 3/1996 |
| JP | 08-130702 | 5/1996 |
| JP | 09-211287 | 8/1997 |
| JP | 10-20191 | 1/1998 |
| JP | 11-194274 | 7/1999 |
| JP | 11305312 | 11/1999 |
| JP | 2000-137164 | 5/2000 |
| JP | 200267010 | 9/2000 |
| JP | 2001-021986 | 1/2001 |

OTHER PUBLICATIONS

Patent Abstracts of Japan, JP 2002-014282, Jan. 18, 2002 (Asahi Optical Co Ltd).
Patent Abstracts of Japan, JP 2002-014285, Jan. 18, 2002 (Asahi Optical Co Ltd).
Patent Abstracts of Japan, JP 2001-100100, Apr. 13, 2001 (Cosina Co Ltd).
Patent Abstracts of Japan, JP 2001-318313, Nov. 16, 2001 (Canon Inc).
Patent Abstracts of Japan, JP 2001-337275, Dec. 7, 2001 (Canon Inc).
Patent Abstracts of Japan, JP 08-248318, Sep. 27, 1996 (Sony Corp).
Patent Abstracts of Japan, JP 2000-131610, May 12, 2000 (Sony Corp).
Patent Abstracts of Japan, JP 07-005360, Jan. 10, 1995 (Olympus Optical Co Ltd).

* cited by examiner

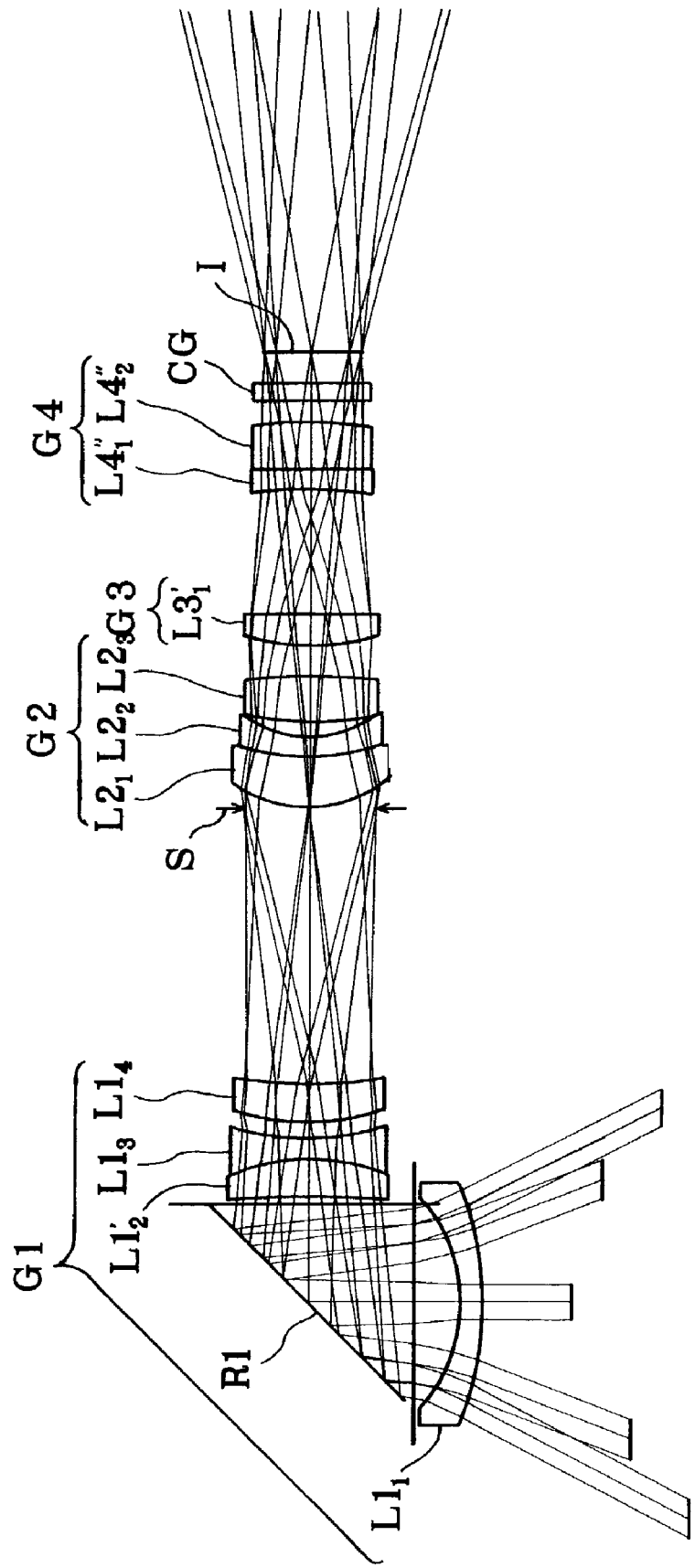

C : Cyan   M : Magenta
Ye : Yellow   G : Green

ZOOM LENS, AND ELECTRONIC IMAGING SYSTEM USING THE SAME

This application claims benefits of Japanese Applications No. 2002-103594 filed in Japan on Apr. 5, 2002, No. 2002-156209 filed in Japan on May 29, 2002 and No. 2003-14458 filed in Japan on Jan. 23, 2003, the contents of which are incorporated herein by this reference.

BACKGROUND OF THE INVENTION

The present invention relates generally to a zoom lens and an electronic imaging system using the same, and more particularly to an electronic imaging system such as a video camera or a digital camera, the depth dimension of which is diminished by providing some contrivances to an optical system portion such as a zoom lens.

In recent years, digital cameras (electronic cameras) have received attention as the coming generation of cameras, an alternative to silver-halide 35 mm-film (usually called Leica format) cameras. Currently available digital cameras are broken down into some categories in a wide range from the high-end type for commercial use to the portable low-end type.

In view of the category of the portable low-end type in particular, the primary object of the present invention is to provide the technology for implementing video or digital cameras whose depth dimension is reduced while high image quality is ensured, and which are easy to handle.

The gravest bottleneck in diminishing the depth dimension of cameras is the thickness of an optical system, especially a zoom lens system from the surface located nearest to its object side to an image pickup plane.

Recent technologies for slimming down cameras rely primarily on a collapsible lens mount that allows the optical system to be taken out of a camera body for phototaking and received therein for carrying now becomes mainstream. Typical examples of an optical system that can effectively be slimmed down while relying on the collapsible lens mount are disclosed in the following patent publications 1, 2 and 3. Each publication discloses an optical system comprising, in order from its object side, a first lens group having negative refracting power and a second lens group having positive refracting power, wherein both lens groups move during zooming. However, the use of the collapsible lens mount is not preferable for the operability of such an optical system because some considerable time is taken to put it from the collapsed to the ready state. An arrangement wherein the lens group located nearest to the object side is movable is not preferable for water- and dust-proofing purposes.

Patent Publication 1
JP-A 11-194274
Patent Publication 2
JP-A 11-287953
Patent Publication 3
JP-A 2000-9997

SUMMARY OF THE INVENTION

In view of such problems with the prior art as mentioned above, the primary object of the present invention is to provide a zoom lens that has high optical performance specifications such as high zoom ratios, wide angles of view, reduced F-numbers and limited aberrations, and an electronic imaging system using the same. The zoom lens of the present invention enables a camera to be immediately put into the ready state unlike a collapsible lens mount camera, makes the camera preferable for water- and dust-proofing purposes, and ensures that the optical path (optical axis) of the optical system can easily be bent by a reflecting optical element such as a mirror.

According to the first aspect of the present invention, this object is achieved by the provision of a zoom lens comprising a moving lens group B that has positive refracting power and moves only toward an object side of the zoom lens upon zooming from a wide-angle end to a telephoto end of the zoom lens and a fixed lens group A that is located on the object side of the zoom lens with respect to the moving lens element B, has negative refracting power, and remains fixed during the zooming, characterized in that:

the moving lens group B consists of, in order from an object side thereof, a positive lens element, a positive lens element and a negative lens element, three lens elements in all.

The second aspect of the present invention provides a zoom lens comprising a moving lens group B that has positive refracting power and moves only toward an object side of the zoom lens upon zooming from a wide-angle end to a telephoto end of the zoom lens and a fixed lens group A that is located on the object side of the zoom lens with respect to the moving lens element B, has negative refracting power, and remains fixed during the zooming, characterized in that:

the moving lens group B consists of, in order from an object side thereof, a positive lens element, a negative lens element and a positive lens element, three lens elements in all.

The third aspect of the present invention provides a zoom lens comprising a moving lens group B that has positive refracting power and moves only toward an object side of the zoom lens upon zooming from a wide-angle end to a telephoto end of the zoom lens and a fixed lens group A that is located on the object side of the zoom lens with respect to the moving lens element B, has negative refracting power, and remains fixed during the zooming, characterized in that:

the zoom lens further comprises a third lens group C that is located on an image side of the moving lens group B with a variable air separation interposed therebetween, wherein the moving lens group B consists of a positive lens element and a negative lens element, two lens elements in all, and the third lens group C consists of, in order from an object side thereof, a positive lens element, a positive lens element and a negative lens element, three lens elements in all.

The fourth aspect of the present invention provides a zoom lens comprising a moving lens group B that has positive refracting power and moves only toward an object side of the zoom lens upon zooming from a wide-angle end to a telephoto end of the zoom lens and a fixed lens group A that is located on the object side of the zoom lens with respect to the moving lens element B, has negative refracting power, and remains fixed during the zooming, characterized in that:

the zoom lens further comprises a third lens group C that is located on an image side of the moving lens group B with a variable air separation interposed therebetween, wherein the moving lens group B consists of a positive lens element and a negative lens element, two lens elements in all, and the third lens group C consists of, in order from an object side thereof, a positive lens element, a negative lens element and a positive lens element, three lens elements in all.

According to the fifth aspect of the present invention, the aforesaid object is achieved by the provision of a zoom lens comprising, in order from an object side of the zoom lens, a first lens group that has negative refracting power, includes a reflecting optical element for bending an optical path, and remains fixed during zooming, a second lens group that has positive refracting power and moves only toward the object side of the zoom lens upon zooming from a wide-angle end to a telephoto end of the zoom lens, a third lens group that moves in a locus different from that of the second lens group during the zooming, and a fourth lens group having an aspheric surface, characterized in that:

two lens groups defined by the second lens group and the third lens group are composed of up to three lens components in all, including one or more doublet components, and the zoom lens satisfies the following condition (41):

$$1.0 < -\beta_{Rt} < 2.6 \tag{41}$$

where $\beta_{Rt}$ is the composite magnification at the telephoto end of the second and subsequent lens group or groups upon focused on an object point at infinity.

The sixth aspect of the present invention provides a zoom lens, characterized by comprising, in order from an object side of the zoom lens, a first lens group that has negative refracting power, includes a reflecting optical element for bending an optical path, and remains fixed during zooming, a second lens group that has positive refracting power and moves only toward the object side of the zoom lens upon zooming from a wide-angle end to a telephoto end of the zoom lens, a third lens group that moves in a locus different from that of the second lens group during the zooming, and a fourth lens group having an aspheric surface, wherein:

the first lens group is composed of, in order from an object side thereof, a front subgroup having a negative lens element convex on its object side, a reflecting optical element for bending the optical path and a rear subgroup having negative refracting power, and the zoom lens satisfies the following conditions (47) and (48):

$$0.5 < (F_{11F} + R_{11R})/(R_{11F} - R_{11R}) < 5.0 \tag{47}$$

$$0 < f_{11}/f_{12} < 1.2 \tag{48}$$

where $R_{11F}$ is the axial radius of curvature of an object side-surface of the negative lens element in the front subgroup in the first lens group, $R_{11R}$ is the axial radius of curvature of an image side-surface of the negative lens element in the front subgroup in the first lens group, $f_{11}$ is the focal length of the front subgroup in the first lens group, and $f_{12}$ is the focal length of the rear subgroup in the first lens group.

The seventh aspect of the present invention provides an electronic imaging system, characterized by comprising a zoom lens as recited in the sixth aspect of the present invention, and an electronic image pickup device located on an image side of the zoom lens.

The eighth aspect of the present invention provides an electronic imaging system, characterized by comprising, a zoom lens as recited in the fifth aspect of the present invention, wherein the first lens group is composed of, in order from an object side thereof, a front subgroup having a negative lens element convex on its object side, a reflecting optical element for bending the optical path and a rear subgroup having negative refracting power, and the zoom lens satisfies the following conditions (43) and (44), and an electronic image pickup device located on an image side of the zoom lens:

$$0 < L/R_{21C} < 1.4 \tag{43}$$

$$15 < \nu_{21F} - \nu_{21R} \tag{44}$$

where L is the diagonal length of an effective image pickup area of the electronic image pickup device, $R_{21C}$ is the axial radius of curvature of a cementing surface in the second lens group, $\nu_{21F}$ is the d-line based Abbe number of an object side-lens medium of the cementing surface in the second lens group, and $\nu_{21R}$ is the d-line based Abbe number of an image side-lens medium of the cementing surface in the second lens group.

The ninth aspect of the present invention provides an electronic imaging system, characterized by comprising, a zoom lens as recited in the second or fourth aspect of the present invention, wherein the front subgroup is composed of a negative lens element including one aspheric surface and the rear subgroup is composed of two lens components whose refracting powers have opposite signs, and the zoom lens satisfies the following condition (49), and an electronic image pickup device located on an image side of the zoom lens:

$$0.4 < (R_{12R}/R_{13F})^P < 1.6 \tag{49}$$

where $R_{12R}$ is the axial radius of curvature of an object side-surface of an air lens defined between the two lens components in the rear subgroup in the first lens group, $R_{13F}$ is the axial radius of curvature of an image side-surface of the air lens defined between the two lens components in the rear subgroup in the first lens group, and P is P=1 in the case where the negative lens component and the positive lens component are located in this order as viewed from an object side of the rear subgroup, and P=−1 in the case wherein the positive lens component and the negative lens component are located in this order as viewed from the object side of the rear subgroup.

Why the aforesaid arrangements are used for the 1st to 4th zoom lenses of the present invention, and how they work is now explained.

The zoom lens of the present invention is constructed of a moving lens group B that has positive refracting power and moves only toward the object side of the zoom lens upon zooming from the wide-angle end to the telephoto end of the zoom lens, and a fixed lens group A that is located on the object side of the zoom lens with respect to the moving lens group G, has negative refracting power and remains fixed during zooming.

By adoption of the optical systems having the following constructional features in particular, high optical performance specifications are ensured even when the first lens group is designed to remain fixed.

a) The lens group B is composed of, in order from its object side, two positive lens elements and one negative lens element.

b) The lens group B is composed of, in order from its object side, a positive lens element, a negative lens element and a positive lens element.

c) The zoom lens further comprises a lens group C located adjacent to the image side of the lens group B, wherein the lens group B is composed of one positive lens element and one negative lens element and the lens group C is composed of, in order from its object side, two positive lens elements and one negative lens element.

d) The zoom lens further comprises a lens group C located adjacent to the image side of the lens group B, wherein the lens group B is composed of one positive lens element and one negative lens element and the lens group C is composed of, in order from its object side, a positive lens element, a negative lens element and a positive lens element.

It is acceptable that an additional lens group or groups may be interposed between the moving lens group B and the fixed-during-zooming lens group A. To make the length of the zoom lens short, it is more preferable to sandwich an air separation between the moving lens group B and the fixed-during-zooming lens group A. It is more preferable to locate the fixed-during-zooming lens group A nearest to the object side of the zoom lens because any increase in the size of the entrance surface of the zoom lens can be avoided.

Each zoom lens should preferably satisfy the following conditions (1), (2) and (3) with respect to the lens groups A and B.

$$0.9 < -f_A/\sqrt{(f_W \cdot f_T)} < 2.0 \quad (1)$$

$$1.0 < f_B/\sqrt{(f_W \cdot f_T)} < 3.0 \quad (2)$$

$$0.9 < \log \gamma_B/\log \gamma < 10 \quad (3)$$

Here $f_A$ is the focal length of the lens group A, $f_B$ is the focal length of the lens group B, $f_W$ is the focal length of the zoom lens at the wide-angle end, $f_T$ is the focal length of the zoom lens at the telephoto end, $\gamma = f_T/f_W$, and $\gamma_B$ is the ratio of the magnification of the lens group B at the telephoto end/the magnification of the lens group B at the wide-angle end.

Condition (1) is provided to define the proper focal length range for the lens group A. As the upper limit of 2.0 to this condition is exceeded, it is difficult to ensure any satisfactory zooming ratio, and as the lower limit of 0.9 is not reached, it is difficult to make correction for off-axis aberrations such as distortion.

Condition (2) is provided to define the proper focal length range for the lens group B. As the lower limit of 3.0 to this condition is exceeded, the optical system becomes long, and as the lower limit of 1.0 is not reached, it is difficult to make correction for spherical aberrations and coma.

Condition (3) is provided to define the zoom ratio of the lens group B upon zooming from the wide-angle end to the telephoto end. As the upper limit of 10 to this condition is exceeded, there is an increase in the amount of movement of the lens group B upon zooming, and as the lower limit of 0.9 is not reached, considerable loads are placed on a group or groups having a zooming action other than the lens group B, leading to an increase in the number of lens elements that form the zoom lens.

More preferably, any one or all of the following conditions (1)', (2)' and (3)' should be satisfied:

$$1.0 < -f_A/\sqrt{(f_W \cdot f_T)} < 1.8 \quad (1)'$$

$$1.2 < f_B/\sqrt{(f_W \cdot f_T)} < 2.7 \quad (2)'$$

$$1.0 < \log \gamma_B/\log \gamma < 9 \quad (3)'$$

Even more preferably, any one or all of the following conditions (1)", (2)" and (3)" should be satisfied:

$$1.1 < -f_A/\sqrt{(f_W \cdot f_T)} < 1.6 \quad (1)"$$

$$1.4 < f_B/\sqrt{(f_W \cdot f_T)} < 2.4 \quad (2)"$$

$$1.1 < \log \gamma_B/\log \gamma < 8 \quad (3)"$$

Most preferably, all these conditions (1)", (2)" and (3)" should be satisfied.

More preferably, the aforesaid arrangements a) to d) should be modified as follows.

a) In the lens group B, the negative lens element is cemented to the positive lens element adjacent to its object side to give two lens components consisting of three lens elements.

b) In the lens group B, the negative lens element is cemented to either one of the positive lens elements adjacent thereto to give two lens components consisting of three lens elements.

c) In the lens group C, the negative lens element is cemented to the positive lens element adjacent to its object side to give two lens components consisting of three lens elements.

d) In the lens group C, the negative lens element is cemented to either one of the positive lens elements adjacent thereto to give two lens components consisting of three lens elements.

With each doublet, it is possible to slack the relative decentration sensitivity between the lens elements that form the lens group including that doublet. Further, the aforesaid zoom lens arrangement a) should preferably satisfy the following condition (4) with respect to the lens group B (which condition relates to correction of aberrations and the slacking of decentration sensitivity).

$$0.25 < R_{22R}/R_{22F} < 0.95 \quad (4)$$

Here $R_{22F}$ and $F_{22R}$ are the axial radii of curvature of the surfaces of the image side-lens component in the lens group B, located nearest to the object and image sides thereof, respectively.

Exceeding the upper limit of 0.95 to condition (4) makes the action of cementing on slacking decentration sensitivity slender although it may be favorable for correction of spherical aberrations, coma and astigmatism among aberrations throughout the zoom lens system. As the lower limit of 0.25 is not reached, correction of spherical aberrations, coma and astigmatism among aberrations throughout the zoom lens system tends to become difficult.

More preferably, $$0.30 < R_{22R}/R_{22F} < 0.90 \quad (4)'$$

Most preferably, $$0.33 < R_{22R}/R_{22F} < 0.85 \quad (4)"$$

Furthermore, this zoom lens arrangement should preferably satisfy the following conditions (5) and (6) with respect to correction of chromatic aberrations.

$$-1.0 < L/R_{22C} < 0.8 \quad (5)$$

$$14 < \nu_{22F} - \nu_{22R} \quad (6)$$

Here $R_{22C}$ is the axial radius of curvature of the cementing surface in the image side-lens component in the lens group B, L is the diagonal length in mm of an effective image pickup area of the electronic image pickup device on condition that the electronic image pickup device should be used at an angle of view of 55 or greater at the wide-angle end, and $\nu_{22F}$ and $\nu_{22R}$ are the d-line based Abbe numbers of the media of the positive lens element and the negative lens element, respectively, in the image side-lens component in the lens group B.

Falling short of the lower limit of −1.0 to condition (5) may be favorable for correction of longitudinal chromatic aberration and chromatic aberration of magnification, but this is not preferable because chromatic aberration of spherical aberration is likely to occur. In particular, although spherical aberrations at the reference wavelength may be well corrected, spherical aberrations at short wavelengths remain over-corrected, causing chromatic blurring of images. As the upper limit of 0.8 is exceeded, it is likely that the longitudinal chromatic aberration and chromatic aberration of magnification as well as spherical aberrations at short wavelengths remain under-corrected.

As the lower limit of 14 to condition (6) is not reached, under-correction of longitudinal chromatic aberration is likely to occur. On the other hand, the possible uppermost limit may be 70 at which inexpensive materials are available.

More preferably, the following conditions (5)' and/or (6)' should be satisfied.

$$-0.8 < L/R_{22C} < 0.6 \quad (5)'$$

$$18 < v_{22F} - v_{22R} \quad (6)'$$

Even more preferably, the following conditions (5)" or (6)" should be satisfied.

$$-0.6 < L/R_{22C} < 0.4 \quad (5)''$$

$$22 < v_{22F} - v_{22R} \quad (6)''$$

Most preferably, both conditions (5)" and (6)" should be satisfied.

It is noted that so long as the image side-lens component in the lens group B is composed of a doublet component, a single lens element suffices for the object side-lens component.

Further, it is preferable to satisfy the following conditions (7) and (8). These conditions (7) and (8), for instance, may be subordinate to condition (4).

$$-1.6 < (R_{21F} + R_{21R})/(R_{21F} - R_{21R}) < 1.2 \quad (7)$$

$$-1.2 < L/f_{2R} < 0.1 \quad (8)$$

Here $R_{21F}$ and $R_{21R}$ are the axial radii of curvature of the surfaces nearest to the object side and the image side, respectively, of the object side-lens component in the moving lens group B, L is the diagonal length of an effective image pickup area of the electronic image pickup device, and $f_{2R}$ is the focal length of the image side-lens component in the moving lens group B.

Referring here to correction of aberrations, a divergent beam is incident on the lens group B because the lens group A has negative refracting power. Thus, any deviation from the upper limit of 1.2 and the lower limit of −1.6 to the shape factor condition (7) in the vicinity of the optical axis of the object side-positive lens component makes correction of spherical aberrations difficult even when a plurality of aspheric surfaces are introduced to the object side of the lens group B.

As the lower limit of −1.2 to condition (8) is not reached, an exit pupil position comes close to the image plane leading often to shading, and the decentration sensitivity between the two components in the lens group B tends to become high. As the upper limit of 0.1 is exceeded, it is difficult to ensure a compact zoom lens having high zoom ratios.

More preferably, the following conditions (7)' and/or (8)' should be satisfied.

$$-1.2 < (R_{21F} + R_{21R})/(R_{21F} - R_{21R}) < 0.8 \quad (7)'$$

$$-1.0 < L/f_{2R} < 0.0 \quad (8)'$$

Even more preferably, the following conditions (7)" or (8)" should be satisfied.

$$-0.8 < (R_{21F} + R_{21R})/(R_{21F} - R_{21R}) < 0.5 \quad (7)''$$

$$-0.9 < L/f_{2R} < -0.1 \quad (8)''$$

Most preferably, both conditions (7)" and (8)" should be satisfied.

Alternatively, for another solution to the zoom lens arrangement a), what corresponds to condition (4) may be transformed to condition (9). In this case, it is preferable to satisfy the following conditions (10), (11), (12) and (13) in place of the aforesaid conditions (5), (6), (7) and (8) as will be explained below.

$$0.6 < R_{21R}/R_{21F} < 1.0 \quad (9)$$

Here $R_{21F}$ and $F_{21R}$ are the paraxial radii of curvature of the object side-surface and the image side-surface, respectively, of the object side-lens component in the moving lens group B.

Exceeding the upper limit of 1.0 to condition (9) may be favorable for correction of spherical aberrations, coma and astigmatism among aberrations throughout the zoom lens system, but this makes the effect of cementing on slacking decentration sensitivity slender. As the lower limit of 0.6 is not reached, it is difficult to make correction for spherical aberrations, coma and astigmatism among aberrations throughout the zoom lens system.

More preferably, $$0.65 < R_{21R}/R_{21F} < 0.9 \quad (9)'$$

Most preferably, $$0.7 < R_{21R}/R_{21F} < 0.8 \quad (9)''$$

Further, it is preferable to satisfy conditions (10) and (11) with respect to correction of chromatic aberrations.

$$-1.6 < L/R_{22C} < -0.4 \quad (10)$$

$$20 < v_{22F} - v_{22R} \quad (11)$$

Here $R_{22C}$ is the axial radius of curvature of the cementing surface in the image side-lens component in the lens group B, L is the diagonal length in mm of an effective image pickup area of the electronic image pickup device used on condition that the electronic image pickup device should be used at an angle of view of 55° or greater at the wide-angle end, and $v_{22F}$ and $v_{22R}$ are the d-line based Abbe numbers of the media of the positive lens element and the negative lens element, respectively, in the image side-lens component in the lens group B.

Falling short of the lower limit of −1.6 to condition (10) may be favorable for correction of longitudinal chromatic aberration and chromatic aberration of magnification, but this is not preferable because chromatic aberration of spherical aberration is likely to occur. In particular, although spherical aberrations at the reference wavelength may be well corrected, spherical aberrations at short wavelengths remain over-corrected, causing chromatic blurring of images. As the upper limit of −0.4 is exceeded, it is likely that the longitudinal chromatic aberration and chromatic aberration of magnification as well spherical aberrations at short wavelengths remain under-corrected.

As the lower limit of 20 to condition (11) is not reached, under-correction of longitudinal chromatic aberration is likely to occur. On the other hand, the possible uppermost limit to condition (11) may be 70 at which inexpensive materials are available.

More preferably, the following conditions (10)' and/or (11)' should be satisfied.

$$-1.4 < L/R_{22C} < -0.6 \quad (10)'$$

$$25 < \nu_{22F} - \nu_{22R} \quad (11)'$$

Even more preferably, the following conditions (10)" or (11)" should be satisfied.

$$-1.2 < L/R_{22C} < -0.8 \quad (10)''$$

$$30 < \nu_{22F} - \nu_{22R} \quad (11)''$$

Most preferably, both conditions (10)" and (11)" should be satisfied.

For the zoom lens arrangement a) that satisfies condition (9), it is preferable to satisfy conditions (12) and (13) instead of conditions (7) and (8). These conditions may be subordinate to condition (9).

$$-1.5 < (R_{22F} + R_{22R})/(R_{22F} - R_{22R}) < 0.2 \quad (12)$$

$$0.05 < L/f_{2R} < 0.5 \quad (13)$$

Here $R_{22F}$ and $R_{22R}$ are the axial radii of curvature of the surfaces nearest to the object side and the image side, respectively, of the image side-lens component in the moving lens group B, L is the diagonal length of an effective image pickup area of the electronic image pickup device, and $f_{2R}$ is the focal length of the image side-lens component in the moving lens group B.

Condition (12) is provided to define the shape factor of the image side-lens component in the lens group B. As the lower limit of −1.5 is not reached, it may be easy to make the air separation between the two lens components in the lens group B thin, but it is difficult to make correction for coma and astigmatism. Exceeding the upper limit of 0.2 is not preferable because of the likelihood of mechanical interference between the two lens components. To avoid this, the spacing between both lens components must be widened.

As the lower limit of 0.05 to condition (13) is not reached, the exit pupil position comes close to the image plane leading to the likelihood of shading, and the decentration sensitivity between the two lens components in the lens group B tends to become high. As the upper limit of 0.5 is exceeded, it is difficult to obtain a compact zoom lens having high zoom ratios.

More preferably, the following conditions (12)' and/or (13)' should be satisfied.

$$-1.2 < (R_{22F} + R_{22R})/(R_{22F} - R_{22R}) < -0.2 \quad (12)'$$

$$0.1 < L/f_{2R} < 0.4 \quad (13)'$$

Even more preferably, the following conditions (12)" or (13)" should be satisfied.

$$-1.0 < (R_{22F} + R_{22R})/(R_{22F} - R_{22R}) < -0.6 \quad (12)''$$

$$0.15 < L/f_{2R} < 0.3 \quad (13)''$$

Most preferably, both conditions (12)" and (13)" should be satisfied.

While the zoom lens arrangement a) has been described, it is understood that the zoom lens arrangement c) is achievable by applying what is described in conjunction with the lens group B to the lens group C.

To put it another way, the following condition (4C) is set instead of condition (4).

$$0.25 < R_{32R}/R_{32F} < 0.75 \quad (4C)$$

Here $R_{32F}$ and $R_{32R}$ are the axial radii of curvature of the surfaces nearest to the object side and the image side, respectively, of the image side-lens component in the third lens group C.

The same is valid for conditions (4)' and (4)" subordinate to condition (4).

Instead of conditions (5) and (6), the following conditions (5C) and (6C) are set.

$$-1.0 < L/R_{32C} < 0.6 \quad (5C)$$

$$14 < \nu_{32F} - \nu_{32R} \quad (6C)$$

Here $R_{32C}$ is the axial radius of curvature of the cementing surface in the image side-lens component in the third lens group C, L is the diagonal length in mm of an effective image pickup area of the electronic image pickup device used, and $\nu_{32F}$ and $\nu_{32R}$ are the d-line based Abbe numbers of the media of the positive lens element and the negative lens element, respectively, in the image side-lens component in the third lens group C.

The same is valid for the subordinate conditions (5)', (5)", (6)' and (6)".

Instead of conditions (7) and (8), the following conditions (7C) and (8C) are set.

$$-1.6 < (R_{31F} + R_{31R})/(R_{31F} - R_{31R}) < 0.4 \quad (7C)$$

$$-1.2 < L/f_{3R} < -0.1 \quad (8C)$$

Here $R_{31F}$ and $R_{31R}$ are the axial radii of curvature of the surfaces nearest to the object side and the image side, respectively, of the object side-lens component in the third lens group C, L is the diagonal length of an effective image pickup area of the electronic image pickup device, and $f_{3R}$ is the focal length of the image side-lens component in the third lens group C.

The same is valid for conditions (7C)', (7C)", (8C)' and (8C)" subordinate to condition (7C).

Instead of condition (9), the following condition (9C) is provided.

$$0.6 < R_{31R}/R_{31F} < 1.0 \quad (9C)$$

Here $R_{31F}$ and $F_{31R}$ are the axial radii of curvature of the object side-surface and the image side-surface, respectively, of the object side-lens component in the third lens group C.

The same is valid for conditions (9C)' and (9C)" subordinate to condition (9C).

Instead of conditions (10) and (11), the following conditions (10C) and (11C) are provided.

$$-1.6 < L/R_{32C} < -0.4 \quad (10C)$$

$$20 < \nu_{32F} - \nu_{32R} \quad (11C)$$

Here $R_{32C}$ is the axial radius of curvature of the cementing surface in the image side-lens component in the third lens group C, L is the diagonal length in mm of an effective image pickup area of the electronic image pickup device used, and $\nu_{32F}$ and $\nu_{32R}$ are the d-line based Abbe numbers of the media of the positive lens element and the negative lens element, respectively, in the image side-lens component in the third lens group C.

The same is valid for conditions (10C)', (10C)", (11C)' and (11C)" subordinate to conditions (10C) and (11C).

Instead of conditions (12) and (13), the following conditions (12C) and (13C) are provided.

$$-1.5 < (R_{32F}+R_{32R})/(R_{32F}-R_{32R}) < 0.2 \quad (12C)$$

$$0.05 < L/f_{3R} < 0.5 \quad (13C)$$

Here $R_{32F}$ and $R_{32R}$ are the axial radii of curvature of the surfaces nearest to the object side and the image side, respectively, of the image side-lens component in the third lens group C, L is the diagonal length of an effective image pickup area of the electronic image pickup device, and $f_{3R}$ is the focal length of the image side-lens component in the third lens group C.

The same is valid for conditions (12C)', (12C)", (13C)' and (13C)" subordinate to conditions (12C) and (13C).

For the lens group B in the zoom lens arrangement b), it is then preferable to satisfy the following conditions (14) to (19).

$$0.6 < R_{21R}/R_{21F} < 1.2 \quad (14)$$

Here $R_{21F}$ and $F_{21R}$ are the axial radii of curvature of the surfaces nearest to the object side and the image side, respectively, of the object side-lens component in the moving lens group B.

Exceeding the upper limit of 1.2 to condition (14) may be favorable for correction of spherical aberrations, coma and astigmatism among aberrations throughout the zoom lens system, but this makes the effect of cementing on slacking decentration sensitivity slender. As the lower limit of 0.6 is not reached, it is difficult to make correction for spherical aberrations, coma and astigmatism among aberrations throughout the zoom lens system.

More preferably, $$0.7 < R_{21R}/R_{21F} < 1.1 \quad (14)'$$

Most preferably, $$0.8 < R_{21R}/R_{21F} < 1.0 \quad (14)''$$

Further, it is preferable to satisfy conditions (15) and (16) with respect to correction of chromatic aberrations.

$$0.3 < L/R_{21C} < 1.6 \quad (15)$$

$$10 < v_{21F} - v_{21R} \quad (16)$$

Here $R_{21C}$ is the axial radius of curvature of the cementing surface in the object side-lens component in the moving lens group B, L is the diagonal length in mm of an effective image pickup area of the electronic image pickup device on condition that the electronic image pickup device should be used at an angle of view 55° or greater at the wide-angle end, and $v_{21F}$ and $v_{21R}$ are the d-line based Abbe numbers of the media of the positive lens element and the negative lens element, respectively, in the object side-lens component in the lens group B.

Falling short of the lower limit of 0.3 to condition (15) may be favorable for correction of longitudinal chromatic aberration and chromatic aberration of magnification, but this is not preferable because chromatic aberration of spherical aberration is likely to occur. In particular, although spherical aberrations at the reference wavelength may be well corrected, spherical aberrations at short wavelengths remain over-corrected, causing chromatic blurring of images. As the upper limit of 1.6 is exceeded, it is likely that the longitudinal chromatic aberration and chromatic aberration of magnification as well spherical aberrations at short wavelengths remain under-corrected.

As the lower limit of 10 to condition (16) is not reached, under-correction of longitudinal chromatic aberration is likely to occur. On the other hand, the possible uppermost limit to condition (16) may be 70 at which inexpensive materials are available.

More preferably, the following conditions (15)' and/or (16)' should be satisfied.

$$0.35 < L/R_{21C} < 1.5 \quad (15)'$$

$$15 < v_{21F} - v_{21R} \quad (16)'$$

Even more preferably, the following conditions (15)" or (16)" should be satisfied.

$$0.4 < L/R_{21C} < 1.4 \quad (15)''$$

$$20 < v_{21F} - v_{21R} \quad (16)''$$

Most preferably, both conditions (15)" and (16)" should be satisfied.

For the zoom lens arrangement b) that satisfies condition (14), it is preferable to satisfy conditions (17) and (18) subordinate to condition (14).

$$-5.0 < (R_{22F}+R_{22R})/(R_{22F}-R_{22R}) < 0.7 \quad (17)$$

$$0.1 < L/f_{2R} < 1.0 \quad (18)$$

Here $R_{22F}$ and $R_{22R}$ are the axial radii of curvature of the surfaces nearest to the object side and the image side, respectively, of the image side-lens component in the moving lens group B, L is the diagonal length of an effective image pickup area of the electronic image pickup device, and $f_{2R}$ is the focal length of the image side-lens component in the moving lens group B.

Condition (17) is provided to define the shape factor of the image side-lens component in the lens group B. As the lower limit of −5.0 is not reached, it may be easy to make the air separation between the two lens components in the lens group B thin, but it is difficult to make correction for coma and astigmatism. Exceeding the upper limit of 0.7 is not preferable because of the likelihood of mechanical interference between the two lens components. To avoid this, the spacing between both lens components must be widened.

As the lower limit of 0.1 to condition (18) is not reached, the exit pupil position comes close to the image plane leading to the likelihood of shading, and the decentration sensitivity between the two lens components in the lens group B tends to become high. As the upper limit of 1.0 is exceeded, it is difficult to obtain a compact zoom lens having high zoom ratios.

More preferably, the following conditions (17)' and/or (18)' should be satisfied.

$$-3.5 < (R_{22F}+R_{22R})/(R_{22F}-R_{22R}) < 0.5 \quad (17)'$$

$$0.2 < L/f_{2R} < 0.8 \quad (18)'$$

Even more preferably, the following conditions (17)" or (18)" should be satisfied.

$$-0.7 < (R_{22F}+R_{22R})/(R_{22F}-R_{22R}) < 0.3 \quad (17)''$$

$$0.25 < L/f_{2R} < 0.6 \quad (18)''$$

Most preferably, both conditions (17)" and (18)" should be satisfied.

While the zoom lens arrangement b) has been described, it is understood that the zoom lens arrangement d) is achievable by applying what is described in conjunction with the lens group B to the lens group C.

That is, instead of condition (14) the following condition (14C) is provided.

$$0.6 < R_{31R}/R_{31F} < 1.2 \quad (14C)$$

Here $R_{31F}$ and $F_{31R}$ are the axial radii of curvature of the surfaces nearest to the object side and the image side, respectively, of the object side-lens component in the third lens group C.

The same holds true for conditions (14C)' and (14C)" subordinate to condition (14C).

Instead of conditions (15) and (16), the following conditions (15C) and (16C) are provided.

$$0.3 < L/R_{31C} < 1.6 \quad (15C)$$

$$10 < \nu_{31F} - \nu_{31R} \quad (16C)$$

Here $R_{31C}$ is the axial radius of curvature of the cementing surface in the object side-lens component in the third lens group C, L is the diagonal length in mm of an effective image pickup area of the electronic image pickup device, and $\nu_{31F}$ and $\nu_{31R}$ are the d-line based Abbe numbers of the media of the positive lens element and the negative lens element, respectively, in the object side-lens component in the third lens group C.

The same holds true for conditions (15C)', (15C)", (16C)' and (16C)" subordinate to conditions (15C) and (16C).

Instead of conditions (17) and (18), the following conditions (17C) and (18C) are provided.

$$-5.0 < (R_{32F} + R_{32R})/(R_{32F} - R_{32R}) < 0.7 \quad (17C)$$

$$10 < L/f_{3R} < 1.0 \quad (18C)$$

Here $R_{32F}$ and $R_{32R}$ are the axial radii of curvature of the surfaces nearest to the object side and the image side, respectively, of the image side-lens component in the third lens group C, L is the diagonal length of an effective image pickup area of the electronic image pickup device, and $f_{3R}$ is the focal length of the image side-lens component in the third lens group C.

The same holds true for conditions (17C)', (17C)", (18C)' and (18C)".

It is noted that in order for the zoom lens arrangements a) and b) to have both a zooming function and a focal point-correction function, it is preferable to locate at least one movable lens group on the image side of the lens group B. It is then preferable that the lens group C adjacent to the lens group B is used as that movable lens group. To make the imaging system itself thin, on the other hand, it is preferable to simplify a zoom lens mechanism as much as possible. In other words, the number of lens groups movable during both zooming and focusing must be two in all.

The conditions mentioned below are all common to the zoom lens arrangements a) to d).

Focusing should preferably be carried out at a lens group in the rear of the lens group B, especially at the lens group C when it is provided. An axial air separation $D_{FT}$ from the lens group B to the lens group C upon focused on an infinite object point at the telephoto end should preferably satisfy the following condition (19).

$$0.1 < D_{FT}/f_T < 1.0 \quad (19)$$

Here $f_T$ is the focal length of the zoom lens upon focused on an infinite object point at the telephoto end.

As the upper limit of 1.0 to condition (19) is exceeded, it is difficult to ensure any zoom ratio, and as the lower limit of 0.1 is not reached, it is impossible to obtain any ample focusable distance range.

More preferably, $$0.2 < D_{FT}/f_T < 0.8 \quad (19)'$$

Most preferably, $$0.3 < D_{FT}/f_T < 0.6 \quad (19)''$$

To alleviate loads on the power of the lens group B and make correction of aberrations easy, the third lens group C should preferably have positive refracting power. For focusing on a nearby object in this case, the third lens group C is moved toward the object side.

$$-0.4 < L/f_C < 0.8 \quad (20)$$

Here $f_C$ is the focal length of the third lens group C, and L is the diagonal length of an effective image pickup area of the image pickup device.

As the lower limit of -0.4 to condition (20) is not reached, the amount of movement of the third lens group C upon focusing becomes too large, leading to a possible interference thereof with the lens group B, and fluctuations of aberrations with focusing tend to become large. As the upper limit of 0.8 is exceeded, the power of the lens group B becomes weak, resulting in an increase in the amount of the lens group B upon zooming or a zoom ratio drop.

More preferably, $$-0.3 < L/f_C < 0.6 \quad (20)'$$

Most preferably, $$-0.2 < L/f_C < 0.4 \quad (20)''$$

For zooming from the wide-angle end to the telephoto end, it is preferable to adopt a zooming mode wherein the lens group B and the lens group C move while their spacing varies. With this mode, it is possible to make efficient use of a space, thereby attaining high zoom ratios while making correction for the focal position with zooming. It is then preferable to satisfy the following condition (21) with respect to the ratio between the amounts of movement $M_2$ and $M_3$ of the lens groups B and C during zooming from the wide-angle end to the telephoto end upon focused at an infinite object point.

$$0.0 < M_3/M_2 < 1.6 \quad (21)$$

Here $M_2$ and $M_3$ are the amounts of movement of the moving lens group B and the third lens group C, respectively, at the telephoto end with respect to the wide-angle end upon focused on an infinite object point, provided that the movement of each group toward the image side is positive.

As the upper limit of 1.6 to condition (21) is exceeded, it is impossible to obtain any ample zoom ratio or any sufficient focusable distance range. As the lower limit of 0.0 is not reached, it is again difficult to obtain any adequate zoom ratio.

More preferably, $$0.2 < M_3/M_2 < 1.4 \quad (21)'$$

Most preferably, $$0.4 < M_3/M_2 < 1.2 \quad (21)''$$

It is noted that for the purpose of improving on correction of aberrations and exit side-telecentric properties, it desired to locate a lens group D on the image side with respect to the lens group C. Further, it is preferable to satisfy the following condition (22).

$$0.0 < L/f_D < 0.7 \quad (22)$$

Here $f_D$ is the focal length of the fourth lens group D, and L is the diagonal length of an effective image pickup area of the electronic image pickup device.

As the lower limit of 0.0 to condition (22) is not reached, the exit pupil position tends to come close to the image plane at the wide-angle end, and as the upper limit of 0.7 is exceeded, the amount of fluctuations of the exit pupil position with zooming becomes too large. In either case, shading tends to occur.

More preferably, $$0.1 < L/f_D < 0.5 \qquad (22)'$$

Most preferably, $$0.2 < L/f_D < 0.35 \qquad (22)''$$

By the introduction of an aspheric surface to the lens group D, it is effective to make correction for portions of aberrations that cannot be corrected at the lens groups A and B. This is particularly effective for correction of off-axis aberrations such as distortion, astigmatism and coma. Substantial portions of aberrations occurring on the object side with respect to the lens group D are canceled at that lens group D, and so the movement of the lens group D for focusing, etc. will put aberrations into an ill-balanced state. It is thus desired that the lens group D remain fixed during focusing.

To direct the entrance surface of the zoom lens toward the object side of the zoom lens and reduce the depth dimension thereof, an optical path should preferably be bent at a position as close to the object side of a phototaking optical system as possible and at a position where the height of rays is low. In view of rendering a collapsible lens mount waterproof and dustproof, it is preferable to locate moving lens groups on the image side with respect to the bending position.

To reduce the bending space as much as possible, it is preferable to keep low the height of all rays contributing to image formation near the bending site. With this in mind, it is desired that the composite focal length of a partial optical system from the lens group nearest to the object side, where the bending site is located, to just before a lens group movable during zooming is negative.

With a zoom lens wherein, as contemplated herein, the lens group A having negative refracting power and located nearest to its object side remains fixed, it is easy to bend an optical path thereby cutting down the depth dimension of a camera. It is particularly preferable to insert a reflecting optical element in the lens group A thereby bending the optical path. It is then desired that the lens group A be composed of a subgroup A1 comprising a negative meniscus lens element convex on its object side, a reflecting optical element for bending the optical path, and a subgroup A2 comprising at least a positive lens element.

Whatever the zoom lens type, it is preferable that an axial length d, as calculated on an air basis, from the surface apex of the first subgroup A1 located nearest to the image side to the surface apex of the second subgroup A2 located nearest to the object side, i.e., an axial length d, as calculated on an air basis, from a refracting surface having refracting power, located just before the reflecting surface of the reflecting optical element in the lens group A fixed during zooming to a refracting surface having refracting power, located just after that reflecting surface should satisfy the following condition (23).

$$0.8 < d/L < 2.0 \qquad (23)$$

Exceeding the upper limit of 2.0 to condition (23) renders the object side-optical element including a prism likely to become large, and is unfavorable for correction of aberrations as well. In addition, the composite magnification of the lens group B and the subsequent lens group or groups becomes low, leading to an increase in the amount of movement of the lens group B or it is difficult to ensure any high zoom ratio. As the lower limit of 0.8 is not reached, a light beam contributing to image formation at the periphery of an image does not satisfactorily arrive at the image plane or ghosts are likely to occur.

It is noted that when the angle of view in the optical path-bending direction is 25°±3° and about 19°±3°, respectively, it is desired to satisfy the following respective conditions (23-1) and (23-2).

$$0.9 < d/L < 1.7 \qquad (23\text{-}1)$$

$$1.0 < d/L < 1.8 \qquad (23\text{-}2)$$

Most preferably, $$1.0 < d/L < 1.5 \qquad (23\text{-}1)'$$

$$1.2 < d/L < 1.7 \qquad (23\text{-}2)'$$

For size reductions of the object side-optical element including a prism and correction of aberrations, it is favorable that the reflecting optical element is composed of a prism formed of a medium having large refracting power.

$$1.5 < n_{pri} \qquad (24)$$

Here $n_{pri}$ is the d-line refractive index of the prism medium.

Falling short of the lower limit of 1.5 to condition (24) renders the object side-optical element including a prism likely to become large, and is unfavorable for correction of aberrations as well. In addition, the composite magnification of the lens group B and the subsequent lens group or groups becomes low, leading to an increase in the amount of movement of the lens group B or it is difficult to ensure any high zoom ratio. The upper limit should preferably be prima facie 1.90. Exceeding the upper limit renders ghosts likely to occur by total reflection. The upper limit should be more preferably 1.87, and even more preferably 1.84.

More preferably, $$1.6 < n_{pri} \qquad (24)'$$

Most preferably, $$1.7 < n_{pri} \qquad (24)''$$

For correction of off-axis aberrations such as chromatic aberrations and distortions, it is preferable that the subgroup A2 in the lens group A is composed of two lens elements, i.e., a negative lens element and a positive lens group in order from its object side, and satisfies the following condition (25).

$$-0.5 < L/f_{12} < 0 \qquad (25)$$

Here L is the diagonal length of an effective image pickup area of the electronic image pickup device, and $f_{12}$ is the focal length of the image side-subgroup A2 in the lens group A that remains fixed during zooming.

As the upper limit of 0 to condition (25) is exceeded, the composite magnification of the lens group B and the subsequent lens group or groups becomes low, leading to an increase in the amount of movement of the lens group B, or it is difficult to ensure any high zoom ratio. Falling short of the lower limit of −0.5 renders the object side-optical element inclusive of a prism likely to become large, and is unfavorable for correction of aberrations as well.

More preferably, $$-0.4 < L/f_{12} < -0.05 \tag{25}'$$

Most preferably, $$-0.3 < L/f_{12} < -0.1 \tag{25}''$$

Whatever the zoom lens type, it is acceptable to configure the reflecting surface in a surface form other than the planar surface form, thereby achieving a proper paraxial refracting power profile. It is more preferable to use a control system whose reflecting surface can freely be varied, e.g., a variable shape mirror with a controllable shape, thereby making correction for fluctuations of focal position or aberrations with zooming or performing focusing or zooming. Alternatively, it is acceptable to use as the reflecting optical element a prism with a planoconcave lens element cemented to its planar surface or configure an effective ray transmitting or reflecting surface of the prism with a curved surface. In view of the balance of the level of correction of distortion against the target size of the electronic imaging system, it is also acceptable to add a positive lens element of weak power to the site of the zoom lens nearest to the object side. In this case, the subgroup A2 in the lens group A may be dispensed with. It is further acceptable that while the subgroup A1 in the lens group A is fixed during zooming, the subgroup A2 may be movable because it is designed to move with relative ease. In this case, it is desired that the subgroup A2 move in a convex locus toward the image size during zooming.

It is noted that the reflecting optical element is not always required to be interposed between a plurality of lens elements in the fixed lens group A; it may be located nearest to the object or image side of the fixed lens group A.

Any one of the following constructional requirements is added to the zoom lens arrangement so that a bending zoom lens of much higher performance specifications and much simpler construction can be obtained, making contributions to further thickness reductions of the imaging system.

The first requirement is that the subgroup A1 in the lens group A be composed of only one negative lens element convex on its object side.

This arrangement enables the depth dimension of the optical system to be minimized while the angle of view is kept intact.

In this case, the negative lens element counts for nothing without having any power. That is, the second requirement is that the power ratio between the subgroups A1 and A2 in the lens group A should satisfy the following condition (26).

$$0 < f_{11}/f_{12} < 1.6 \tag{26}$$

Here $f_{11}$ and $f_{12}$ are the focal lengths of the subgroups A1 and A2, respectively, in the lens group A.

Any deviation from the upper limit 1.6 and the lower limit 0 to condition (26) makes the bending optical element likely to become large.

More preferably, $$0.1 < f_{11}/f_{12} < 15 \tag{26}'$$

Most preferably, $$0.2 < f_{11}/f_{12} < 14 \tag{26}''$$

When costs are cut down on by reducing the number of lens elements, it is acceptable that either one of the lens groups B and C is composed of a single lens element, and another is constructed in such a way as to include at least a negative lens element. One merit of the lens groups B and C according to the present invention is that they can make shared use of a moving space because they are designed to move in much the same direction during zooming while their relative spacing varies slightly, so that zooming can be performed while the focal length is kept constant in a limited space. Another merit is that chromatic aberrations can mutually be corrected at the lens groups B and C. In other words, it is not always necessary to bring correction of chromatic aberrations at the lens groups B and C to completion. Thus, such an arrangement as mentioned above is achievable.

To keep the relative spacing change between the lens groups B and C as small as possible, it is preferable that zooming is performed where the magnification of the combined system of the lens group B and the subsequent lens group or groups is in the vicinity of −1. For correction of aberrations, however, the absolute value of magnification should preferably be reduced as much as possible. It is thus preferable to satisfy the following condition (27) at the telephoto end.

$$0.8 < -\beta_{Rt} < 2.1 \tag{27}$$

Here $\beta_{Rt}$ is the composite magnification of the combined system of the lens group B and the subsequent lens group or groups at the telephoto end upon focused on an object point at infinity.

Any deviation from the upper limit of 2.1 and the lower limit of 0.8 to condition (27) results in an increase in the amount of change in the relative spacing between the lens groups B and C.

More preferably, $$0.9 < -\beta_{Rt} < 1.9 \tag{27}'$$

Most preferably, $$1.0 < -\beta_{Rt} < 1.7 \tag{27}''$$

In such arrangements as mentioned above, it is acceptable to interpose other lens group between the third and fourth lens groups C and D. More preferably for size reductions, the third and fourth lens groups C and D should be located with an air separation interposed between them.

In such zoom lens arrangements as described above, it is preferable to use a prism as the reflecting optical element for bending the optical path because an entrance pupil is easily located at a shallow position and size reductions of the lens group A are favorably achievable. It is also preferable to furnish at least one transmitting surface of that prism with curvature, i.e., imparting refracting power to the prism, because the number of lens elements can be cut down, contributing to size reductions and cost reductions. To reduce the depth dimension of the zoom lens in particular, that prism should preferably be located nearest to the object side of the zoom lens, while the entrance surface of the prism is directed at a concave surface toward the object side. It is thus possible to dispense with the negative meniscus lens element located on the object side with respect to the prism and required for a prism all surfaces of which are defined by planar surfaces, thereby making the depth dimension smaller. It is noted, however, that such an arrangement is unfavorable for correction of off-axis aberrations such as distortions, but these aberrations can be corrected by the introduction of an aspheric surface. The introduction of an aspheric surface to the entrance surface of the prism makes it difficult to ensure decentration precision with the exit surface of the prism; however, the precision needed for inter-surface decentration is slacked by configuring the exit surface in a planar form.

Most preferably for size reductions and depth dimension reductions, the lens group A should be made up of a prism A1 having a transmitting (entrance) surface concave on its object side for bending an optical path and a subgroup A2 comprising at least a positive lens element.

Especially in this arrangement, when the lens groups B and C are each of the type b (zoom lens b), coma, astigmatism and distortion occur in varying ways. It is thus preferable to satisfy the numerical ranges given by the following conditions (3) to (8), (21), (23) and (26) (corresponding to the aforesaid conditions (3) to (8), (21), (23) and (26), and corresponding to further limited conditions (3)', (3)",etc.).

$$2.0 < \log \gamma_B / \log \gamma < 10 \tag{3}$$

$$2.2 < \log \gamma_B / \log \gamma < 9 \tag{3}'$$

$$2.4 < \log \gamma_B / \log \gamma < 8 \tag{3}''$$

$$0.45 < R_{22R}/R_{22F} < 0.95 \tag{4}$$

$$0.50 < R_{22R}/R_{22F} < 0.90 \tag{4}'$$

$$0.55 < R_{22R}/R_{22F} < 0.85 \tag{4}''$$

$$-0.8 < L/R_{22C} < 0.8 \tag{5}$$

$$-0.6 < L/R_{22C} < 0.6 \tag{5}'$$

$$-0.4 < L/R_{22C} < 0.4 \tag{5}''$$

$$25 < \nu_{22F} - \nu_{22R} \tag{6}$$

$$30 < \nu_{22F} - \nu_{22R} \tag{6}'$$

$$35 < \nu_{22F} - \nu_{22R} \tag{6}''$$

$$1.2 < (R_{21F} + R_{21R})/(R_{21F} - R_{21R}) < 1.2 \tag{7}$$

$$0.8 < (R_{21F} + R_{21R})/(R_{21F} - R_{21R}) < 0.8 \tag{7}'$$

$$-0.5 < (R_{21F} + R_{21R})/(R_{21F} - R_{21R}) < 0.5 \tag{7}''$$

$$-1.2 < L/f_{2R} < 0.1 \tag{8}$$

$$-1.0 < L/f_{2R} < 0.0 \tag{8}'$$

$$-0.9 < L/f_{2R} < -0.1 \tag{8}''$$

$$0.4 < M_3/M_2 < 1.6 \tag{21}$$

$$0.5 < M_3/M_2 < 1.4 \tag{21}'$$

$$0.6 < M_3/M_2 < 1.2 \tag{21}''$$

$$0.8 < d/L < 1.8 \tag{23}$$

$$0.9 < d/L < 1.5 \tag{23-1}$$

$$1.0 < d/L < 1.6 \tag{23-2}$$

$$1.0 < d/L < 1.3 \tag{23-1}'$$

$$1.2 < d/L < 1.5 \tag{23-2}''$$

$$0.5 < f_{11}/f_{12} < 1.6 \tag{26}$$

$$0.6 < f_{11}/f_{12} < 1.5 \tag{26}'$$

$$0.7 < f_{11}/f_{12} < 1.4 \tag{26}''$$

Except when the lens groups B and C are each of the type b and the entrance surface of the prism in the lens group A is concave on its object side, it is preferable to satisfy the numerical ranges given by the following conditions (corresponding to the aforesaid conditions (3) to (8), (21), (23) and (26), and corresponding to further limited conditions (3)', (3)", etc.).

$$0.9 < \log \gamma_B / \log \gamma < 4.5 \tag{3}$$

$$1.0 < \log \gamma_B / \log \gamma < 4.0 \tag{3}'$$

$$1.1 < \log \gamma_B / \log \gamma < 3.8 \tag{3}''$$

$$0.25 < R_{22R}/R_{22F} < 0.75 \tag{4}$$

$$0.30 < R_{22R}/R_{22F} < 0.65 \tag{4}'$$

$$0.33 < R_{22R}/R_{22F} < 0.55 \tag{4}''$$

$$-1.0 < L/R_{22C} < 0.6 \tag{5}$$

$$-0.8 < L/R_{22C} < 0.4 \tag{5}'$$

$$-0.6 < L/R_{22C} < 0.2 \tag{5}''$$

$$14 < \nu_{22F} - \nu_{22R} \tag{6}$$

$$18 < \nu_{22F} - \nu_{22R} \tag{6}'$$

$$22 < \nu_{22F} - \nu_{22R} \tag{6}''$$

$$-11.6 < (R_{21F} + R_{21R})/(R_{21F} - R_{21R}) < 0.4 \tag{7}$$

$$-1.2 < (R_{21F} + R_{21R})/(R_{21F} - R_{21R}) < 0.0 \tag{7}'$$

$$-0.8 < (R_{21F} + R_{21R})/(R_{21F} - R_{21R}) < -0.4 \tag{7}''$$

$$-1.2 < L/f_{2R} < -0.1 \tag{8}$$

$$-1.0 < L/f_{2R} < -0.2 \tag{8}'$$

$$-0.9 < L/f_{2R} < -0.3 \tag{8}''$$

$$0.0 < M_3/M_2 < 1.0 \tag{21}$$

$$0.2 < M_3/M_2 < 0.9 \tag{21}'$$

$$0.4 < M_3/M_2 < 0.8 \tag{21}''$$

$$1.0 < d/L < 2.0 \tag{23}$$

$$1.1 < d/L < 1.7 \tag{23-1}$$

$$1.2 < d/L < 1.8 \tag{23-2}$$

$$1.2 < d/L < 1.5 \tag{23-1}'$$

$$1.4 < d/L < 1.7 \tag{23-2}'$$

$$0 < f_{11}/f_{12} < 1.1 \tag{26}$$

$$0.1 < f_{11}/f_{12} < 1.0 \tag{26}'$$

$$0.2 < f_{11}/f_{12} < 0.9 \tag{26}''$$

Furthermore, the zoom lens of the present invention may be made up of, in order from its object side, a lens group A that remains fixed during zooming, a moving lens group B, a third lens group C and a fourth lens group D. In this way, a compact four-group zoom lens may be constructed.

Why the aforesaid arrangement is used in the 5th to 9th aspects of the present invention, and how it works is now explained.

The electronic imaging system of the present invention makes use of a zoom lens system with a bent optical path therein, which comprises, in order from its object side, a first lens group having negative refracting power, fixed during zooming and comprising a reflecting optical element for bending an optical path, a second lens group having positive refracting power and moving only toward the object side of the zoom lens upon zooming from a wide-angle end to a telephoto end of the zoom lens, a third lens group moving in a locus different from that of the second lens group upon zooming, and a fourth lens group including an aspheric surface.

With the optical path-bending reflecting optical element located in the first lens group nearest to the object side, it is thus possible to slim down the camera in its depth direction. When the lens group having a bending function remains fixed during zooming, some mechanical intricateness is avoidable.

In the present invention, the second and third lens groups move in such varying ways as to perform zooming and make correction for fluctuations of image point position with zooming. In particular, the second lens group, because of working as a main lens group having a zooming function, is designed to move only toward the object side of the zoom lens upon zooming from the wide-angle end to the telephoto end.

The role of the fourth lens group is to make correction for remaining off-axis aberrations occurring at the 1st to 3rd lens groups, and so it is effective to introduce an aspheric surface thereto.

In the case of the zoom lens system having such construction as described above, even when two lens groups given by the aforesaid second and third lens groups are constructed of a reduced number of lens components, e.g., at most three lens components including at least one doublet component, off-axis aberrations can be corrected in considerably satisfactory manners. The "lens component" used herein is understood to refer to a lens wherein only two lens surfaces, i.e., a lens surface nearest to its object side and a lens surface nearest to its image side come into contact with air and there is no air separation between them, provided that a single lens or doublet is thought of as one unit.

It is then preferable to satisfy the following condition (41).

$$1.0 < -\beta_{Rt} < 2.6 \tag{41}$$

Here $\beta_{Rt}$ is the composite magnification of the second lens group and the subsequent lens group or groups at the telephoto end upon focused on an object point at infinity.

Any deviation from the upper limit of 2.6 or the lower limit 1.0 to condition (41) causes an increase in the amount of change in the relative spacing between the second lens group and the third lens group, often resulting in a wasteful space for moving the moving lens group.

More preferably, $$1.0 < \beta_{Rt} < 2.3 \tag{41}'$$

Most preferably, $$1.4 < -\beta_{Rt} < 2.0 \tag{41}''$$

Especially if the second lens group is made up of a doublet component consisting of a positive lens element having an aspheric surface and a negative lens element and a positive lens element, it is then possible to satisfy condition (41) with a reduced number of lens elements and considerably reduce changes of aberrations from the wide-angle end to the telephoto end. At the same time, this is favorable in view of changes in the F-number upon zooming; it is unlikely that the exit pupil position may be too close to the image plane, and fluctuations of the exit pupil position with zooming are reduced as well.

It is noted that although the degree (sensitivity to decentration) of aberration degradation per the unit amount of relative decentration between the two lens components in the second lens group tends to become large, yet that degradation can be slacked by satisfying the following condition (42).

$$0.7 < R_{21R}/R_{21F} < 1.6 \tag{42}$$

Here $R_{21R}$ is the axial radius of curvature of the surface located in the doublet component in the second lens group and positioned nearest to the image side, and $R_{21F}$ is the axial radius of curvature of the surface located in the doublet component in the second lens group and positioned nearest to the object side.

Exceeding the upper limit to condition (42) may be helpful for correction of spherical aberrations, coma and astigmatism throughout the zoom lens system, but the effect of cementing on slacking sensitivity to decentration becomes slender.

As the lower limit to condition (42) is not reached, correction of spherical aberrations, coma and astigmatism throughout the zoom lens system is likely to become difficult.

More preferably, $$0.75 < R_{21R}/R_{21F} < 1.3 \tag{42}'$$

Most preferably, $$0.8 < R_{21R}/R_{21F} < 1.3 \tag{42}''$$

For correction of chromatic aberrations, the following conditions (43) and (44) should be satisfied in addition to the aforesaid condition (42).

$$0 < L/R_{21C} < 1.4 \tag{43}$$

$$15 < \nu_{21F} - \nu_{21R} \tag{44}$$

Here $R_{21C}$ is the axial radius of curvature of the cementing surface in the doublet component in the second lens group, L is the diagonal length in mm of an effective image pickup area of the electronic image pickup device on condition that the electronic image pickup device should be used at an angle of view of 550 or greater at the wide-angle end, and $\nu_{21F}$ and $\nu_{21R}$ are the Abbe numbers of the media of the object side-lens element and the image side-lens element, respectively, in the doublet component in the second lens group.

Falling short of the lower limit to condition (43) may be favorable for correction of longitudinal chromatic aberration and chromatic aberration of magnification, but this is not preferable because chromatic aberration of spherical aberration is likely to occur. In particular, although spherical aberrations at the reference wavelength may be well corrected, spherical aberrations at short wavelengths remain over-corrected, causing chromatic blurring of images.

As the upper limit to condition (43) is exceeded, on the other hand, it is likely that the longitudinal chromatic aberration and chromatic aberration of magnification as well as spherical aberrations at short wavelengths remain under-corrected.

As the lower limit to condition (44) is not reached, under-correction of longitudinal chromatic aberration is likely to occur.

On the other hand, combinations of media exceeding the upper limit to condition (44) do not occur in nature.

More preferably, at least one of the following conditions (43)' and (44)' should be satisfied.

$$0.2 < L/R_{21C} < 1.2 \qquad (43)''$$

$$20 < \nu_{21F} - \nu_{21R} \qquad (44)''$$

Most preferably, at least one of the following conditions (43)" and (44)" should be satisfied.

$$0.4 < L/R_{21C} < 1.0 \qquad (43)'''$$

$$25 < \nu_{21F} - \nu_{21R} \qquad (44)'''$$

With respect to the fourth lens group, it is preferable to satisfy the following condition (45).

$$-0.4 < L/fD < 0.6 \qquad (45)$$

Here L is the diagonal length of the effective image pickup area of the electronic image pickup device, and fD is the focal length of the fourth lens group.

As the lower limit to condition (45) is not reached, the exit pupil position is likely to come close to the image plane, and as the upper limit to condition (45) is exceeded, the amount of fluctuation of the exit pupil position with zooming becomes too large. In either case, shading is likely to occur.

More preferably, $$-0.2 < L/fD < 0.4 \qquad (45)'$$

Most preferably, $$0 < L/fD < 0.2 \qquad (45)''$$

In view of correction of chromatic aberrations, it is preferable to construct the fourth lens group of two lens elements, i.e., a positive lens element and a negative lens element, and satisfy the following condition (46).

$$15 < \nu_{4P} - \nu_{4N} \qquad (46)$$

Here $\nu_{4P}$ is the d-line based Abbe number of the medium of the positive lens element in the fourth lens group, and $\nu_{4N}$ is the d-line based Abbe number of the medium of the negative lens element in the fourth lens group.

As the lower limit to condition (46) is not reached, chromatic aberration of magnification is prone to undercorrection.

Combinations of media exceeding the upper limit to condition (46), on the other hand, do not occur in nature.

More preferably, $$20 < \nu_{4P} - \nu_{4N} \qquad (46)'$$

Most preferably, $$25 < \nu_{4P} - \nu_{4N} \qquad (46)''$$

The first lens group of the zoom lens according to the present invention is now explained at great length.

In the zoom lens of the present invention, the first lens group is made up of, in order from its object side, a front subgroup comprising a negative lens element convex on its object side, a reflecting optical element for bending an optical path and a rear subgroup having negative refracting power. The optical path-bending optical element, because of taking a constant optical path length, causes an entrance pupil to be likely to become deep. To ensure magnification, on the other hand, it is required to make the focal length of the second and subsequent lens groups long and, hence, make the moving space likely to become large. Both requirements are thus contradictory. Accordingly, it is preferable to allocate the negative refracting power of the first lens group to two optical elements and locate both the elements before and after the optical path-bending optical element. It is then desired to satisfy the following conditions (47) and (48).

$$0.5 < (R_{11F} + R_{11R})/(R_{11F} - R_{11R}) < 5.0 \qquad (47)$$

$$0 < f_{11}/f_{12} < 1.2 \qquad (48)$$

Here $R_{11F}$ is the axial radius of curvature of an object side-surface of the negative lens element in the front subgroup in the first lens group, $R_{11R}$ is the axial radius of curvature of an image side-surface of the negative lens element in the front subgroup in the first lens group, $f_{11}$ is the focal length of the front subgroup in the first lens group, and $f_{12}$ is the focal length of the rear subgroup in the first lens group.

Condition (47) is provided to define the shape factor of the negative lens element in the front subgroup in the first lens group.

Exceeding the upper limit to condition (47) is not preferable because of the likelihood of interference with the optical path-bending optical element, and to avoid such interference, it is required to increase the depth dimension.

Falling short of the lower limit to condition (47), on the other hand, renders correction of distortion or the like difficult.

Condition (48) is provided to define the focal length ratio between the front and rear subgroups in the first lens group.

As the upper limit to condition (48) is exceeded, the entrance pupil is likely to become deep.

As the lower limit to condition (48) is not reached, on the other hand, the moving space is likely to become large because the focal length of the second and subsequent lens groups should be increased to ensure magnification.

More preferably, $$0.8 < (R_{11F} + R_{11R})/(R_{11F} - R_{11R}) < 4.0 \qquad (47)'$$

$$0 < f_{11}/f_{12} < 1.0 \qquad (48)'$$

Most preferably, $$1.0 < (R_{11F} + R_{11R})/(R_{11F} - R_{11R}) < 3.0 \qquad (47)''$$

$$0 < f_{11}/f_{12} < 0.8 \qquad (48)''$$

The front subgroup is composed of one negative lens element to diminish the depth dimension. For the primary purpose of correction of off-axis aberrations, it is thus preferable to introduce an aspheric surface to the front subgroup. Preferably in this case, the rear subgroup should be made up of two lens components for the primary purpose of allocating correction of chromatic aberrations and spherical aberrations on the telephoto side to the rear subgroup.

Further, it is preferable to satisfy the following condition (49) with respect to an air lens portion defined by the two lens components.

$$0.4 < (R_{12R}/R_{13F})^P < 1.6 \qquad (49)$$

where $R_{12R}$ is the axial radius of curvature of an object side-surface of an air lens defined between the two lens components in the rear subgroup in the first lens group, $R_{13F}$ is the axial radius of curvature of an image side-surface of the air lens defined between the two lens components in the rear subgroup in the first lens group, and P is P=1 in the case where the negative lens component and the positive lens component are located in this order as viewed from an object side of the rear subgroup, and P=−1 in the case wherein the positive lens component and the negative lens component are located in this order as viewed from the object side of the rear subgroup.

As the lower limit to condition (49) is not reached, higher-order components of spherical aberrations on the telephoto side become large, resulting often in low-contrast images.

As the upper limit to condition (49) is exceeded, on the other hand, spherical aberrations on the telephoto side are likely to remain under-corrected.

More preferably, $$0.5<(R_{12R}/R_{13F})^P<1.4 \quad (49)'$$

Most preferably, $$0.6<(R_{12R}/R_{13F})^P<1.2 \quad (49)''$$

It is also desired that at least one of the two lens components that form the rear subgroup in the first lens group be composed of a doublet component consisting of a positive lens element and a negative lens element, wherein a high-dispersion medium is used for the positive lens element and a low-dispersion medium for the negative lens element.

It is then preferably to satisfy the following conditions (50) and (51).

$$3<\nu_{A2N}-\nu_{A2P}<40 \quad (50)$$

$$0.2<Q\cdot L/R_{A2C}<1.0 \quad (51)$$

Here $\nu_{A2N}$ is the d-line based Abbe number of the negative lens element medium of the doublet component in the rear subgroup in the first lens group, $\nu_{A2P}$ is the d-line based Abbe number of the positive lens element medium of the doublet component in the rear subgroup in the first lens group, L is the diagonal length of an effective image pickup area of the electronic image pickup device, $R_{A2C}$ is the axial radius of curvature of the cementing surface in the doublet component in the rear subgroup in the first lens group, Q is Q=1 in the case where the doublet component in the rear subgroup in the first lens group is composed of the negative lens element and the positive lens element in order from the object side of the rear subgroup, and Q is Q=−1 in the case where that doublet component is composed of the positive lens element and the negative lens element in order from the object side of the rear subgroup.

Any deviation from the lower and upper limits to condition (50) renders simultaneous correction of longitudinal chromatic aberration and chromatic aberration of magnification difficult.

Falling short of the lower limit to condition (51) is not preferable, not only because chromatic aberrations of spherical aberrations are likely to occur but also because even when satisfactory correction of spherical aberrations at the reference wavelength in particular is achievable, spherical aberrations at short wavelengths remain under-corrected, causing a chromatic blurring of images.

Exceeding the upper limit to condition (51), on the other hand, is again not preferable because of an increase in the sensitivity of cementing to decentration.

More preferably, $$6<\nu_{A2N}-\nu_{A2P}<35 \quad (50)'$$

$$0.3<Q\cdot L/R_{A2C}<0.8 \quad (51)'$$

Most preferably, $$9<\nu_{A2N}-\nu\nu_{A2P}<30 \quad (50)''$$

$$0.4<Q\cdot L/R_{A2C}<0.65 \quad (51)''$$

For the zoom lens of the present invention, focusing should preferably be performed by back-and-forth movement of the third lens group on the optical axis of the zoom lens. It is then preferable to fix the fourth lens group constantly in place, not only because the mechanism involved can be simplified but also because fluctuations of aberrations with zooming or focusing can be reduced.

Referring here to an optical path-bending type zoom lens such as one intended herein, size reductions of the optical system relative to size reductions of the image pickup device are more significant as compared with a collapsible lens mount type zoom lens.

For the purpose of further slimming down the camera, it is thus effective to use with the zoom lens of the present invention an electronic image pickup device so small as satisfying the following condition (52):

$$F \geq a \quad (52)$$

where F is the full-aperture F-number of the zoom lens at the wide-angle end, and a is the horizontal pixel pitch in µm of the electronic image pickup device. It is then more preferable to provide such contrivances as described below.

As the image pickup device becomes small, the pixel pitch becomes small in proportion; image degradations due to the influence of diffraction become unacceptably large. Especially when the relation of the full-aperture F-number at the wide-angle end to the horizontal pixel pitch a (µm) of the electronic image pickup device used becomes so small as satisfying the above condition (52), the image pickup device cannot be used in states other than the full-aperture state.

Accordingly, the aperture stop that determines the F-number should have a fixed inside diameter, and be kept against insertion and deinsertion or replacement. In this condition, at least one of the refracting surfaces adjacent to the aperture stop (the refracting surface adjacent to the image side in the present invention) should be set with its convex surface directed toward the aperture stop, so that the point of intersection of the optical axis with the perpendicular from the aperture stop down to the optical axis is positioned within 0.5 mm from the apex of the convex surface or, alternatively, the convex surface intersects or contacts the inside diameter portion of the aperture stop member inclusive of the back surface of the aperture stop site. This makes some considerable space needed so far for an aperture stop unnecessary or saves space considerably, contributing substantially to size reductions.

For control of light quantity, it is preferable to use variable-transmittance means instead of the aperture stop. Wherever on the optical path the variable-transmittance is located, no problem arises; it should preferably be inserted in a large enough space. Especially in the present invention, that means should be inserted between the zooming lens group and the image pickup device. For the variable-transmittance means, use may be made of a member with a transmittance variable with voltage, etc., or a combination of insertable or replaceable filters with varying transmittances. It is then desired that a shutter for controlling the reception time of a light beam guided to the electronic image pickup device be located in a space different from that for the aperture stop.

When the relation of the full-aperture F-number at the wide-angle end to the horizontal pixel pitch a (µm) of the electronic image pickup device satisfies the above condition (F≥a), it is acceptable to dispense with an optical low-pass filter. In other words, it is acceptable that all media on the optical axis between the zoom lens system and the image pickup device is defined by air or a non-crystalline medium alone. This is because there is little frequency component capable of producing bending distortion for the reason of deterioration in the image-formation capability due to diffraction and geometric aberrations. Alternatively, the optical elements located between the zoom lens system and the electronic image pickup device may be composed of those wherein all interfaces of media are substantially defined by planes and which are free from spatial frequency characteristic conversion actions, e.g., optical low-pass filters.

For the zoom lens used in the present invention, it is desired to satisfy the following condition (53):

$$1.8 < f_T/F_W \tag{53}$$

where $f_T$ is the focal length of the zoom lens system at the telephoto end, and $f_W$ is the focal length of the zoom lens system at the wide-angle end.

As the lower limit to condition (53) is not reached, the zoom ratio of the zoom lens system becomes lower than 1.8.

In this regard, the upper limit to $f_T/f_W$ should preferably be set 5.5.

At greater than 5.5, the zoom ratio becomes too high, and the amount of the lens group that moves for zooming becomes too large. This in turn causes size to increases in the optical path-bending direction and, hence, makes it impossible to achieve any compact imaging system.

The presumption for the electronic image pickup device used herein is that it has a whole angle of view of 55° or greater at the wide-angle end. The 55 degrees are the wide-angle-end whole angle of view needed commonly for an electronic image pickup device.

For the electronic image pickup device, the wide-angle-end view of angle should preferably be 80° or smaller.

At greater than 80°, distortions are likely to occur, and it is difficult to make the first lens group compact. It is thus difficult to slim down the electronic imaging system.

Thus, the present invention provides means for reducing the thickness of the zoom lens portion upon received in a collapsible lens mount while satisfactory image-formation capability is maintained.

Next, how and why the thickness of filters is reduced is now explained. In an electronic imaging system, an infrared absorption filter having a certain thickness is usually inserted between an image pickup device and the object side of a zoom lens, so that the incidence of infrared light on the image pickup plane is prevented. Here consider the case where this filter is replaced by a coating devoid of thickness. In addition to the fact that the system becomes thin as a matter of course, there are spillover effects. When a near-infrared sharp cut coat having a transmittance ($\tau_{600}$) of at least 80% at 600 nm and a transmittance ($\tau_{700}$) of up to 8% at 700 nm is introduced between the image pickup device in the rear of the zoom lens system and the object side of the system, the transmittance at a near-infrared area of 700 nm or longer is relatively lower and the transmittance on the red side is relatively higher as compared with those of the absorption type, so that the tendency of bluish purple to turn into magenta—a defect of a CCD or other solid-state image pickup device having a complementary colors filter—is diminished by gain control and there can be obtained color reproduction comparable to that by a CCD or other solid-state image pickup device having a primary colors filter. In addition, it is possible to improve on color reproduction of, to say nothing of primary colors and complementary colors, objects having strong reflectivity in the near-infrared range, like plants or the human skin.

Thus, it is preferable to satisfy the following conditions (28) and (29):

$$\tau_{600}/\tau_{550} \geq 0.8 \tag{8}$$

$$\tau_{700}/\tau_{550} \leq 0.08 \tag{29}$$

where $\tau_{550}$ is the transmittance at 550 nm wavelength.

More preferably, the following conditions (28)' and/or (29)' should be satisfied:

$$\tau_{600}/\tau_{550} \geq 0.85 \tag{28)'}$$

$$\tau_{700}/\tau_{550} \leq 0.05 \tag{29)'}$$

Even more preferably, the following conditions (28)" or (29)" should be satisfied:

$$\tau_{600}/\tau_{550} \geq 0.9 \tag{28)"}$$

$$\tau_{700}/\tau_{550} \leq 0.03 \tag{29)"}$$

Most preferably, both conditions (28)" and (29)" should be satisfied.

Another defect of the CCD or other solid-state image pickup device is that the sensitivity to the wavelength of 550 nm in the near ultraviolet range is considerably higher than that of the human eye. This, too, makes noticeable chromatic blurring at the edges of an image due to chromatic aberrations in the near-ultraviolet range. Such color blurring is fatal to a compact optical system. Accordingly, if an absorber or reflector is inserted on the optical path, which is designed such that the ratio of the transmittance ($\tau_{400}$) at 400 nm wavelength to that ($\tau_{550}$) at 550 nm wavelength is less than 0.08 and the ratio of the transmittance ($\tau_{440}$) at 440 nm wavelength to that ($\tau$550) at 550 nm wavelength is greater than 0.4, it is then possible to considerably reduce noises such as chromatic blurring while the wavelength range necessary for color reproduction (satisfactory color reproduction) is kept intact.

It is thus preferable to satisfy the following conditions (30) and (31):

$$\tau_{400}/\tau_{550} \leq 0.08 \tag{30}$$

$$\tau_{440}/\tau_{550} \geq 0.4 \tag{31}$$

More preferably, the following conditions (30)' and/or (31)' should be satisfied.

$$\tau_{400}/\tau_{550} \leq 0.06 \tag{30)'}$$

$$\tau_{440}/\tau_{550} \geq 0.5 \tag{31)'}$$

Even more preferably, the following condition (30)" or (31)" should be satisfied.

$$\tau_{400}/\tau_{550} \leq 0.04 \tag{30)"}$$

$$\tau_{440}/\tau_{550} > 0.6 \tag{31)"}$$

Most preferably, both condition (30)" and (31)" should be satisfied.

It is noted that these filters should preferably be located between the image-formation optical system and the image pickup device.

On the other hand, a complementary colors filter is higher in substantial sensitivity and more favorable in resolution than a primary colors filter-inserted CCD due to its high transmitted light energy, and provides a great merit when used in combination with a small-size CCD.

To shorten and slim down the optical system, the optical low-pass filter that is another filter, too, should preferably be thinned as much as possible. In general, an optical low-pass filter harnesses a double-refraction action that a uniaxial crystal like berg crystal has. However, when the optical low-pass filter includes a quartz optical low-pass filter or filters in which the angles of the crystal axes with respect to the optical axis of the zoom lens are in the range of 35° to 55° and the crystal axes are in varying directions upon projected onto the image plane, the filter having the largest thickness along the optical axis of the zoom lens among them should preferably satisfy the following condition (32) with respect to its thickness $t_{LPF}$ (mm).

$$0.08 < t_{LPF}/a < 0.16 \text{ (at } a < 4 \text{ μm)}$$

$$0.075 < t_{LPF}/a < 0.15 \text{ (at } a < 3 \text{ μm)} \tag{32}$$

Here $t_{LPF}$ (mm) is the thickness of the optical low-pass filter having the largest thickness along the optical axis of the zoom lens with the angle of one crystal axis with respect to the optical axis being in the range of 35° to 55°, and a is the horizontal pixel pitch (in μm) of the image pickup device.

Referring to a certain optical low-pass filter or an optical low-pass filter having the largest thickness among optical low-pass filters, its thickness is set in such a way that contrast becomes theoretically zero at the Nyquist threshold wavelength, i.e., at approximately a/5.88 (mm). A thicker optical low-pass filter may be effective for prevention of swindle signals such as moiré fringes, but makes it impossible to take full advantages of the resolving power that the electronic image pickup device has, while a thinner filter renders full removal of swindle signals like moiréfringes impossible. However, swindle signals like moiréfringes have close correlations with the image-formation capability of a taking lens like a zoom lens; high image-formation capability renders swindle signals like moiréfringes likely to occur. Accordingly, when the image-formation capability is high, the optical low-pass filter should preferably be somewhat thicker whereas when it is low, the optical low-pass filter should preferably be somewhat thinner.

As the pixel pitch becomes small, on the other hand, the contrast of frequency components greater than the Nyquist threshold decreases due to the influence of diffraction by the image-formation lens system and, hence, swindle signals like moiréfringes are reduced. Thus, it is preferable to reduce the thickness of the optical low-pass filter by a few % or a few tens % from a/5.88 (mm) because a rather improved contrast is obtainable at a spatial frequency lower than the frequency corresponding to the Nyquist threshold.

More preferably, $$0.075 < t_{LPF}/a < 0.15 \text{ (at } a < 4 \text{ μm)}$$

$$0.07 < t_{LPF}/a < 0.14 \text{ (at } a < 3 \text{ μm)} \tag{32}'$$

Most preferably, $$0.07 < t_{LPF}/a < 0.14 \text{ (at } a < 4 \text{ μm)}$$

$$0.065 < t_{LPF}/a < 0.13 \text{ (at } a < 3 \text{ μm)} \tag{32}''$$

If an optical low-pass filter is too thin at a<4 μm, it is then difficult to process. Thus, it is permissible to impart some thickness to the optical low-pass filter or make high the spatial frequency (cutoff frequency) where contrast reduces to zero even when the upper limit to conditions (32), (32)' and (32)" is exceeded. In other words, it is permissible to regulate the angle of the crystal axis of the optical low-pass filter with respet to the optical axis of the zoom lens to within the range of 15° to 35° or 55° to 75°. In some cases, it is also permissible to dispense with the optical low-pass filter. In that angle range, the quantity of separation of incident light to an ordinary ray and an extraordinary ray is smaller than that around 45°, and that separation does not occur at 0° or 90° (at 90°, however, there is a phase difference because of a velocity difference between both rays—the quarter-wave principle).

As already described, when the pixel pitch becomes small, it is difficult to increase the F-number because the image-formation capability deteriorates under the influence of diffraction at a high spatial frequency that compensates for such a small pixel pitch. It is thus acceptable to use two types of aperture stops for a camera, i.e., a full-aperture stop where there is a considerable deterioration due to geometric aberrations and an aperture stop having an F-number in the vicinity of diffraction limited. It is then acceptable to dispense with such an optical low-pass filter as described before.

Especially when the pixel pitch is small and the highest image-formation capability is obtained at a full-aperture stop, etc., it is acceptable to use an aperture stop having a constantly fixed inside diameter as means for controlling the size of an incident light beam on the image pickup plane instead of using an aperture stop having a variable inside diameter or a replaceable aperture stop. Preferably in that case, at least one of lens surfaces adjacent to the aperture stop should be set such that its convex surface is directed to the aperture stop and it extends through the inside diameter portion of the aperture stop, because there is no need of providing any additional space for the stop, contributing to length reductions of the zoom optical system. It is also desirable to locate an optical element having a transmittance of up to 90% (where possible, the entrance and exit surfaces of the optical element should be defined by planar surfaces) in a space including the optical axis at least one lens away from the aperture stop or use means for replacing that optical element by another element having a different transmittance.

Alternatively, the electronic imaging system is designed in such a way as to have a plurality of apertures each of fixed aperture size, one of which can be inserted into any one of optical paths between the lens surface located nearest to the image side of the first lens group and the lens surface located nearest to the object side of the third lens group and can be replaced with another as well, so that illuminance on the image plane can be adjusted. Then, media whose transmittances with respect to 550 nm are different but less than 80% are filled in some of the plurality of apertures for light quantity control. Alternatively, when control is carried out in such a way as to provide a light quantity corresponding to such an F-number as given by a (μm)/F-number <4.0, it is preferable to fill the apertures with medium whose transmittance with respect to 550 nm are different but less than 80%. In the range of the full-aperture value to values deviating from the aforesaid condition as an example, any medium is not used or dummy media having a transmittance of at least 91% with respect to 550 nm are used. In the range of the aforesaid condition, it is preferable to control the quantity of light with an ND filter or the like, rather than to decrease the diameter of the aperture stop to such an extent that the influence of diffraction appears.

Alternatively, it is acceptable to uniformly reduce the diameters of a plurality of apertures inversely with the F-numbers, so that optical low-pass filters having different frequency characteristics can be inserted in place of ND filters. As degradation by diffraction becomes worse with stop-down, it is desirable that the smaller the aperture diameter, the higher the frequency characteristics the optical low-pass filters have.

It is understood that when the relation of the full-aperture F-number at the wide-angle end to the pixel pitch a (µm) used satisfies F>a, it is acceptable to dispense with the optical low-pass filter. In other words, it is permissible that the all the medium on the optical axis between the zoom lens system and the electronic image pickup device is composed of air or a non-crystalline medium alone. This is because there are little frequency components capable of producing distortions upon bending due to a deterioration in the image-formation capability by reason of diffraction and geometric aberrations.

It is understood that only the upper limit or only the lower limit may be applied to each of the above conditions, and that the values of these conditions in each of the following examples may be extended as far as the upper or lower limits thereof.

Still other objects and advantages of the invention will in part be obvious and will in part be apparent from the specification.

The invention accordingly comprises the features of construction, combinations of elements, and arrangement of parts that will be exemplified in the construction hereinafter set forth, and the scope of the invention will be indicated in the claims.

BRIEF DESCRIPTION OF THE DRAWINGS

FIG. 19 is a sectional view illustrative along the optical axis of the optical construction of Example 16 of the zoom lens used with the electronic imaging system according to the present invention.

DESCRIPTION OF THE PREFERRED EMBODIMENTS

Examples 1 to 13 of the zoom lenses according to the 1st to 4th aspects of the present invention are now explained. Sectional lens configurations of Examples 1 to 13 at the wide-angle end (a), in the intermediate state (b) and at the telephoto end (c) upon focused on an object point at infinity are shown in FIGS. 1 to 13. Throughout FIGS. 1 to 12, the first lens group is indicated by G1, a stop by S, the second lens group by G2, the third lens group by G3, the fourth lens group by G4, an optical low-pass filter by LF, a cover glass for an electronic image pickup device CCD by CG, and the image plane of CCD by I. A plane-parallel plate or the taken-apart optical path-bending prism in the first lens group is indicated by P. In FIGS. 13(*a*), 13(*b*) and 13(*c*), the 1-1st lens group is given by G1-1, the 1-2nd lens group by G1-2, an optical path-bending prism by P, the second lens group by G2, the third lens group by G3, the fourth lens group G4, a near-infrared cut coat surface by IC, an optical low-pass filter by LF, a cover glass for an electronic image pickup device CCD by CG, and the image plane of CCD by I. The near-infrared cut coat surface IC, optical low-pass filter LF and cover glass CG located in this order from the object side are fixedly located between the final lens group G4 and the image plane I. The maximum thickness of the optical low-pass filter used in these examples will be explained later. It is noted that instead of the near-infrared sharp cut coat, it is acceptable to use an optical low-pass filter LF coated directly with a near-infrared sharp cut coat, an infrared cut absorption filter or a transparent plane plate with a near-infrared sharp cut coat applied on its entrance surface.

Figure 14:
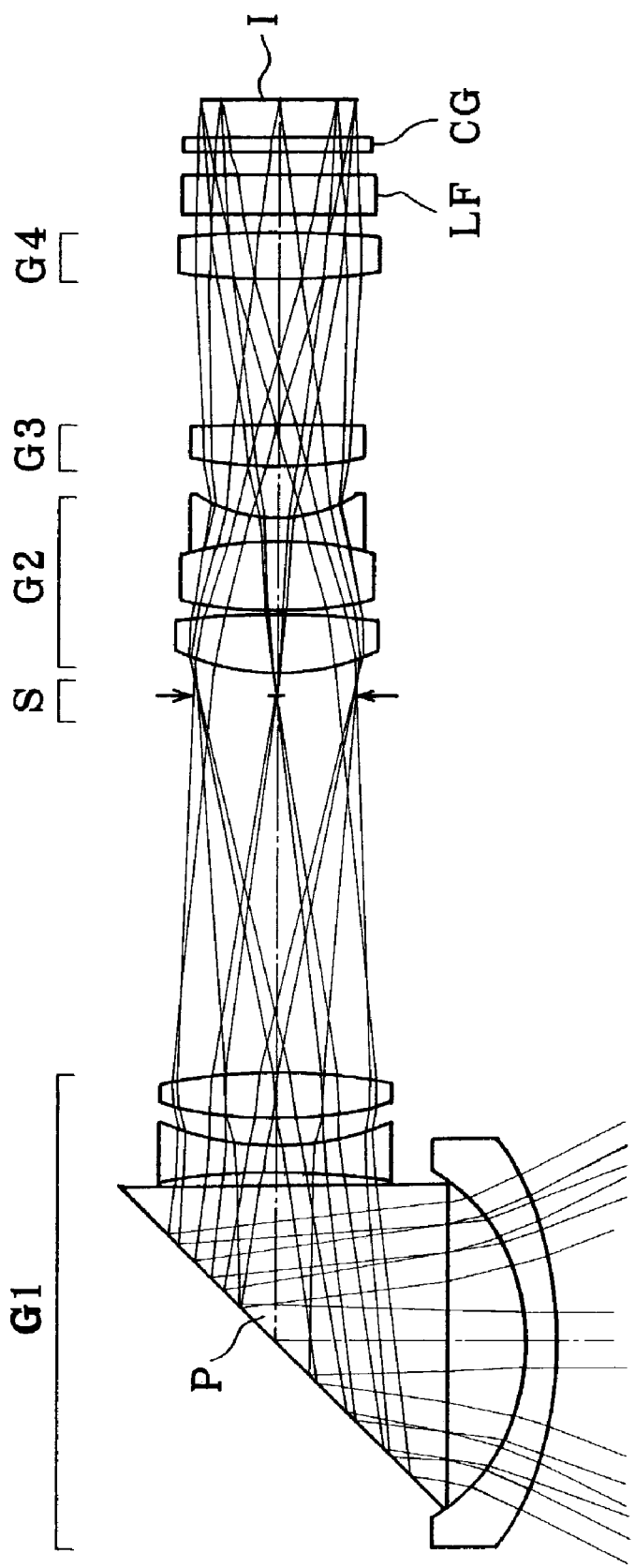
FIG. 14 is an optical path diagram for Example 1 of the zoom lens when the optical path is bent upon focused on an infinite object point at the wide-angle end.

As shown typically in FIG. 14 that is an optical path diagram for Example 1 of the zoom lens upon focused on an infinite object point at the wide-angle end, the optical path-bending prism P is configured as a reflecting prism for bending the optical path through 90°. In Examples 1 to 13, the aspect ratio of the effective image pickup area is 3:4 and the optical path is bent in the lateral direction.

EXAMPLE 1

Figure 1A:
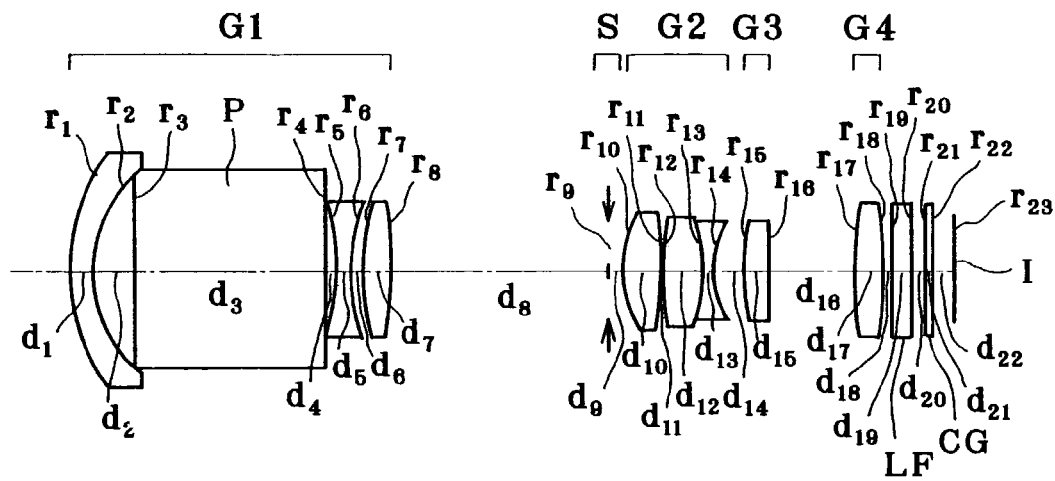
FIGS. 1(a), 1(b) and 1(c) are illustrative in section of Example 1 of the zoom lens used with the electronic imaging system of the invention at the wide-angle end (a), in an intermediate state (b) and at the telephoto end (c), respectively, when the zoom lens is focused on an object point at infinity.
Figure 1B:
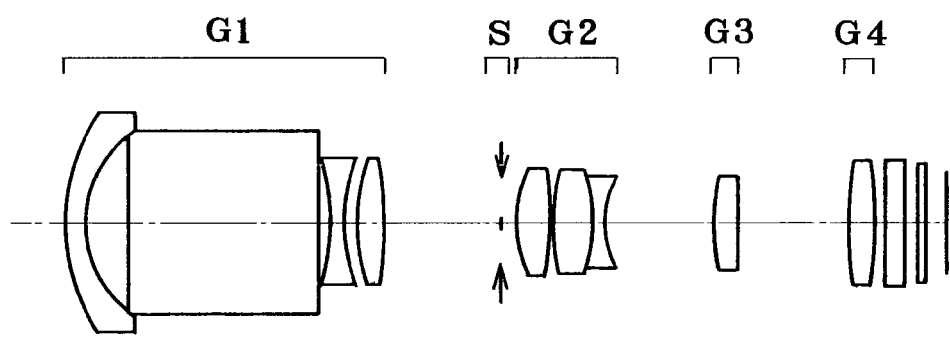
Figure 1C:
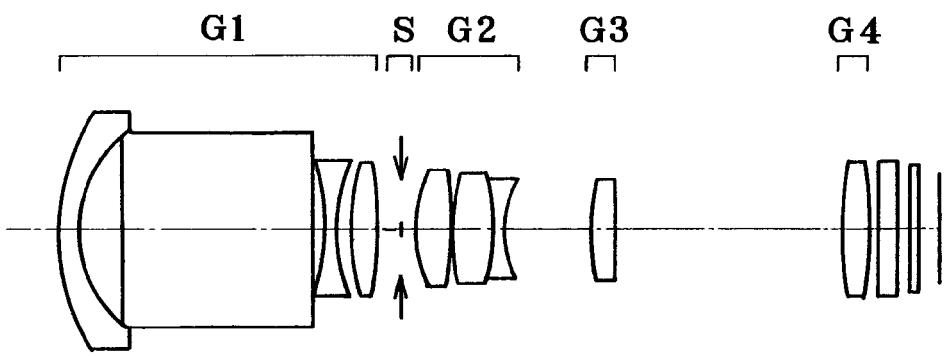

As shown in FIGS. 1(*a*), 1(*b*) and 1(*c*), Example 1 is directed to a zoom lens made up of a first lens group G1 consisting of a negative meniscus lens element convex on its object side, an optical path-bending prism P, a double-concave lens element and a double-convex positive lens element, an aperture stop S, a second lens group G2 composed of a double-convex positive lens element and a doublet consisting of a double-convex positive lens element and a double-concave negative lens element, a third lens group G3 consisting of one double-convex positive lens element and a fourth lens group G4 consisting of one double-convex positive lens element. Upon zooming the wide-angle end to the telephoto end of the zoom lens, the first lens group G1 and the fourth lens group G4 remain fixed, the second lens group G2 moves together with the aperture stop S toward the object side of the zoom lens, and the third lens group G3 moves toward the object side while the spacing between the second lens group G2 and the third lens group G3 becomes wide and then narrow. For focusing on a nearby subject, the third lens group G3 moves toward the object side.

Three aspheric surfaces are used; one at the image side-surface of the double-concave negative lens element in the first lens group G1, one at the surface nearest to the object side in the second lens group G2 and one at the image side-surface of the positive lens element in the fourth lens group G4.

EXAMPLE 2

Figure 2A:
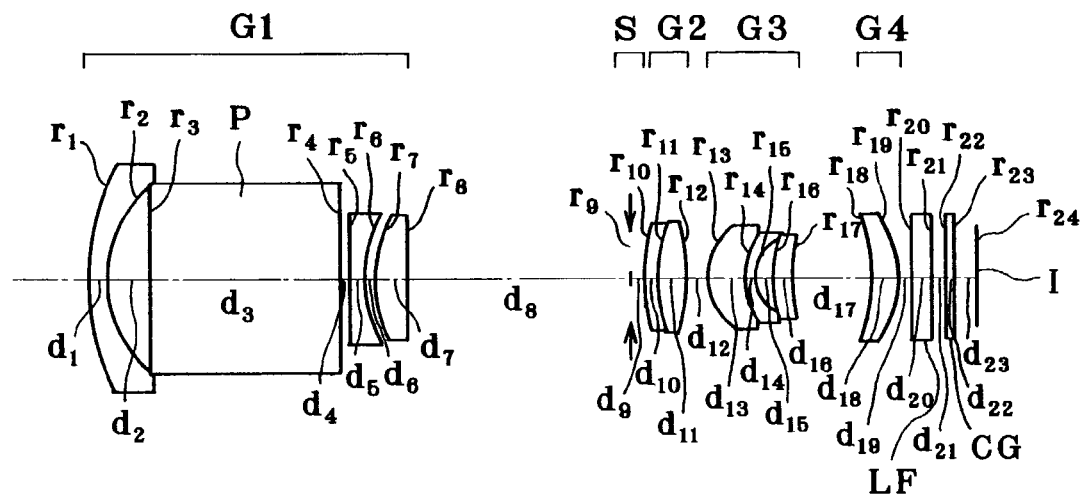
FIGS. 2(a), 2(b) and 2(c) are illustrative in section of Example 2 of the zoom lens, similar to FIGS. 1(a) to 1(c).
Figure 2B:
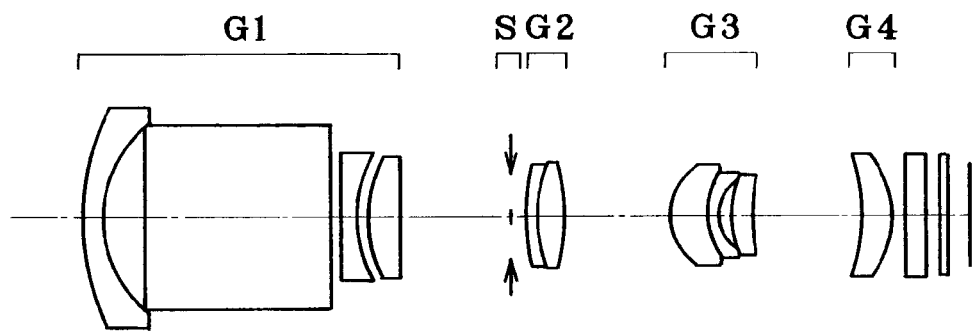
Figure 2C:
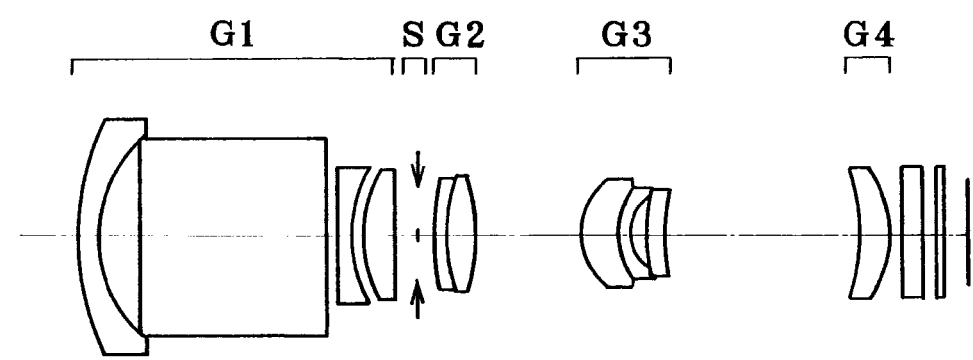

As shown in FIGS. 2(*a*), 2(*b*) and 2(*c*), Example 2 is directed to a zoom lens made up of a first lens group G1 consisting of a negative meniscus lens element convex on its object side, an optical path-bending prism P, a negative meniscus lens element convex on its object side and a positive meniscus lens element convex on its object side, an aperture stop S, a second lens group G2 composed of a doublet consisting of a negative meniscus lens element convex on its object side and a double-convex positive lens element, a third lens group G3 composed of a doublet consisting of a positive meniscus lens element convex on its object side and a negative meniscus lens element convex on its object side and a positive meniscus lens element convex on its object side, and a fourth lens group G4 composed of one positive meniscus lens element convex on its image side. Upon zooming from the wide-angle end to the telephoto end of the zoom lens, the first lens group G1 and the fourth lens group G4 remains fixed, the second lens group G2 moves together with the aperture stop S toward the object side of the zoom lens, and the third lens group G3 moves toward the object side while the spacing between the third and second lens groups G3 and G2 becomes wide. For focusing on a nearby subject, the third lens group G3 moves toward the object side.

Three aspheric surfaces are used; one at the image side-surface of the negative meniscus lens element located just after the optical path-bending prism P in the first lens group G1, one at the surface nearest to the object side in the third lens group G3, and one at the image side-surface of the positive meniscus lens element in the fourth lens group G4.

EXAMPLE 3

Figure 3A:
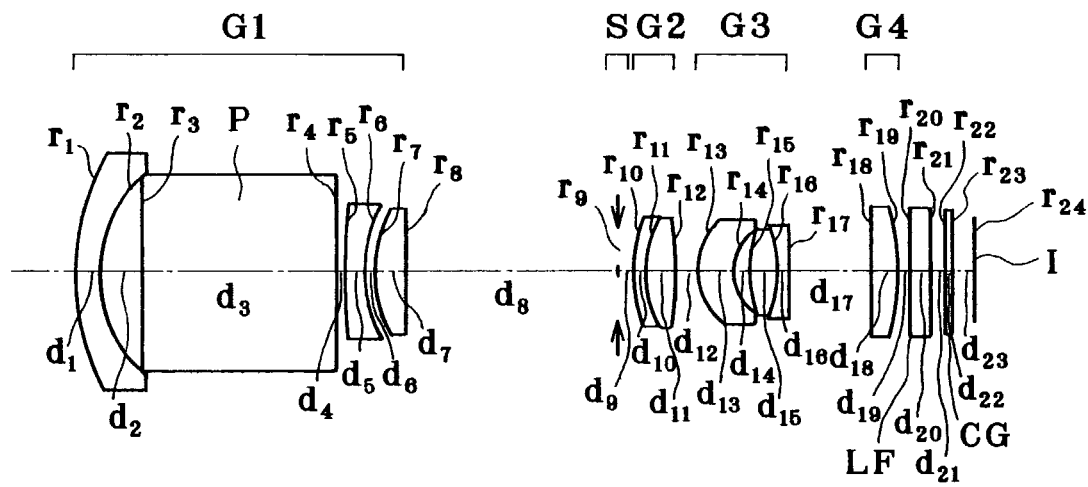
FIGS. 3(a), 3(b) and 3(c) are sections in schematic illustrative of Example 3 of the zoom lens, similar to FIGS. 1(a) to 1(c).
Figure 3B:
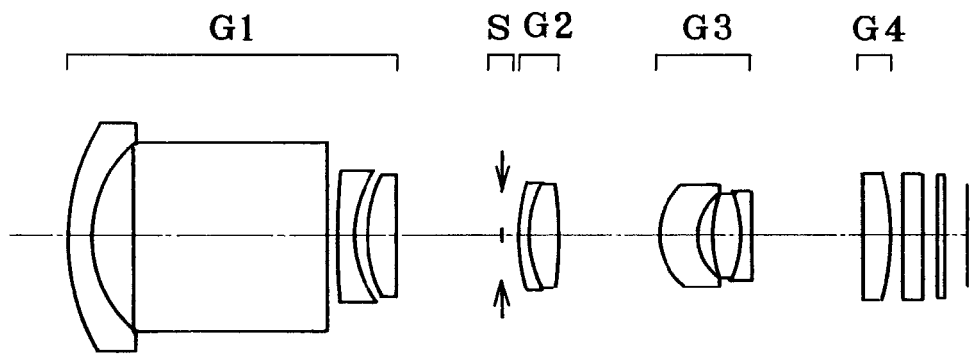
Figure 3C:
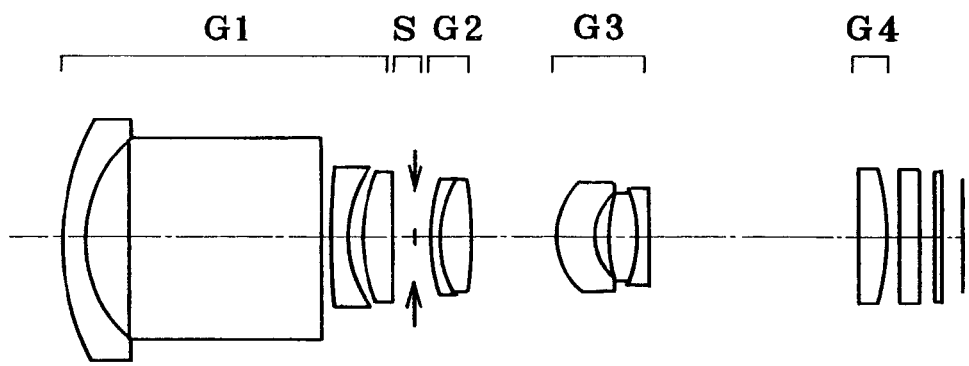

As shown in FIGS. 3(*a*), 3(*b*) and 3(*c*), Example 3 is directed to a zoom lens made up of a first lens group G1 composed of a negative meniscus lens element convex on its object side, an optical path-bending prism P, a negative meniscus lens element convex on its object side and a positive meniscus lens element convex on its object side, an aperture stop S, a second lens group G2 composed of a doublet consisting of a negative meniscus lens element convex on its object side and a double-convex positive lens element, a third lens group G3 composed of a meniscus lens element convex on its object side and a doublet consisting of a double-convex positive lens element and a negative meniscus lens element convex on its object side, and a fourth lens group G4 composed of one double-convex positive lens element. Upon zooming from the wide-angle end to the telephoto end of the zoom lens, the first lens group G1 and the fourth lens group G4 remain fixed, the second lens group G2 moves together with the aperture stop S toward the object side of the zoom lens, and the third lens group G3 moves toward the object side while the spacing between the third and second lens groups G3 and G2 becomes wide and then narrow. For focusing on a nearby subject, the third lens group G3 moves toward the object side.

Three aspheric surfaces are used; one at the image side-surface of the negative meniscus lens element located just after the optical path-bending prism P in the first lens group G1, one at the surface nearest to the object side in the third lens group G3 and one at the image side-surface of the double-convex positive lens element in the fourth lens group G4.

EXAMPLE 4

Figure 4A:
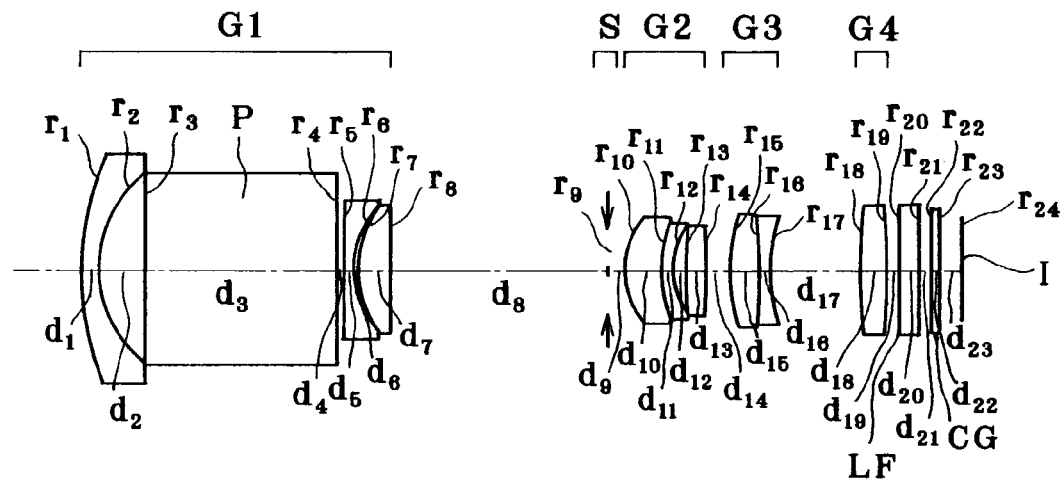
FIGS. 4(a), 4(b) and 4(c) are illustrative in section of Example 4 of the zoom lens, similar to FIGS. 1(a) to 1(c).
Figure 4B:
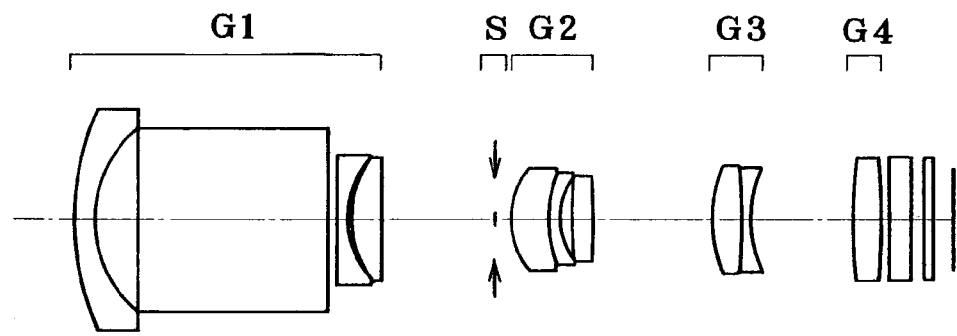
Figure 4C:
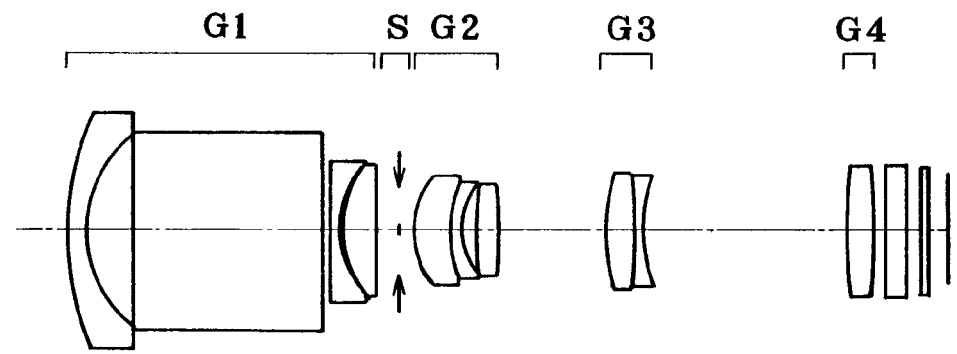

As shown in FIGS. 4(*a*), 4(*b*) and 4(*c*), Example 4 is directed to a zoom lens made up of a first lens group G1 composed of a negative meniscus lens element convex on its object side, an optical path-bending prism P, a negative meniscus lens element convex on its object side and a positive meniscus lens element convex on its object side, an aperture stop S, a second lens group G2 composed of a doublet consisting of a positive meniscus lens element convex on its object side and a negative meniscus lens element convex on its object side and a double-convex positive lens element, a third lens group G3 composed of a doublet consisting of a double-convex positive lens element and a double-concave negative lens element and a fourth lens group G4 composed of one double-convex positive lens element. Upon zooming from the wide-angle end to the telephoto end of the zoom lens, the first lens group G1 and the fourth lens group G4 remain fixed, the second lens group G2 moves together with the aperture stop S toward the object side of the zoom lens, and the third lens group G3 moves toward the object side while the spacing between the third and second lens groups G3 and G2 becomes wide and then narrow. For focusing on a nearby subject, the third lens group G3 moves toward the object side.

Three aspheric surfaces are used; one at the image side-surface of the negative meniscus lens element located just after the optical path-bending prism P in the first lens group G1, one at the surface nearest to the object side in the second lens group G2 and one at the image side-surface of the double-convex positive lens element in the fourth lens group G4.

EXAMPLE 5

Figure 5A:
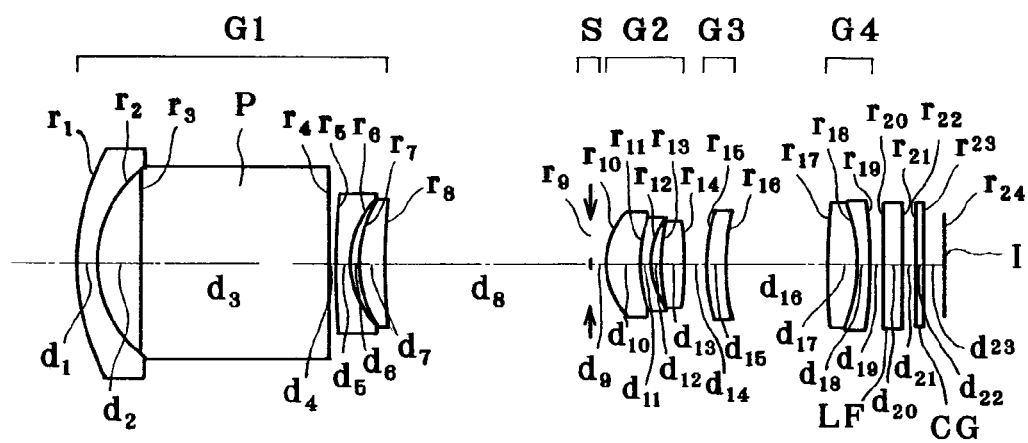
FIGS. 5(a), 5(b) and 5(c) are illustrative in section of Example 5 of the zoom lens, similar to FIGS. 1(a) to 1(c).
Figure 5B:
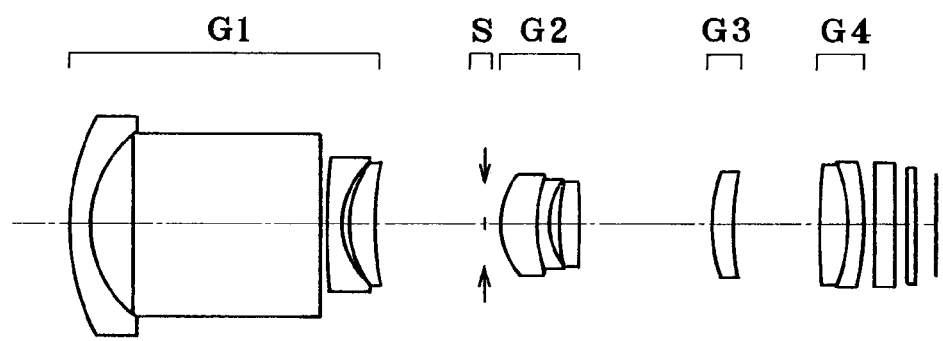
Figure 5C:
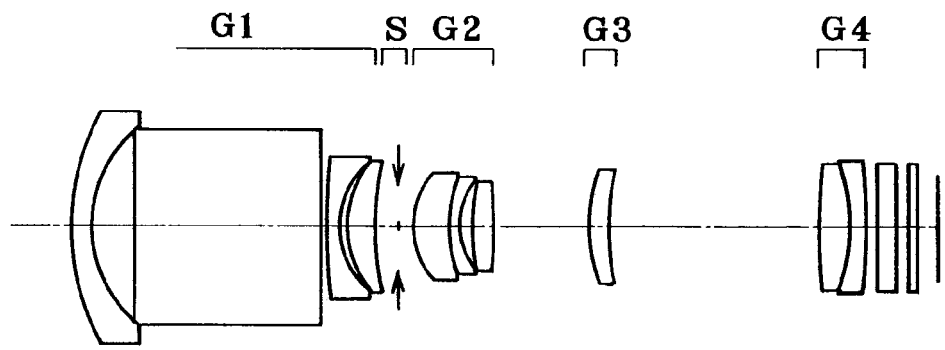

As shown in FIGS. 5(a), 5(b) and 5(c), Example 5 is directed to a zoom lens made up of a first lens group G1 composed of a negative meniscus lens element convex on its object side, an optical path-bending prism P, a negative meniscus lens element convex on its object side and a positive meniscus lens element convex on its object side, an aperture stop S, a second lens group G2 composed of a doublet consisting of a positive meniscus lens element convex on its object side and a negative meniscus lens element convex on its object side and a double-convex positive lens element, a third lens group G3 composed of one positive meniscus lens element convex on its object side, and a fourth lens group G4 composed of a doublet consisting of a double-convex positive lens element and a negative meniscus lens element convex on its image side. Upon zooming from the wide-angle end to the telephoto end of the zoom lens, the first lens group G1 and the fourth lens group G4 remain fixed, the second lens group G2 moves together with the aperture stop S toward the object side of the zoom lens, and the third lens group G3 moves toward the image plane side of the zoom lens while the spacing between the third and second lens groups G3 and G2 becomes wide, whereupon it moves toward the object side while that spacing becomes narrow. For focusing on a nearby subject, the third lens group G3 moves toward the object side.

Four aspheric surfaces are used; one at the image side-surface of the negative meniscus lens element located just after the optical path-bending prism P in the first lens group G1, one at the surface nearest to the object side in the second lens group G2, one at the object side-surface of the positive meniscus lens element in the third lens group G3 and one at the surface nearest to the object side in the fourth lens group G4.

EXAMPLE 6

Figure 6A:
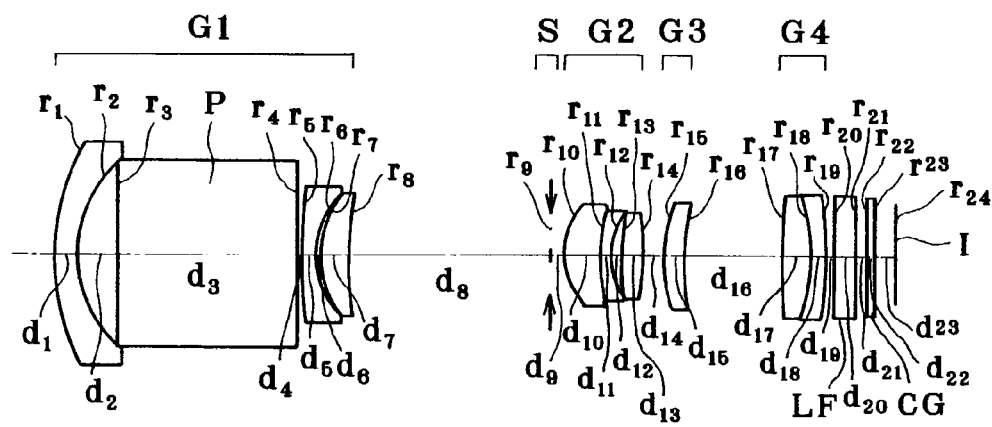
FIGS. 6(a), 6(b) and 6(c) are illustrative in section of Example 6 of the zoom lens, similar to FIGS. 1(a) to 1(c).
Figure 6B:
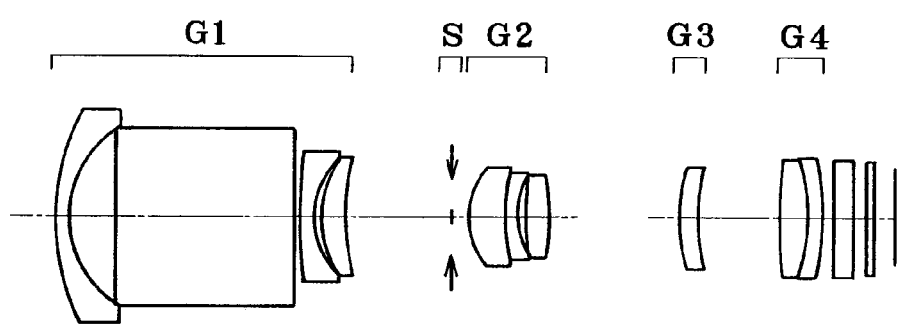
Figure 6C:
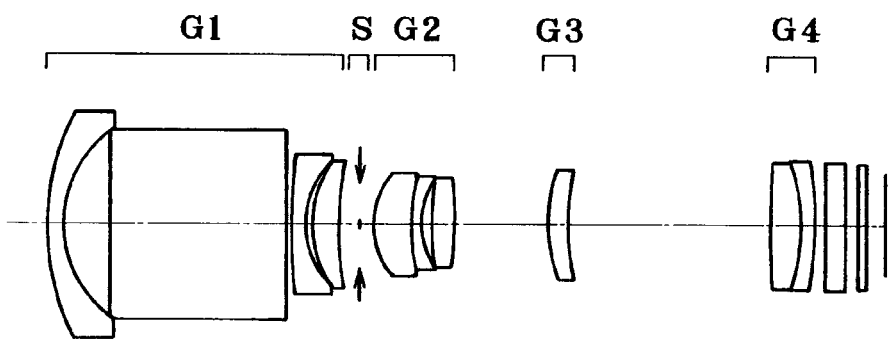

As shown in FIGS. 6(a), 6(b) and 6(c), Example 6 is directed to a zoom lens made up of a first lens group G1 composed of a negative meniscus lens element convex on its object side, an optical path-bending prism P, a negative meniscus lens element convex on its object side and a positive meniscus lens element convex on its object side, an aperture stop S, a second lens group G2 composed of a doublet consisting of a positive meniscus lens element on its object side and a negative meniscus lens element convex on its object side and a double-convex positive lens element, a third lens group G3 composed of one positive meniscus lens element convex on its object side, and a fourth lens group G4 composed of a doublet consisting of a double-convex positive lens element and a negative meniscus lens element convex on its image side. Upon zooming from the wide-angle end to the telephoto end of the zoom lens, the first lens group G1 and the fourth lens group G4 remain fixed, the second lens group G2 moves together with the aperture stop S toward the object side of the zoom lens, and the third lens group G3 moves toward the image plane side of the zoom lens while the spacing between the third and second lens groups G3 and G2 becomes wide, whereupon it moves toward the object side while that spacing becomes narrow. For focusing on a nearby subject, the third lens group G3 moves toward the object side.

Three aspheric surfaces are used; one at the image plane side-surface of the negative meniscus lens element located just after the optical path-bending prism P in the first lens group G1, one at the surface nearest to the object side in the second lens group G2, and one at the surface nearest to the object side in the fourth lens group G4.

EXAMPLE 7

Figure 7A:
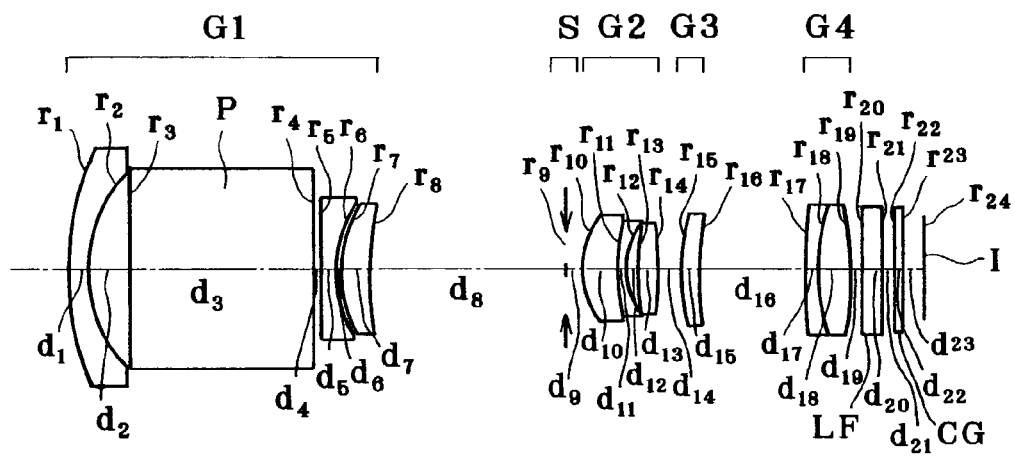
FIGS. 7(a), 7(b) and 7(c) are illustrative in section of Example 7 of the zoom lens, similar to FIGS. 1(a) to 1(c).
Figure 7B:
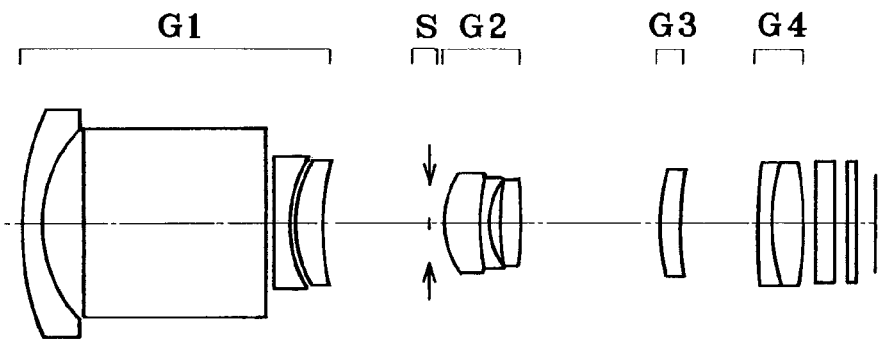
Figure 7C:
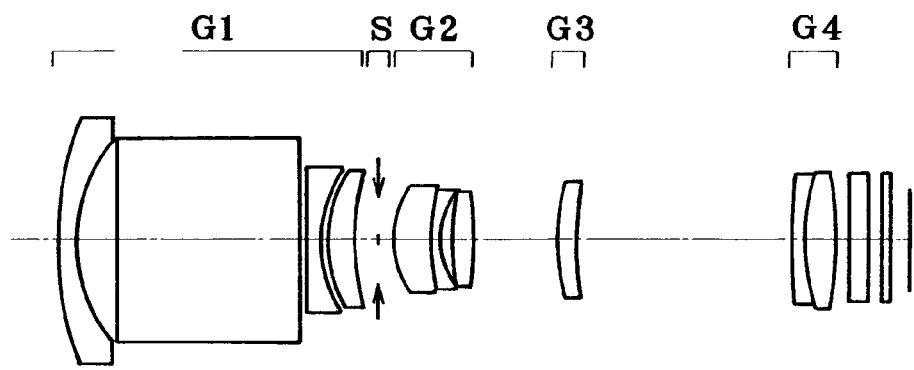

As shown in FIGS. 7(a), 7(b) and 7(c), this example is directed to a zoom lens made up of a first lens group G1 composed of a negative meniscus lens element convex on its object side, an optical path-bending prism P, a negative meniscus lens element convex on its object side and a positive meniscus lens element convex on its object side, an aperture stop S, a second lens group G2 composed of a doublet consisting of a positive meniscus lens element convex on its object side and a negative meniscus lens element convex on its object side and a double-convex positive lens element, a third lens group G3 composed of one positive meniscus lens element convex on its object side and a fourth lens group G4 composed of a doublet consisting of negative meniscus lens element convex on its object side and a double-convex positive lens element. Upon zooming from the wide-angle end to the telephoto end of the zoom lens, the first lens group G1 and the fourth lens group G4 remain fixed, the second lens group G2 moves together with the aperture stop S toward the object side of the zoom lens, and the third lens group G3 moves toward the image plane side of the zoom lens while the spacing between the third and second lens groups G3 and G2 becomes wide, whereupon it moves toward the object side while that spacing becomes narrow. For focusing on a nearby subject, the third lens group G3 moves toward the object side.

Three aspheric surfaces are used; one at the image plane side-surface of the negative meniscus lens element nearest to the object side in the first lens group G1, one at the surface nearest to the object side in the second lens group G2, and one at the surface nearest to the image plane side surface in the fourth lens group G4.

EXAMPLE 8

Figure 8A:
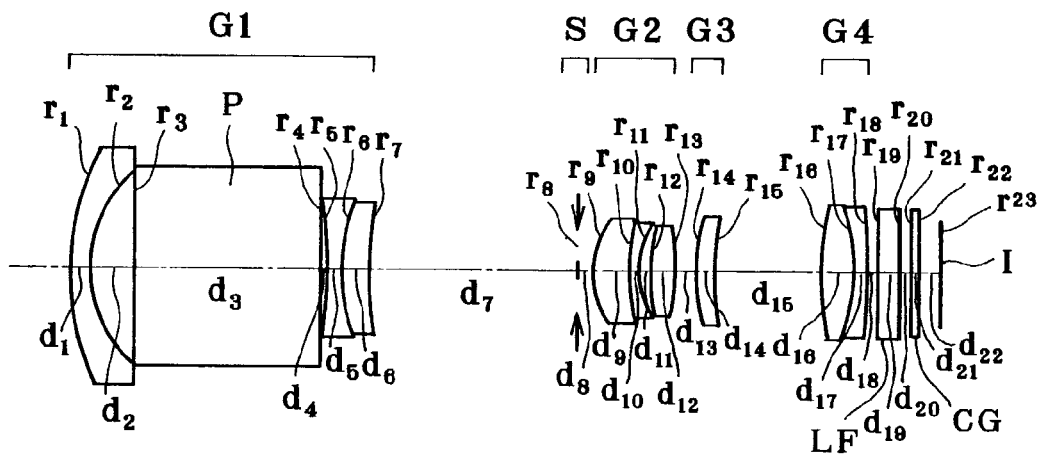
FIGS. 8(a), 8(b) and 8(c) are illustrative in section of Example 8 of the zoom lens, similar to FIGS. 1(a) to 1(c).
Figure 8B:
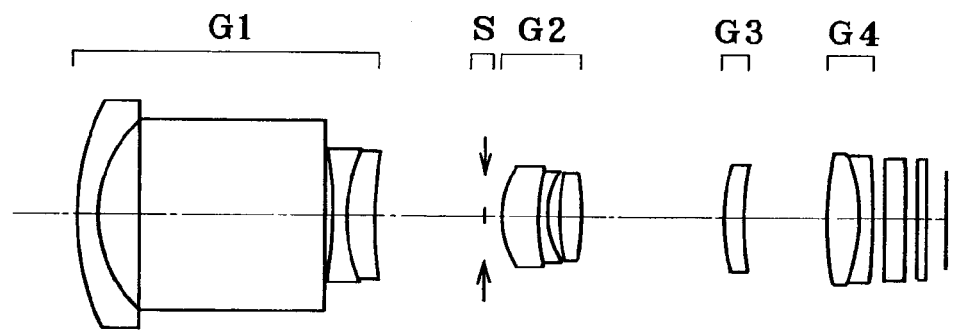
Figure 8C:
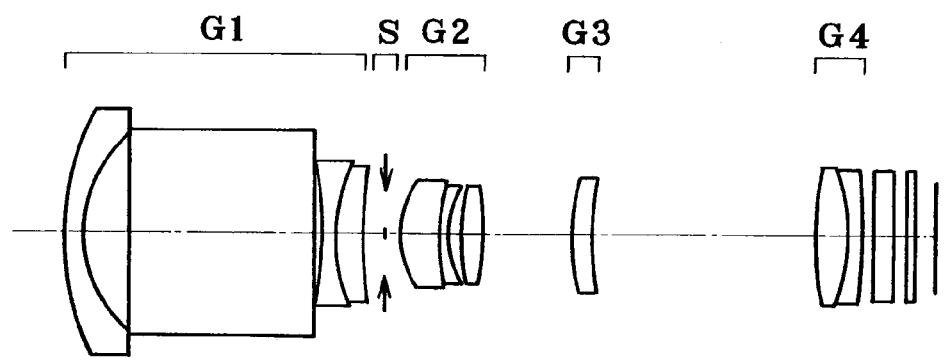

As shown in FIGS. 8(a), 8(b) and 8(c), this example is directed to a zoom lens made up of a first lens group G1 composed of a negative meniscus lens element convex on its object side, an optical path-bending prism P and a doublet consisting of a double-concave negative lens element and a positive meniscus lens element convex on its object side, an aperture stop S, a second lens group G2 composed of a doublet consisting of a positive meniscus lens element convex on its object side and a negative meniscus lens element convex on its object side and a double-convex positive lens element, a third lens group G3 composed of one positive meniscus lens element convex on its object side and a fourth lens group G4 composed of a doublet consisting of a double-convex positive lens element and a negative meniscus lens element convex on its image plane side. Upon zooming from the wide-angle end to the telephoto end of the zoom lens, the first lens group G1 and the fourth lens group G4 remain fixed, the second lens group G2 moves together with the aperture stop S toward the object side of the zoom lens, and the third lens group G3 moves toward the image plane side of the zoom lens while the spacing between the third and second lens groups G3 and G2 becomes wide, whereupon it moves toward the object side while that spacing becomes narrow. For focusing on a nearby subject, the third lens group G3 moves toward the object side.

Three aspheric surfaces are used; one at the image plane side-surface of the negative meniscus lens element in the first lens group G1, one at the surface nearest to the object side in the second lens group G2, and one at the surface nearest to the object side in the fourth lens group G4.

EXAMPLE 9

Figure 9A:
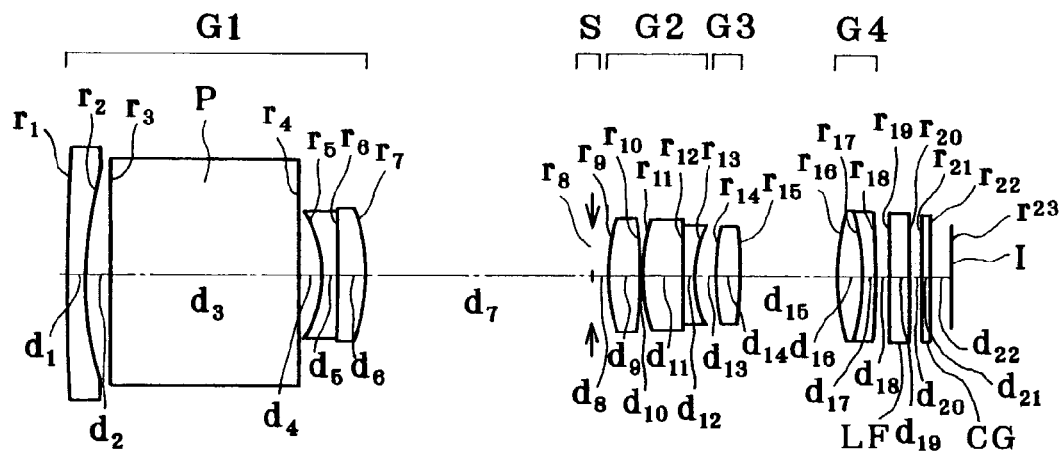
FIGS. 9(a), 9(b) and 9(c) are illustrative in section of Example 9 of the zoom lens, similar to FIGS. 1(a) to 1(c).
Figure 9B:
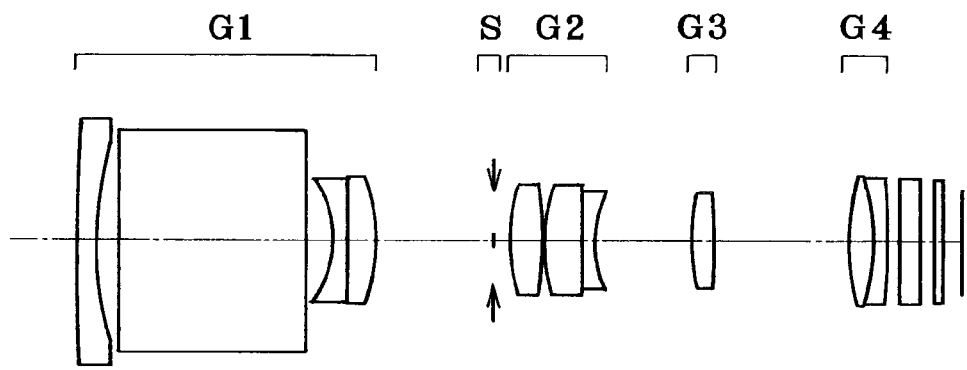
Figure 9C:
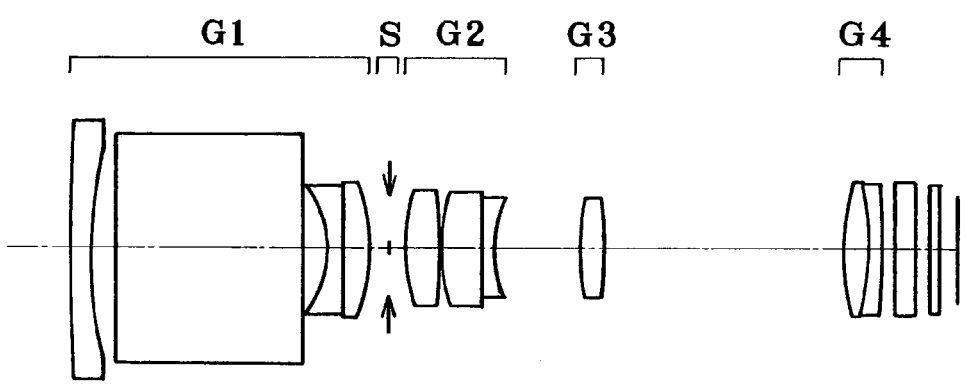

As shown in FIGS. 9(a), 9(b) and 9(c), this example is directed to a zoom lens made up of a first lens group G1 composed of a negative meniscus lens element convex on its object side, an optical path-bending prism P and a doublet consisting of a negative meniscus lens element convex on its image plane side and a positive meniscus lens element convex on its image plane side, an aperture stop S, a second lens group G2 composed of a double-convex positive lens element and a doublet consisting of a plano-convex positive lens element and a planoconcave negative lens element, a third lens group G3 composed of one double-convex positive lens element and a fourth lens group G4 composed of a doublet consisting of a double-convex positive lens element and a negative meniscus lens element convex on its image plane side. Upon zooming from the wide-angle end to the telephoto end of the zoom lens, the first lens group G1 and the fourth lens group G4 remain fixed, the second lens group G2 moves together with the aperture stop S toward the object side of the zoom lens, and the third lens group G3 moves toward the object side of the zoom lens the spacing between the third and second lens groups G3 and G2 becomes wide and then narrow. For focusing on a nearby subject, the third lens group G3 moves toward the object side.

Three aspheric surfaces are used; one at the image plane side-surface of the negative meniscus lens element nearest to the object side in the first lens group G1, one at the surface nearest to the object side in the second lens group G2, and one at the surface nearest to the object side in the fourth lens group G4.

EXAMPLE 10

Figure 10A:
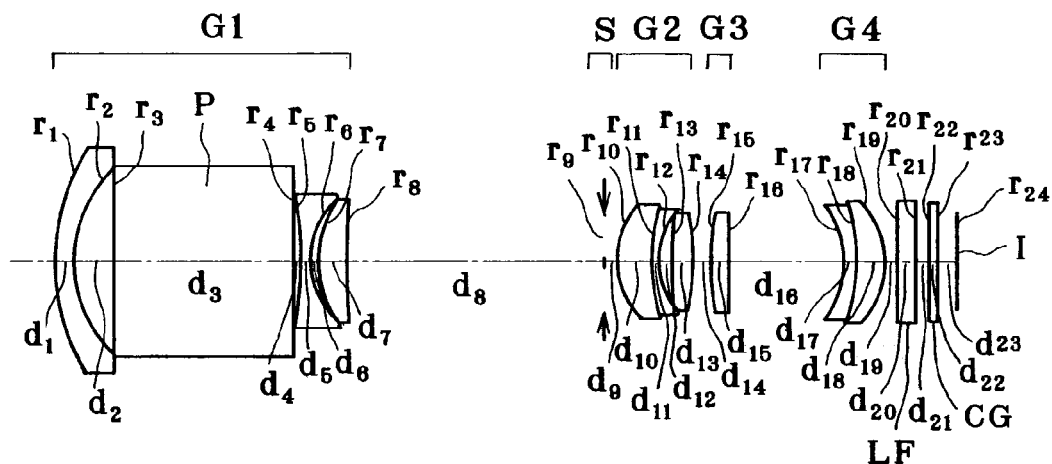
FIGS. 10(a), 10(b) and 10(c) are illustrative in section of Example 10 of the zoom lens, similar to FIGS. 1(a) to 1(c).
Figure 10B:
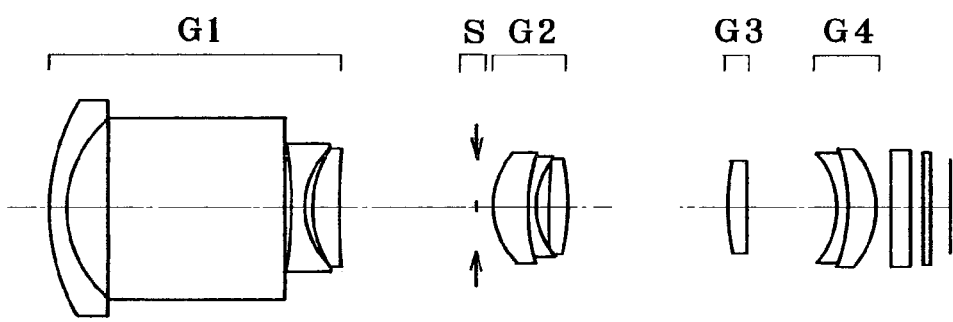
Figure 10C:
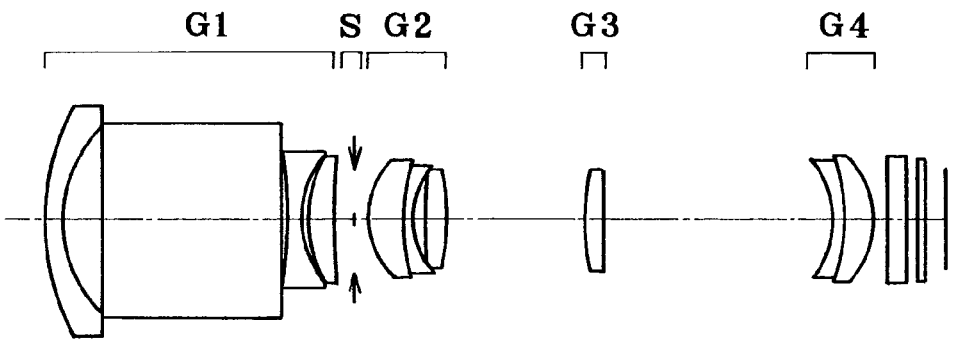

As shown in FIGS. 10(a), 10(b) and 10(c), the instant example is directed to a zoom lens made up of a first lens group G1 composed of a negative meniscus lens element convex on its object side, an optical path-bending prism P, a double-concave lens element and a positive meniscus lens element convex on its object side, an aperture stop S, a second lens group G2 composed of a doublet consisting of a positive meniscus lens element convex on its object side and a negative meniscus lens element convex on its object side and a double-convex positive lens element, a third lens group G3 composed of one positive meniscus lens element convex on its object side and a fourth lens group G4 composed of a doublet consisting of a negative meniscus lens element convex on its image plane side and a positive meniscus lens element convex on its image plane side. Upon zooming from the wide-angle end to the telephoto end of the zoom lens, the first lens group G1 and the fourth lens group G4 remain fixed, the second lens group G2 moves together with the aperture stop S toward the object side of the zoom lens, and the third lens group G3 moves toward the image plane side of the zoom lens while the spacing between the third and second lens groups G3 and G2 becomes wide, whereupon it moves toward the object side while that spacing becomes narrow. For focusing on a nearby subject, the third lens group G3 moves toward the object side.

Four aspheric surfaces are used; one at the image plane side-surface of the double-concave negative lens element located just after the optical path-bending prism P in the first lens group G1, one at the surface nearest to the object side in the second lens group G2, one at the object side-surface of the doublet in the third lens group G3 and one at the surface nearest to the image plane side in the fourth lens group G4.

EXAMPLE 11

Figure 11A:
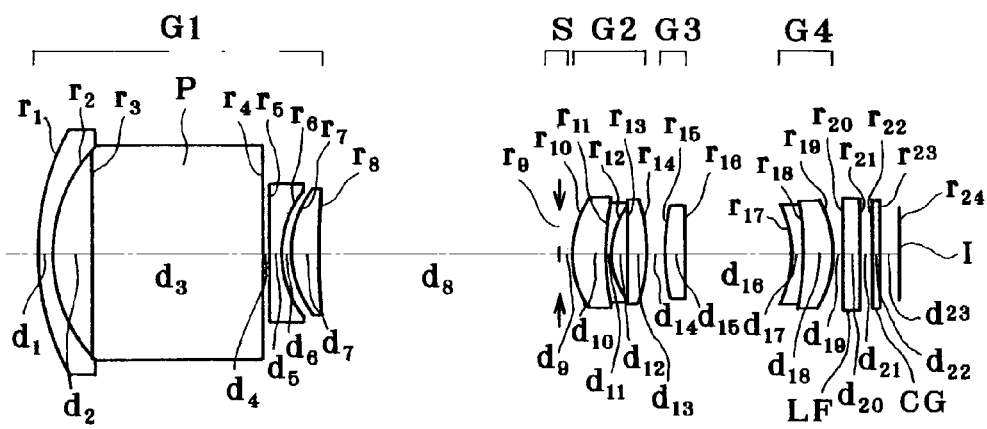
FIGS. 11(a), 11(b) and 11(c) are illustrative in section of Example 11 of the zoom lens, similar to FIGS. 1(a) to 1(c).
Figure 11B:
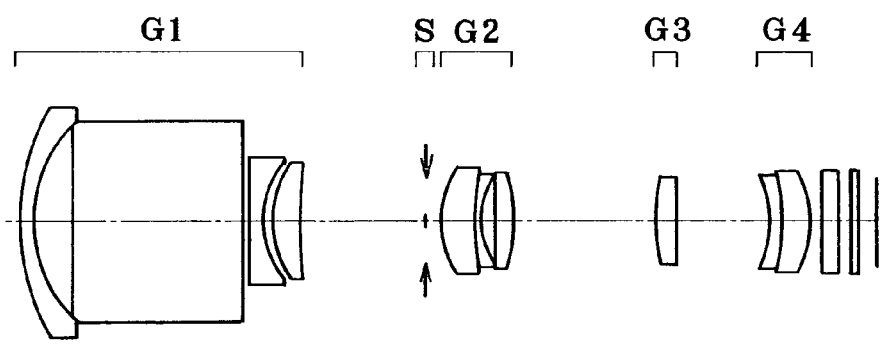
Figure 11C:
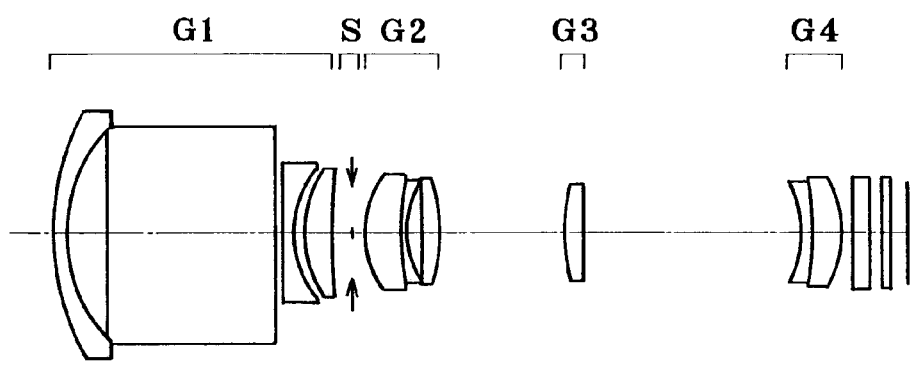

As shown in FIGS. 11(a), 11(b) and 11(c), the instant example is directed to a zoom lens made up of a first lens group G1 composed of a negative meniscus lens element convex on its object side, an optical path-bending prism P, a double-concave negative lens element and a positive meniscus lens element convex on its object side, an aperture stop S, a second lens group G2 composed of a doublet consisting of a positive meniscus lens element convex on its object side and a negative meniscus lens element convex on its object side and a double-convex positive lens element, a third lens group G3 composed of one positive meniscus lens element convex on its object side and a fourth lens group G4 composed of a doublet consisting of a negative meniscus lens element convex on its image plane side and a positive meniscus lens element convex on its image plane side. Upon zooming from the wide-angle end to the telephoto end of the zoom lens, the first lens group G1 and the fourth lens group G4 remain fixed, the second lens group G2 moves together with the aperture stop S toward the object side of the zoom lens, and the third lens group G3 moves toward the image plane side of the zoom lens while the spacing between the third and second lens groups G3 and G2 becomes wide, whereupon it moves toward the object side while that spacing becomes narrow. For focusing on a nearby subject, the third lens group G3 moves toward the object side.

Four aspheric surfaces are used; two at both surfaces of the double-concave lens element located just after the optical path-bending prism P in the first lens group G1, one at the surface nearest to the object side in the second lens group G2 and one at the surface nearest to the image plane side in the fourth lens group G4.

EXAMPLE 12

Figure 12A:
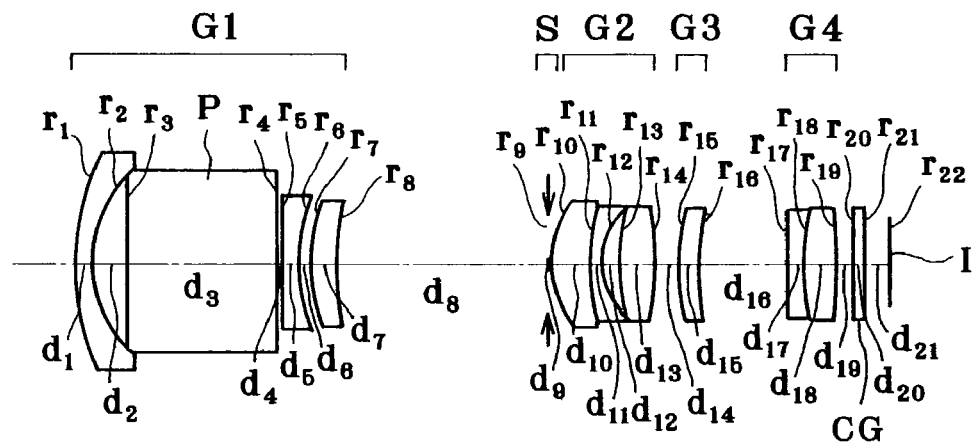
FIGS. 12(a), 12(b) and 12(c) are illustrative in section of Example 12 of the zoom lens, similar to FIGS. 1(a) to 1(c).
Figure 12B:
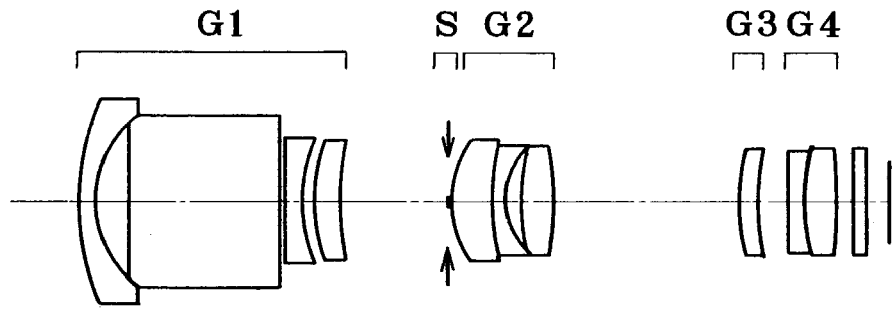
Figure 12C:
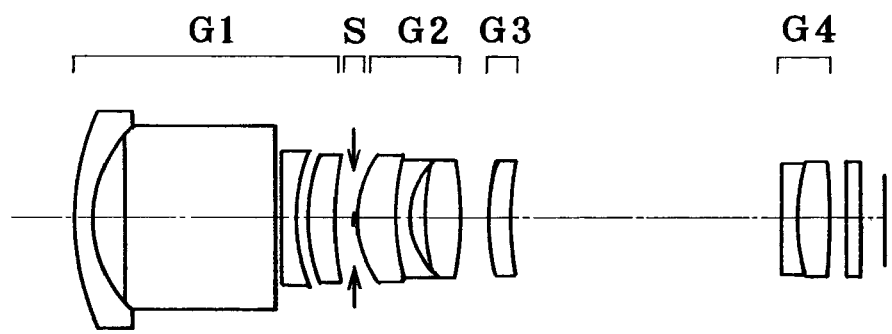

As shown in FIGS. 12(a), 12(b) and 12(c), the instant example is directed to a zoom lens made up of a first lens group G1 composed of a negative meniscus lens element convex on its object side, an optical path-bending prism P, a double-concave negative lens element and a positive meniscus lens element convex on its object side, an aperture stop S, a second lens group G2 composed of a doublet consisting of a positive meniscus lens element convex on its object side and a negative meniscus lens element convex on its object side and a double-convex positive lens element, a third lens group G3 composed of one positive meniscus lens element convex on its object side and a fourth lens group G4 composed of a doublet consisting of a negative meniscus lens element convex o its object side and a double-convex positive lens element. Upon zooming from the wide-angle end to the telephoto end of the zoom lens, the first lens group G1 and the fourth lens group G4 remain fixed, the second lens group G2 moves together with the aperture stop S toward the object side of the zoom lens, and the third lens group G3 moves toward the image plane side of the zoom lens while the spacing between the third and second lens groups G3 and G2 becomes wide, whereupon it moves toward the object side while that spacing becomes narrow. For focusing on a nearby subject, the third lens group G3 moves toward the object side.

Three aspheric surfaces are used; one at the image plane side-surface of the negative meniscus lens element in the first lens group G1, one at the surface nearest to the object side in the second lens group G2 and one at the surface nearest to the image plane side in the fourth lens group G4.

In Examples 1 to 12, the first lens group G1 corresponds to the lens group A in the present invention and the second lens group G2 to the lens group B in the present invention.

EXAMPLE 13

Figure 13A:
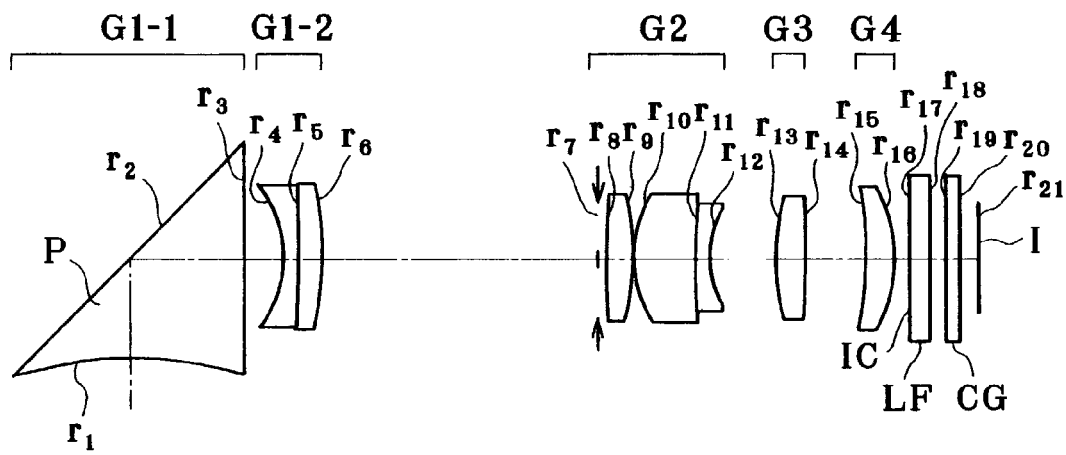
FIGS. 13(a), 13(b) and 13(c) are illustrative in section of Example 13 of the zoom lens, similar to FIGS. 1(a) to 1(c).
Figure 13B:
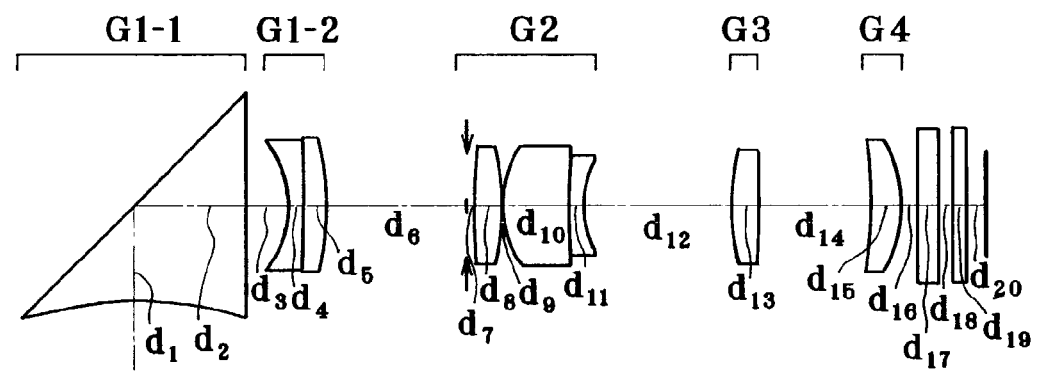
Figure 13C:
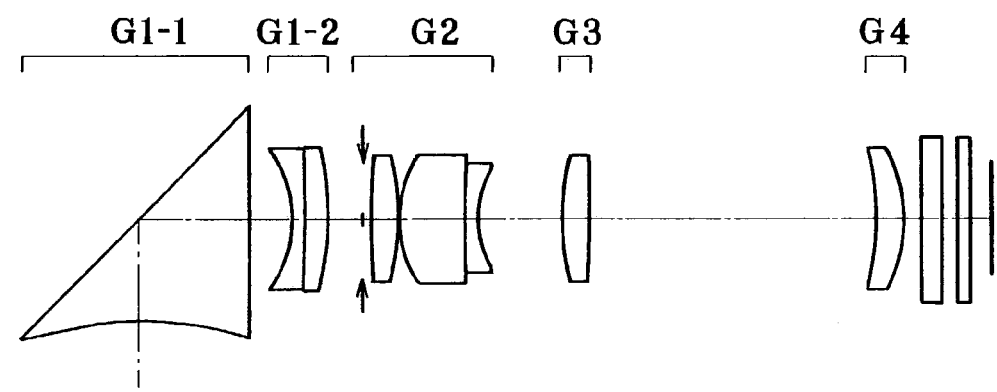

As shown in FIGS. 13(a), 13(b) and 13(c), the instant example is directed to a zoom lens made up of a 1-1st lens group G1-1 composed of an optical path-bending prism P equivalent to a planoconcave lens element, a 1-2nd lens group G1-2 composed of a doublet consisting of a negative meniscus lens element concave on its object side and a positive meniscus lens element concave on its object side, a second lens group G2 composed of an aperture stop, a double-convex positive lens element and a doublet consisting of a positive meniscus lens element convex on its object side and a negative meniscus lens element convex on its object side, a third lens group G3 composed of a double-convex positive lens element and a fourth lens group G4 composed of a positive meniscus lens element convex on its image plane side. Upon zooming from the wide-angle end to the telephoto end of the zoom lens, the second lens group G2 and the third lens group G3 move toward the object side of the zoom lens while the spacing between them becomes wide and then narrow.

Three aspheric surfaces are used; one at the object side-surface of the optical path-bending prism P in the 1-1st lens group G1-1, one at the surface nearest to the object side in the second lens group G2 and one at the image plane side-surface of the positive meniscus lens element in the fourth lens group G4.

In Example 13, the 1-1st and 1-2nd lens groups G1-1 and G1-2 correspond to the lens group A in the present invention and the second lens group G2 to the lens group B in the present invention.

Example 13 is also directed to the fifth zoom lens according to the present invention, wherein $\beta_{Rf}=-1.36309$. The fifth zoom lens of the present invention also includes an arrangement wherein the first lens group consists of an optical path-bending prism A1 having a concave transmitting surface directed toward the object side of the zoom lens and a subgroup A2 comprising at least a positive lens element.

The numerical data on each example are given below. Symbols used hereinafter but not hereinbefore have the following meanings:

f: focal length of the zoom lens
$F_{NO}$: F-number
2ω half angle of view
WE: wide-angle end
ST: intermediate state
TE: telephoto end
$r_1, r_2, \ldots$ : radius of curvature of each lens surface
$d_1, d_2, \ldots$ : spacing between the adjacent lens surfaces
$n_{d1}, n_{d2}, \ldots$ : d-line refractive index of each lens element
$V_{d1}, V_{d2}, \ldots$ : Abbe number of each lens element Here let x be an optical axis on condition that the direction of propagation of light is positive and y be a direction perpendicular to the optical axis. Then, aspheric configuration is given by $$x=(y^2/r)/[1+\{1-(K+1)(y/r)^2\}^{1/2}]+A_4y^4+A_6y^6+A_8y^8+A_{10}y^{10}$$

where r is a paraxial radius of curvature, K is a conical coefficient, and $A_4$, $A_6$, $A_8$ and $A_{10}$ are the fourth, sixth, eighth and tenth aspheric coefficients, respectively.

EXAMPLE 1

| | | | |
|---|---|---|---|
| $r_1 = 14.8444$ | $d_1 = 1.2000$ | $n_{d1} = 1.80610$ | $v_{d1} = 40.92$ |
| $r_2 = 7.9462$ | $d_2 = 2.9000$ | | |
| $r_3 = \infty$ | $d_3 = 12.5000$ | $n_{d2} = 1.78590$ | $v_{d2} = 44.20$ |
| $r_4 = \infty$ | $d_4 = 0.4100$ | | |
| $r_5 = -29.2456$ | $d_5 = 1.0000$ | $n_{d3} = 1.80610$ | $v_{d3} = 40.92$ |
| $r_6 = 9.2661$ (Aspheric) | $d_6 = 1.0000$ | | |
| $r_7 = 15.5357$ | $d_7 = 1.8200$ | $n_{d4} = 1.71736$ | $v_{d4} = 29.52$ |
| $r_8 = -23.5495$ | $d_8 =$ (Variable) | | |
| $r_9 = \infty$(Stop) | $d_9 = 1.0000$ | | |
| $r_{10} = 8.5761$ (Aspheric) | $d_{10} = 2.3000$ | $n_{d5} = 1.80610$ | $v_{d5} = 40.92$ |
| $r_{11} = -36.3441$ | $d_{11} = 0.1500$ | | |
| $r_{12} = 15.2953$ | $d_{12} = 2.7000$ | $n_{d6} = 1.69350$ | $v_{d6} = 53.21$ |
| $r_{13} = -15.0000$ | $d_{13} = 0.8000$ | $n_{d7} = 1.80518$ | $v_{d7} = 25.42$ |
| $r_{14} = 5.3453$ | $d_{14} =$ (Variable) | | |
| $r_{15} = 16.7201$ | $d_{15} = 1.6000$ | $n_{d8} = 1.48749$ | $v_{d8} = 70.23$ |
| $r_{16} = -486.1483$ | $d_{16} =$ (Variable) | | |
| $r_{17} = 28.4526$ | $d_{17} = 1.7000$ | $n_{d9} = 1.58313$ | $v_{d9} = 59.38$ |
| $r_{18} = -34.4702$ (Aspheric) | $d_{18} = 0.6600$ | | |
| $r_{19} = \infty$ | $d_{19} = 1.4400$ | $n_{d10} = 1.54771$ | $v_{d10} = 62.84$ |
| $r_{20} = \infty$ | $d_{20} = 0.8000$ | | |
| $r_{21} = \infty$ | $d_{21} = 0.6000$ | $n_{d11} = 1.51633$ | $v_{d11} = 64.14$ |
| $r_{22} = \infty$ | $d_{22} = 1.3598$ | | |
| $r_{23} = \infty$ (Image Plane) | | | |

Aspherical Coefficients
  6th Surface
  K=0
  $A_4=-3.5636\times10^{-4}$
  $A_6=5.2749\times10^{-6}$
  $A_8=-2.9541\times10^{-7}$
  $A_{10}=5.5683\times10^{-9}$ 10th Surface
K=0
$A_4=-2.3319\times10^{-4}$
$A_6=-9.0916\times10^{-7}$
$A_8=-3.8758\times10^{-8}$
$A_{10}=0.0000$
18th Surface
K=0
$A_4=4.8568\times10^{-4}$
$A_6=-3.3258\times10^{-5}$
$A_8=1.7328\times10^{-6}$
$A_{10}=-3.3044\times10^{-8}$ Zooming Data (∞)

|  | WE | ST | TE |
|---|---|---|---|
| f (mm) | 6.00491 | 9.33131 | 14.49908 |
| $F_{NO}$ | 2.8494 | 3.6391 | 4.5331 |
| 2ω (°) | 32.7 | 21.4 | 13.9 |
| $d_8$ | 14.59760 | 7.77126 | 1.49983 |
| $d_{14}$ | 1.99990 | 7.34104 | 5.91654 |
| $d_{16}$ | 5.46534 | 6.96338 | 14.64643 |

EXAMPLE 2

| $r_1 = 18.3518$ | $d_1 = 1.2000$ | $n_{d1} = 1.78590$ | $v_{d1} = 44.20$ |
|---|---|---|---|
| $r_2 = 8.4466$ | $d_2 = 2.9000$ | | |
| $r_3 = \infty$ | $d_3 = 12.5000$ | $n_{d2} = 1.78590$ | $v_{d2} = 44.20$ |
| $r_4 = \infty$ | $d_4 = 0.5000$ | | |
| $r_5 = 1113.2775$ | $d_5 = 1.0000$ | $n_{d3} = 1.74320$ | $v_{d3} = 49.34$ |
| $r_6 = 8.4738$ (Aspheric) | $d_6 = 0.8000$ | | |
| $r_7 = 10.8733$ | $d_7 = 2.0000$ | $n_{d4} = 1.72825$ | $v_{d4} = 28.46$ |
| $r_8 = 156.2997$ | $d_8 = $ (Variable) | | |
| $r_9 = \infty$(絞り) | $d_9 = 1.0000$ | | |
| $r_{10} = 17.7870$ | $d_{10} = 0.7000$ | $n_{d5} = 1.84666$ | $v_{d5} = 23.78$ |
| $r_{11} = 9.5000$ | $d_{11} = 2.0000$ | $n_{d6} = 1.53172$ | $v_{d6} = 48.84$ |
| $r_{12} = -16.0207$ | $d_{12} = $ (Variable) | | |
| $r_{13} = 4.2286$ (Aspheric) | $d_{13} = 2.5000$ | $n_{d7} = 1.69350$ | $v_{d7} = 53.21$ |
| $r_{14} = 5.4000$ | $d_{14} = 0.7000$ | $n_{d8} = 1.84666$ | $v_{d8} = 23.78$ |
| $r_{15} = 3.0911$ | $d_{15} = 0.9300$ | | |
| $r_{16} = 7.7824$ | $d_{16} = 1.5000$ | $n_{d9} = 1.51633$ | $v_{d9} = 64.14$ |
| $r_{17} = 15.1208$ | $d_{17} = $ (Variable) | | |
| $r_{18} = -12.0255$ | $d_{18} = 1.8000$ | $n_{d10} = 1.51633$ | $v_{d10} = 64.14$ |
| $r_{19} = -6.7836$ (Aspheric) | $d_{19} = 0.6600$ | | |
| $r_{20} = \infty$ | $d_{20} = 1.4400$ | $n_{d11} = 1.54771$ | $v_{d11} = 62.84$ |
| $r_{21} = \infty$ | $d_{21} = 0.8000$ | | |
| $r_{22} = \infty$ | $d_{22} = 0.6000$ | $n_{d12} = 1.51633$ | $v_{d12} = 64.14$ |
| $r_{23} = \infty$ | $d_{23} = 1.3603$ | | |
| $r_{24} = \infty$ (Image Plane) | | | |

Aspherical Coefficients
6th Surface
K=0
$A_4=-1.2289\times10^{-4}$
$A_6=-5.3381\times10^{-6}$
$A_8=8.7422\times10^{-8}$
$A_{10}=-3.3652\times10^{-11}$
13th Surface
K=0
$A_4=-1.9805\times10^{-4}$
$A_6=-2.8934\times10^{-5}$
$A_8=1.9147\times10^{-6}$
$A_{10}=-11.9986\times10^{-7}$
19th Surface
K=0
$A_4=8.1993\times10^{-4}$
$A_6=-1.1656\times10^{-5}$
$A_8=-3.0739\times10^{-7}$
$A_{10}=0.0000$ Zooming Data (∞)

|  | WE | ST | TE |
|---|---|---|---|
| f (mm) | 6.00484 | 9.32900 | 14.49815 |
| $F_{NO}$ | 2.8586 | 3.5391 | 4.4656 |
| 2ω (°) | 32.7 | 21.2 | 14.0 |
| $d_8$ | 14.82338 | 7.17554 | 1.49960 |
| $d_{12}$ | 1.39943 | 6.88233 | 7.06951 |
| $d_{17}$ | 4.89357 | 7.02815 | 12.54751 |

EXAMPLE 3

| $r_1 = 18.4212$ | $d_1 = 1.2000$ | $n_{d1} = 1.78590$ | $v_{d1} = 44.20$ |
|---|---|---|---|
| $r_2 = 8.6018$ | $d_2 = 2.9000$ | | |
| $r_3 = \infty$ | $d_3 = 12.5000$ | $n_{d2} = 1.78590$ | $v_{d2} = 44.20$ |
| $r_4 = \infty$ | $d_4 = 0.5000$ | | |
| $r_5 = 62.7612$ | $d_5 = 1.0000$ | $n_{d3} = 1.74320$ | $v_{d3} = 49.34$ |
| $r_6 = 6.4831$ (Aspheric) | $d_6 = 0.8000$ | | |
| $r_7 = 9.0709$ | $d_7 = 2.0000$ | $n_{d4} = 1.72825$ | $v_{d4} = 28.46$ |
| $r_8 = 107.5707$ | $d_8 = $ (Variable) | | |
| $r_9 = \infty$ (絞り) | $d_9 = 1.0000$ | | |
| $r_{10} = 12.3123$ | $d_{10} = 0.7000$ | $n_{d5} = 1.84666$ | $v_{d5} = 23.78$ |
| $r_{11} = 7.0000$ | $d_{11} = 2.0000$ | $n_{d6} = 1.58313$ | $v_{d6} = 59.38$ |
| $r_{12} = -25.6683$ | $d_{12} = $ (Variable) | | |
| $r_{13} = 4.7382$ (Aspheric) | $d_{13} = 2.5000$ | $n_{d7} = 1.80610$ | $v_{d7} = 40.92$ |
| $r_{14} = 3.4603$ | $d_{14} = 0.9300$ | | |
| $r_{15} = 7.8166$ | $d_{15} = 2.0000$ | $n_{d8} = 1.48749$ | $v_{d8} = 70.23$ |
| $r_{16} = -7.2953$ | $d_{16} = 0.7000$ | $n_{d9} = 1.83400$ | $v_{d9} = 37.16$ |
| $r_{17} = -69.1622$ | $d_{17} = $ (Variable) | | |
| $r_{18} = 220.1623$ | $d_{18} = 1.8000$ | $n_{d10} = 1.51633$ | $v_{d10} = 64.14$ |
| $r_{19} = -14.8379$ (Aspheric) | $d_{19} = 0.6600$ | | |
| $r_{20} = \infty$ | $d_{20} = 1.4400$ | $n_{d11} = 1.54771$ | $v_{d11} = 62.84$ |
| $r_{21} = \infty$ | $d_{21} = 0.8000$ | | |
| $r_{22} = \infty$ | $d_{22} = 0.6000$ | $n_{d12} = 1.51633$ | $v_{d12} = 64.14$ |
| $r_{23} = \infty$ | $d_{23} = 1.3610$ | | |
| $r_{24} = \infty$ (像面) | | | |

Aspherical Coefficients
6th Surface
K=0
$A_4=-3.8689\times10^{-4}$
$A_6=-4.0903\times10^{-7}$
$A_8=-3.1388\times10^{-7}$
$A_{10}=4.2432\times10^{-9}$
13th Surface
K=0
$A_4=-1.1413\times10^{-5}$
$A_6=1.9818\times10^{-6}$
$A_8=-3.1231\times10^7$
$A_{10}=0.0000$
19th Surface
K=0
$A_4=4.8219\times10^{-4}$
$A_6=-1.8188\times10^{-5}$
$A_8=2.6094\times10^{-7}$
$A_{10}=0.0000$

|  | Zooming Data (∞) | | |
|---|---|---|---|
|  | WE | ST | TE |
| f (mm) | 6.00765 | 9.33160 | 14.49720 |
| $F_{NO}$ | 2.8190 | 3.5028 | 4.4438 |
| 2ω (°) | 32.7 | 21.2 | 13.9 |
| $d_8$ | 14.09558 | 6.85361 | 1.49984 |
| $d_{12}$ | 1.40013 | 6.67003 | 5.54950 |
| $d_{17}$ | 5.11617 | 7.07754 | 13.56271 |

EXAMPLE 4

$r_1 = 20.3735$    $d_1 = 1.2000$    $n_{d1} = 1.78590$    $v_{d1} = 44.20$
$r_2 = 8.8056$    $d_2 = 2.9000$
$r_3 = \infty$    $d_3 = 12.5000$    $n_{d2} = 1.78590$    $v_{d2} = 44.20$
$r_4 = \infty$    $d_4 = 0.3000$
$r_5 = 91.5080$    $d_5 = 0.9000$    $n_{d3} = 1.80610$    $v_{d3} = 40.92$
$r_6 = 6.4940$ (Aspheric)    $d_6 = 0.1400$
$r_7 = 7.2843$    $d_7 = 2.2000$    $n_{d4} = 1.74000$    $v_{d4} = 28.30$
$r_8 = 146.5397$    $d_8 = $ (Variable)
$r_9 = \infty$ (絞り)    $d_9 = 1.0000$
$r_{10} = 5.1758$    $d_{10} = 2.5000$    $n_{d5} = 1.74320$    $v_{d5} = 49.34$
(Aspheric)
$r_{11} = 9.0000$    $d_{11} = 0.7000$    $n_{d6} = 1.84666$    $v_{d6} = 23.78$
$r_{12} = 4.6154$    $d_{12} = 0.9300$
$r_{13} = 17.8685$    $d_{13} = 1.5000$    $n_{d7} = 1.72916$    $v_{d7} = 54.68$
$r_{14} = -34.0913$    $d_{14} = $ (Variable)
$r_{15} = 10.1880$    $d_{15} = 1.9600$    $n_{d8} = 1.77250$    $v_{d8} = 49.60$
$r_{16} = -50.0000$    $d_{16} = 0.7000$    $n_{d9} = 1.67270$    $v_{d9} = 32.10$
$r_{17} = 10.2079$    $d_{17} = $ (Variable)
$r_{18} = 23.9392$    $d_{18} = 1.8000$    $n_{d10} = 1.58313$    $v_{d10} = 59.38$
(Aspheric)
$r_{19} = -44.7453$    $d_{19} = 0.6600$
$r_{20} = \infty$    $d_{20} = 1.4400$    $n_{d11} = 1.54771$    $v_{d11} = 62.84$
$r_{21} = \infty$    $d_{21} = 0.8000$
$r_{22} = \infty$    $d_{22} = 0.6000$    $n_{d12} = 1.51633$    $v_{d12} = 64.14$
$r_{23} = \infty$    $d_{23} = 1.3599$
$r_{24} = \infty$ (Image Plane)

Aspherical Coefficients
6th Surface
K=0
$A_4 = -2.8088 \times 10^{-4}$
$A_6 = 2.6396 \times 10^{-6}$
$A_8 = -4.8363 \times 10^{-7}$
$A_{10} = 9.0705 \times 10^{-9}$
10th Surface
K=0
$A_4 = -3.1977 \times 10^{-4}$
$A_6 = -2.1006 \times 10^{-6}$
$A_8 = -7.1881 \times 10^{-7}$
$A_{10} = 0.0000$
18th Surface
K=0
$A_4 = -2.6755 \times 10^{-4}$
$A_6 = 3.6472 \times 10^{-6}$
$A_8 = -2.1043 \times 10^{-7}$
$A_{10} = 0.0000$

|  | Zooming Data (∞) | | |
|---|---|---|---|
|  | WE | ST | TE |
| f (mm) | 6.01024 | 9.33049 | 14.49490 |
| $F_{NO}$ | 2.8184 | 3.5212 | 4.3375 |
| 2ω (°) | 32.6 | 21.6 | 13.9 |
| $d_8$ | 14.61596 | 7.52861 | 1.49916 |
| $d_{14}$ | 1.39873 | 7.91160 | 7.03236 |
| $d_{17}$ | 5.91073 | 6.48903 | 13.39408 |

EXAMPLE 5

$r_1 = 17.9860$    $d_1 = 1.2000$    $n_{d1} = 1.78590$    $v_{d1} = 44.20$
$r_2 = 8.3182$    $d_2 = 2.9000$
$r_3 = \infty$    $d_3 = 12.5000$    $n_{d2} = 1.78590$    $v_{d2} = 44.20$
$r_4 = \infty$    $d_4 = 0.3000$
$r_5 = 72.7266$    $d_5 = 0.9000$    $n_{d3} = 1.58313$    $v_{d3} = 59.38$
$r_6 = 5.2266$ (Aspheric)    $d_6 = 0.4400$
$r_7 = 7.1726$    $d_7 = 1.9000$    $n_{d4} = 1.83400$    $v_{d4} = 37.16$
$r_8 = 22.4388$    $d_8 = $ (Variable)
$r_9 = \infty$ (絞り)    $d_9 = 1.0000$
$r_{10} = 5.2528$    $d_{10} = 2.5000$    $n_{d5} = 1.74320$    $v_{d5} = 49.34$
(Aspheric)
$r_{11} = 10.0000$    $d_{11} = 0.7000$    $n_{d6} = 1.84666$    $v_{d6} = 23.78$
$r_{12} = 4.6454$    $d_{12} = 0.8000$
$r_{13} = 13.3752$    $d_{13} = 1.5000$    $n_{d7} = 1.72916$    $v_{d7} = 54.68$
$r_{14} = -37.9999$    $d_{14} = $ (Variable)
$r_{15} = 10.5633$    $d_{15} = 1.4000$    $n_{d8} = 1.48749$    $v_{d8} = 70.23$
(Aspheric)
$r_{16} = 15.0339$    $d_{16} = $ (Variable)
$r_{17} = 38.6419$    $d_{17} = 2.1000$    $n_{d9} = 1.74320$    $v_{d9} = 49.34$
(Aspheric)
$r_{18} = -11.0000$    $d_{18} = 0.8000$    $n_{d10} = 1.84666$    $v_{d10} = 23.78$
$r_{19} = -30.5080$    $d_{19} = 0.6600$
$r_{20} = \infty$    $d_{20} = 1.4400$    $n_{d11} = 1.54771$    $v_{d11} = 62.84$
$r_{21} = \infty$    $d_{21} = 0.8000$
$r_{22} = \infty$    $d_{22} = 0.6000$    $n_{d12} = 1.51633$    $v_{d12} = 64.14$
$r_{23} = \infty$    $d_{23} = 1.3598$
$r_{24} = \infty$ (Image Plane)

Aspherical Coefficients
6th Surface
K=0
$A_4 = -6.0228 \times 10^{-4}$
$A_6 = -1.9006 \times 10^{-5}$
$A_8 = 4.0887 \times 10^{-7}$
$A_{10} = -4.9789 \times 10^{-8}$
10th Surface
K=0
$A_4 = -2.8288 \times 10^{-4}$
$A_6 = -4.3087 \times 10^{-6}$
$A_8 = -4.8342 \times 10^{-7}$
$A_{10} = 0.0000$
15th Surface
K=0
$A_4 = 1.4603 \times 10^{-5}$
$A_6 = -9.3569 \times 10^{-8}$
$A_8 = 2.0899 \times 10^{-7}$
$A_{10} = 0.0000$
17th Surface
K=0
$A_4 = -1.8274 \times 10^{-4}$
$A_6 = 1.4781 \times 10^{-6}$
$A_8 = -1.2650 \times 10^{-7}$
$A_{10} = 0.0000$

|  | Zooming Data (∞) | | |
|---|---|---|---|
|  | WE | ST | TE |
| f (mm) | 6.00754 | 9.32975 | 14.49731 |
| $F_{NO}$ | 2.8495 | 3.5727 | 4.3700 |
| $2\omega$ (°) | 32.6 | 21.6 | 13.9 |
| $d_8$ | 14.07403 | 7.43206 | 1.49953 |
| $d_{14}$ | 1.39969 | 9.03177 | 6.40046 |
| $d_{16}$ | 6.73599 | 5.75394 | 14.30980 |

EXAMPLE 6

$r_1 = 17.8001$   $d_1 = 1.2000$   $n_{d1} = 1.78590$   $\nu_{d1} = 44.20$
$r_2 = 8.2437$    $d_2 = 2.9000$
$r_3 = \infty$    $d_3 = 12.5000$  $n_{d2} = 1.78590$   $\nu_{d2} = 44.20$
$r_4 = \infty$    $d_4 = 0.3000$
$r_5 = 46.5308$   $d_5 = 0.9000$   $n_{d3} = 1.58313$   $\nu_{d3} = 59.38$
$r_6 = 5.1472$ (Aspheric)   $d_6 = 0.4400$
$r_7 = 7.0137$    $d_7 = 1.9000$   $n_{d4} = 1.83400$   $\nu_{d4} = 37.16$
$r_8 = 19.5923$   $d_8 =$ (Variable)
$r_9 = \infty$ (絞り)   $d_9 = 1.0000$
$r_{10} = 5.4144$ (Aspheric)   $d_{10} = 2.5000$   $n_{d5} = 1.74320$   $\nu_{d5} = 49.34$
$r_{11} = 11.0000$   $d_{11} = 0.7000$   $n_{d6} = 1.84666$   $\nu_{d6} = 23.78$
$r_{12} = 4.9373$   $d_{12} = 0.8000$
$r_{13} = 16.3823$   $d_{13} = 1.5000$   $n_{d7} = 1.72916$   $\nu_{d7} = 54.68$
$r_{14} = -27.0398$   $d_{14} =$ (Variable)
$r_{15} = 9.6711$   $d_{15} = 1.4000$   $n_{d8} = 1.48749$   $\nu_{d8} = 70.23$
$r_{16} = 12.8264$   $d_{16} =$ (Variable)
$r_{17} = 40.2313$ (Aspheric)   $d_{17} = 2.1000$   $n_{d9} = 1.74320$   $\nu_{d9} = 49.34$
$r_{18} = -11.0000$   $d_{18} = 0.8000$   $n_{d10} = 1.84666$   $\nu_{d10} = 23.78$
$r_{19} = -29.7083$   $d_{19} = 0.6600$
$r_{20} = \infty$   $d_{20} = 1.4400$   $n_{d11} = 1.54771$   $\nu_{d11} = 62.84$
$r_{21} = \infty$   $d_{21} = 0.8000$
$r_{22} = \infty$   $d_{22} = 0.6000$   $n_{d12} = 1.51633$   $\nu_{d12} = 64.14$
$r_{23} = \infty$   $d_{23} = 1.3602$
$r_{24} = \infty$ (Image Plane)

Aspherical Coefficients 6 th Surface
K=0
$A_4 = -6.1045 \times 10^{-4}$
$A_6 = -2.1149 \times 10^{-5}$
$A_8 = 6.3248 \times 10^{-7}$
$A_{10} = -6.3667 \times 10^{-}$ 10th Surface
K=0
$A_4 = -2.8497 \times 10^{-4}$
$A_6 = -3.9160 \times 10^{-6}$
$A_8 = -4.1489 \times 10^{-7}$
$A_{10} = 0.0000$ 17th Surface
K=0
$A_4 = -1.5883 \times 10^{-4}$
$A_6 = -2.4464 \times 10^{-6}$
$A_8 = 4.8112 \times 10^{-8}$
$A_{10} = 0.0000$

|  | Zooming Data (∞) | | |
|---|---|---|---|
|  | WE | ST | TE |
| f (mm) | 6.01250 | 9.32862 | 14.49489 |
| $F_{NO}$ | 2.8398 | 3.5522 | 4.3431 |
| $2\omega$ (°) | 32.6 | 21.6 | 13.9 |
| $d_8$ | 13.97559 | 7.36589 | 1.49906 |
| $d_{14}$ | 1.39898 | 9.08823 | 6.32194 |
| $d_{16}$ | 6.84047 | 5.77938 | 14.39408 |

EXAMPLE 7

$r_1 = 21.2933$   $d_1 = 1.2000$   $n_{d1} = 1.78590$   $\nu_{d1} = 44.20$
$r_2 = 9.1188$ (Aspheric)   $d_2 = 2.9000$
$r_3 = \infty$   $d_3 = 12.5000$   $n_{d2} = 1.78590$   $\nu_{d2} = 44.20$
$r_4 = \infty$   $d_4 = 0.3000$
$r_5 = 580.7411$   $d_5 = 0.9000$   $n_{d3} = 1.58267$   $\nu_{d3} = 46.42$
$r_6 = 7.7517$   $d_6 = 0.4400$
$r_7 = 8.2515$   $d_7 = 1.9000$   $n_{d4} = 1.84666$   $\nu_{d4} = 23.78$
$r_8 = 15.6144$   $d_8 =$ (Variable)
$r_9 = \infty$ (絞り)   $d_9 = 1.0000$
$r_{10} = 5.7808$ (Aspheric)   $d_{10} = 2.5000$   $n_{d5} = 1.74320$   $\nu_{d5} = 49.34$
$r_{11} = 13.0000$   $d_{11} = 0.7000$   $n_{d6} = 1.84666$   $\nu_{d6} = 23.78$
$r_{12} = 5.2982$   $d_{12} = 0.8000$
$r_{13} = 14.1056$   $d_{13} = 1.5000$   $n_{d7} = 1.72916$   $\nu_{d7} = 54.68$
$r_{14} = -27.2119$   $d_{14} =$ (Variable)
$r_{15} = 13.7890$   $d_{15} = 1.4000$   $n_{d8} = 1.48749$   $\nu_{d8} = 70.23$
$r_{16} = 20.8162$   $d_{16} =$ (Variable)
$r_{17} = 100.9793$   $d_{17} = 0.8000$   $n_{d9} = 1.84666$   $\nu_{d9} = 23.78$
$r_{18} = 13.5000$   $d_{18} = 2.1000$   $n_{d10} = 1.80610$   $\nu_{d10} = 40.92$
$r_{19} = -25.2224$ (Aspheric)   $d_{19} = 0.6600$
$r_{20} = \infty$   $d_{20} = 1.4400$   $n_{d11} = 1.54771$   $\nu_{d11} = 62.84$
$r_{21} = \infty$   $d_{21} = 0.8000$
$r_{22} = \infty$   $d_{22} = 0.6000$   $n_{d12} = 1.51633$   $\nu_{d12} = 64.14$
$r_{23} = \infty$   $d_{23} = 1.3601$
$r_{24} = \infty$ (Image Plane)

Aspherical Coefficients

2nd Surface
K=0
$A_4 = -1.4911 \times 10^{-5}$
$A_6 = -1.1650 \times 10^{-6}$
$A_8 = 4.2491 \times 10^{-9}$
$A_{10} = 0.0000$ 10th Surface
K=0
$A_4 = -2.3339 \times 10^{-4}$
$A_6 = -2.6427 \times 10^{-6}$
$A_8 = -2.6924 \times 10^{-7}$
$A_{10} = 0.0000$ 19th Surface
K=0
$A_4 = 1.8090 \times 10^{-4}$
$A_6 = 4.1230 \times 10^{-6}$
$A_8 = -1.2807 \times 10^{-7}$
$A_{10} = 0.0000$

| Zooming Data (∞) | | | |
|---|---|---|---|
| | WE | ST | TE |
| f (mm) | 6.00574 | 9.32712 | 14.49692 |
| $F_{NO}$ | 2.8248 | 3.5310 | 4.2987 |
| 2ω (°) | 32.7 | 21.5 | 13.9 |
| $d_8$ | 13.57761 | 7.20846 | 1.49942 |
| $d_{14}$ | 1.39965 | 9.63810 | 5.81790 |
| $d_{16}$ | 7.23336 | 5.38063 | 14.89331 |

EXAMPLE 8

$r_1 = 19.1761$    $d_1 = 1.2000$    $n_{d1} = 1.78590$    $\nu_{d1} = 44.20$
$r_2 = 8.5695$    $d_2 = 2.9000$
(Aspheric)
$r_3 = \infty$    $d_3 = 12.5000$    $n_{d2} = 1.78590$    $\nu_{d2} = 44.20$
$r_4 = \infty$    $d_4 = 0.3000$
$r_5 = -46.5888$    $d_5 = 0.9000$    $n_{d3} = 1.58267$    $\nu_{d3} = 46.42$
$r_6 = 10.3343$    $d_6 = 1.9000$    $n_{d4} = 1.84666$    $\nu_{d4} = 23.78$
$r_7 = 26.0699$    $d_7 = $ (Variable)
$r_8 = \infty$ (絞り)    $d_8 = 1.0000$
$r_9 = 6.0465$ (Aspheric)    $d_9 = 2.5000$    $n_{d5} = 1.74320$    $\nu_{d5} = 49.34$
$r_{10} = 13.0000$    $d_{10} = 0.7000$    $n_{d6} = 1.84666$    $\nu_{d6} = 23.78$
$r_{11} = 5.6300$    $d_{11} = 0.8000$
$r_{12} = 15.1088$    $d_{12} = 1.5000$    $n_{d7} = 1.72916$    $\nu_{d7} = 54.68$
$r_{13} = -28.7654$    $d_{13} = $ (Variable)
$r_{14} = 12.4863$    $d_{14} = 1.4000$    $n_{d8} = 1.48749$    $\nu_{d8} = 70.23$
$r_{15} = 17.7361$    $d_{15} = $ (Variable)
$r_{16} = 24.3278$    $d_{16} = 2.1000$    $n_{d9} = 1.74320$    $\nu_{d9} = 49.34$
(Aspheric)
$r_{17} = -12.0000$    $d_{17} = 0.8000$    $n_{d10} = 1.78472$    $\nu_{d10} = 25.68$
$r_{18} = -75.9792$    $d_{18} = 0.6600$
$r_{19} = \infty$    $d_{19} = 1.4400$    $n_{d11} = 1.54771$    $\nu_{d11} = 62.84$
$r_{20} = \infty$    $d_{20} = 0.8000$
$r_{21} = \infty$    $d_{21} = 0.6000$    $n_{d12} = 1.51633$    $\nu_{d12} = 64.14$
$r_{22} = \infty$    $d_{22} = 1.3600$
$r_{23} = \infty$ (Image Plane)

Aspherical Coefficients
2nd Surface
K=0
$A_4 = -4.7160 \times 10^{-5}$
$A_6 = -7.1255 \times 10^{-7}$
$A_8 = -6.5873 \times 10^{-9}$
$A_{10} = 0.0000$
9th Surface
K=0
$A_4 = -2.1357 \times 10^{-4}$
$A_6 = -2.1714 \times 10^{-6}$
$A_8 = -1.6484 \times 10^{-7}$
$A_{10} = 0.0000$
16th Surface
K=0
$A_4 = -1.4451 \times 10^{-4}$
$A_6 = 1.3508 \times 10^{-6}$
$A_8 = -6.3819 \times 10^{-8}$
$A_{10} = 0.0000$

| Zooming Data (∞) | | | |
|---|---|---|---|
| | WE | ST | TE |
| f (mm) | 6.00723 | 9.32846 | 14.49784 |
| $F_{NO}$ | 2.8379 | 3.5413 | 4.3096 |

-continued

| Zooming Data (∞) | | | |
|---|---|---|---|
| | WE | ST | TE |
| 2ω (°) | 32.7 | 21.5 | 13.9 |
| $d_7$ | 13.98735 | 7.36539 | 1.49963 |
| $d_{13}$ | 1.39974 | 9.60703 | 5.93291 |
| $d_{15}$ | 7.26137 | 5.69110 | 15.21593 |

EXAMPLE 9

$r_1 = 246.0095$    $d_1 = 1.2000$    $n_{d1} = 1.80610$    $\nu_{d1} = 40.92$
$r_2 = 20.1760$    $d_2 = 1.5000$
(Aspheric)
$r_3 = \infty$    $d_3 = 12.5000$    $n_{d2} = 1.78590$    $\nu_{d2} = 44.20$
$r_4 = \infty$    $d_4 = 1.5000$
$r_5 = -7.3867$    $d_5 = 1.0000$    $n_{d3} = 1.80100$    $\nu_{d3} = 34.97$
$r_6 = -50.0000$    $d_6 = 1.8200$    $n_{d4} = 1.84666$    $\nu_{d4} = 23.78$
$r_7 = -12.2328$    $d_7 = $ (Variable)
$r_8 = \infty$ (絞り)    $d_8 = 1.0000$
$r_9 = 10.6609$    $d_9 = 2.3000$    $n_{d5} = 1.80610$    $\nu_{d5} = 40.92$
(Aspheric)
$r_{10} = -67.8827$    $d_{10} = 0.1500$
$r_{11} = 13.1203$    $d_{11} = 2.7000$    $n_{d6} = 1.75700$    $\nu_{d6} = 47.82$
$r_{12} = \infty$    $d_{12} = 0.8000$    $n_{d7} = 1.84666$    $\nu_{d7} = 23.78$
$r_{13} = 6.4827$    $d_{13} = $ (Variable)
$r_{14} = 17.6756$    $d_{14} = 1.6000$    $n_{d8} = 1.48749$    $\nu_{d8} = 70.23$
$r_{15} = -50.5413$    $d_{15} = $ (Variable)
$r_{16} = 15.9493$    $d_{16} = 1.7000$    $n_{d9} = 1.58313$    $\nu_{d9} = 59.38$
(Aspheric)
$r_{17} = -15.0000$    $d_{17} = 0.8000$    $n_{d10} = 1.84666$    $\nu_{d10} = 23.78$
$r_{18} = -46.4329$    $d_{18} = 0.6600$
$r_{19} = \infty$    $d_{19} = 1.4400$    $n_{d11} = 1.54771$    $\nu_{d11} = 62.84$
$r_{20} = \infty$    $d_{20} = 0.8000$
$r_{21} = \infty$    $d_{21} = 0.6000$    $n_{d12} = 1.51633$    $\nu_{d12} = 64.14$
$r_{22} = \infty$    $d_{22} = 1.3601$
$r_{23} = \infty$ (Image Plane)

Aspherical Coefficients
2nd Surface
K=0
$A_4 = -1.0773 \times 10^{-4}$
$A_6 = -3.3089 \times 10^{-7}$
$A_8 = -1.5283 \times 10^{-9}$
$A_{10} = 0.0000$
9th Surface
K=0
$A_4 = -1.2210 \times 10^{-4}$
$A_6 = -1.3984 \times 10^{-5}$
$A_8 = -1.6300 \times 10^{-8}$
$A_{10} = 0.0000$
16th Surface
K=0
$A_4 = -2.6736 \times 10^{-4}$
$A_6 = 1.3631 \times 10^{-5}$
$A_8 = -4.5357 \times 10^{-7}$
$A_{10} = 0.0000$

| Zooming Data (∞) | | | |
|---|---|---|---|
| | WE | ST | TE |
| f (mm) | 5.99832 | 9.32950 | 14.50084 |
| $F_{NO}$ | 2.6479 | 3.3092 | 4.0475 |

-continued

| | Zooming Data (∞) | | |
|---|---|---|---|
| | WE | ST | TE |
| 2ω (°) | 32.6 | 21.4 | 13.9 |
| $d_7$ | 15.07816 | 7.55691 | 1.00023 |
| $d_{13}$ | 1.40041 | 6.49779 | 5.90725 |
| $d_{15}$ | 6.09306 | 8.53155 | 15.66403 |

EXAMPLE 10

| | | | |
|---|---|---|---|
| $r_1 = 16.8630$ | $d_1 = 1.1000$ | $n_{d1} = 1.77250$ | $v_{d1} = 49.60$ |
| $r_2 = 8.7727$ | $d_2 = 3.0000$ | | |
| $r_3 = \infty$ | $d_3 = 12.5000$ | $n_{d2} = 1.83481$ | $v_{d2} = 42.72$ |
| $r_4 = \infty$ | $d_4 = 0.3000$ | | |
| $r_5 = -43.7867$ | $d_5 = 0.9000$ | $n_{d3} = 1.58313$ | $v_{d3} = 59.38$ |
| $r_6 = 5.4937$ | $d_6 = 0.5200$ | | |
| (Aspheric) | | | |
| $r_7 = 7.8835$ | $d_7 = 1.9000$ | $n_{d4} = 1.80610$ | $v_{d4} = 40.92$ |
| $r_8 = 41.6500$ | $d_8 =$ (Variable) | | |
| $r_9 = \infty$ (絞り) | $d_9 = 1.000$ | | |
| $r_{10} = 5.6352$ | $d_{10} = 2.5000$ | $n_{d5} = 1.74320$ | $v_{d5} = 49.34$ |
| (Aspheric) | | | |
| $r_{11} = 10.5000$ | $d_{11} = 0.7000$ | $n_{d6} = 1.84666$ | $v_{d6} = 23.78$ |
| $r_{12} = 5.2717$ | $d_{12} = 0.8000$ | | |
| $r_{13} = 27.0282$ | $d_{13} = 1.5000$ | $n_{d7} = 1.72916$ | $v_{d7} = 54.68$ |
| $r_{14} = -19.3196$ | $d_{14} =$ (Variable) | | |
| $r_{15} = 17.7925$ | $d_{15} = 1.4000$ | $n_{d8} = 1.48749$ | $v_{d8} = 70.23$ |
| (Aspheric) | | | |
| $r_{16} = 121.8190$ | $d_{16} =$ (Variable) | | |
| $r_{17} = -6.1686$ | $d_{17} = 0.800$ | $n_{d9} = 1.84666$ | $v_{d9} = 23.78$ |
| $r_{18} = -12.5000$ | $d_{18} = 2.1000$ | $n_{d10} = 1.74320$ | $v_{d10} = 49.34$ |
| $r_{19} = -5.4525$ | $d_{19} = 0.6600$ | | |
| (Aspheric) | | | |
| $r_{20} = \infty$ | $d_{20} = 1.4400$ | $n_{d11} = 1.54771$ | $v_{d11} = 62.84$ |
| $r_{21} = \infty$ | $d_{21} = 0.8000$ | | |
| $r_{22} = \infty$ | $d_{22} = 0.6000$ | $n_{d12} = 1.51633$ | $v_{d12} = 64.14$ |
| $r_{23} = \infty$ | $d_{23} = 1.3600$ | | |
| $r_{24} = \infty$ (Image Plane) | | | |

Aspherical Coefficients
6th Surface
$A_4 = -6.5162 \times 10^{-4}$
$A_6 = -9.3748 \times 10^{-6}$
$A_8 = 2.0963 \times 10^{-7}$
$A_{10} = -3.4547 \times 10^{-8}$
10th Surface
K=0
$A_4 = -2.9965 \times 10^{-4}$
$A_6 = -3.4364 \times 10^{-9}$
$A_8 = -4.7103 \times 10^{-7}$
$A_{10} = 0.0000$
15th Surface
K=0
$A_4 = -9.8531 \times 10^{-7}$
$A_6 = 2.0729 \times 10^{-3}$
$A_8 = -3.4211 \times 10^{-8}$
$A_{10} = 0.0000$
19th Surface
K=0
$A_4 = 1.0008 \times 10^{-3}$
$A_6 = -1.7464 \times 10^{-5}$
$A_8 = 1.1785 \times 10^{-6}$
$A_{10} = 0.0000$

| | Zooming Data (∞) | | |
|---|---|---|---|
| | WE | ST | TE |
| f (mm) | 6.01706 | 10.39915 | 17.99747 |
| $F_{NO}$ | 2.8430 | 3.7925 | 4.6965 |
| 2ω (°) | 32.6 | 19.3 | 11.3 |
| $d_8$ | 18.39512 | 9.82836 | 1.49931 |
| $d_{14}$ | 1.39990 | 11.66800 | 9.86995 |
| $d_{16}$ | 8.11544 | 6.41342 | 16.54158 |

EXAMPLE 11

| | | | |
|---|---|---|---|
| $r_1 = 18.1242$ | $d_1 = 1.1000$ | $n_{d1} = 1.77250$ | $v_{d1} = 49.60$ |
| $r_2 = 11.0917$ | $d_2 = 3.0000$ | | |
| $r_3 = \infty$ | $d_3 = 12.5000$ | $n_{d2} = 1.80610$ | $v_{d2} = 40.92$ |
| $r_4 = \infty$ | $d_4 = 0.3000$ | | |
| $r_5 = -189.0024$ | $d_5 = 0.9000$ | $n_{d3} = 1.80610$ | $v_{d3} = 40.92$ |
| (Aspheric) | | | |
| $r_6 = 7.0839$ | $d_6 = 0.8000$ | | |
| (Aspheric) | | | |
| $r_7 = 8.8339$ | $d_7 = 1.9000$ | $n_{d4} = 1.76182$ | $v_{d4} = 26.52$ |
| $r_8 = 33.9090$ | $d_8 =$ (Variable) | | |
| $r_9 = \infty$ (絞り) | $d_9 = 1.0000$ | | |
| $r_{10} = 6.5543$ | $d_{10} = 2.5000$ | $n_{d5} = 1.74320$ | $v_{d5} = 49.34$ |
| (Aspheric) | | | |
| $r_{11} = 16.5000$ | $d_{11} = 0.7000$ | $n_{d6} = 1.84666$ | $v_{d6} = 23.78$ |
| $r_{12} = 6.8813$ | $d_{12} = 0.8000$ | | |
| $r_{13} = 110.5063$ | $d_{13} = 1.5000$ | $n_{d7} = 1.72916$ | $v_{d7} = 54.68$ |
| $r_{14} = -13.4784$ | $d_{14} =$ (Variable) | | |
| $r_{15} = 17.0895$ | $d_{15} = 1.4000$ | $n_{d8} = 1.48749$ | $v_{d8} = 70.23$ |
| $r_{16} = 214.7721$ | $d_{16} =$ (Variable) | | |
| $r_{17} = -8.1890$ | $d_{17} = 0.800$ | $n_{d9} = 1.84666$ | $v_{d9} = 23.78$ |
| $r_{18} = -20.0000$ | $d_{18} = 2.1000$ | $n_{d10} = 1.74320$ | $v_{d10} = 49.34$ |
| $r_{19} = -7.6979$ | $d_{19} = 0.6600$ | | |
| (Aspheric) | | | |
| $r_{20} = \infty$ | $d_{20} = 1.4400$ | $n_{d11} = 1.54771$ | $v_{d11} = 62.84$ |
| $r_{21} = \infty$ | $d_{21} = 0.8000$ | | |
| $r_{22} = \infty$ | $d_{22} = 0.6000$ | $n_{d12} = 1.51633$ | $v_{d12} = 64.14$ |
| $r_{23} = \infty$ | $d_{23} = 1.3601$ | | |
| $r_{24} = \infty$ | | | |
| (Image Plane) | | | |

Aspherical Coefficients
5th Surface
K=0
$A_4 = 3.1801 \times 10^{-4}$
$A_6 = -7.4933 \times 10^{-6}$
$A_8 = 1.3268 \times 10^{-7}$
$A_{10} = 0.0000$
6th Surface
K=0
$A_4 = 1.0755 \times 10^{-4}$
$A_6 = -2.2069 \times 10^{-6}$
$A_8 = -4.2215 \times 10^{-3}$
$A_{10} = 1.2946 \times 10^{-9}$
10th Surface
K=0
$A_4 = -2.8130 \times 10^{-4}$
$A_6 = -7.1076 \times 10^{-7}$
$A_8 = -1.7424 \times 10^{-7}$
$A_{10} = 0.0000$ 19th Surface
K=0
$A_4=5.5956\times10^{-4}$
$A_6=-1.7107\times10^{-5}$
$A_8=5.6651\times10^{-7}$
$A_{10}=0.0000$ Zooming Data (∞)

|  | WE | ST | TE |
|---|---|---|---|
| f (mm) | 6.00227 | 10.39870 | 17.99964 |
| $F_{NO}$ | 2.8302 | 3.7274 | 4.5463 |
| 2ω (°) | 32.7 | 19.3 | 11.3 |
| $d_8$ | 17.74229 | 9.38185 | 1.50012 |
| $d_{14}$ | 1.39992 | 10.71211 | 9.41560 |
| $d_{16}$ | 7.69801 | 6.74827 | 15.92451 |

EXAMPLE 12

| $r_1 = 11.6487$ | $d_1 = 0.7000$ | $n_{d1} = 1.77250$ | $v_{d1} = 49.60$ |
|---|---|---|---|
| $r_2 = 4.8810$ (Aspheric) | $d_2 = 1.5500$ | | |
| $r_3 = \infty$ | $d_3 = 6.8000$ | $n_{d2} = 1.77250$ | $v_{d2} = 49.60$ |
| $r_4 = \infty$ | $d_4 = 0.1500$ | | |
| $r_5 = -170.6138$ | $d_5 = 0.7000$ | $n_{d3} = 1.77250$ | $v_{d3} = 49.60$ |
| $r_6 = 6.6934$ | $d_6 = 0.5000$ | | |
| $r_7 = 6.6793$ | $d_7 = 1.2500$ | $n_{d4} = 1.84666$ | $v_{d4} = 23.78$ |
| $r_8 = 13.3262$ | $d_8 =$ (Variable) | | |
| $r_9 = \infty$ (絞り) | $d_9 = 0.0000$ | | |
| $r_{10} = 3.9559$ (Aspheric) | $d_{10} = 1.8000$ | $n_{d5} = 1.74320$ | $v_{d5} = 49.34$ |
| $r_{11} = 9.5000$ | $d_{11} = 0.7000$ | $n_{d6} = 1.84666$ | $v_{d6} = 23.78$ |
| $r_{12} = 3.5668$ | $d_{12} = 0.5000$ | | |
| $r_{13} = 7.5793$ | $d_{13} = 1.6500$ | $n_{d7} = 1.72916$ | $v_{d7} = 54.68$ |
| $r_{14} = -14.4945$ | $d_{14} =$ (Variable) | | |
| $r_{15} = 9.1093$ | $d_{15} = 1.0000$ | $n_{d8} = 1.48749$ | $v_{d8} = 70.23$ |
| $r_{16} = 13.6404$ | $d_{16} =$ (Variable) | | |
| $r_{17} = 146.0359$ | $d_{17} = 0.7000$ | $n_{d9} = 1.84666$ | $v_{d9} = 23.78$ |
| $r_{18} = 9.0000$ | $d_{18} = 1.4500$ | $n_{d10} = 1.74320$ | $v_{d10} = 49.34$ |
| $r_{19} = -22.2698$ (Aspheric) | $d_{19} = 0.7000$ | | |
| $r_{20} = \infty$ | $d_{20} = 0.6000$ | $n_{d11} = 1.51633$ | $v_{d11} = 64.14$ |
| $r_{21} = \infty$ | $d_{21} = 1.0000$ | | |
| $r_{22} = \infty$ (Image Plane) | | | |

Aspherical Coefficients
2nd Surface
K=0
$A_4=-7.6360\times10^{-5}$
$A_6=-3.2706\times10^{-5}$
$A_8=4.2217\times10^{-7}$
$A_{10}=0.0000$
10th Surface
K=0
$A_4=-9.5407\times10^{-4}$
$A_6=-1.7864\times10^{-5}$
$A_8=-3.9103\times10^{-6}$
$A_{10}=0.0000$
19th Surface
K=0
$A_4=2.5017\times10^{-5}$
$A_6=5.7463\times10^{-4}$
$A_8=-6.4941\times10^{-5}$
$A_{10}=0.0000$ Zooming Data (∞)

|  | WE | ST | TE |
|---|---|---|---|
| f (mm) | 3.25717 | 5.63806 | 9.74723 |
| $F_{NO}$ | 2.5244 | 3.3633 | 4.2965 |
| 2ω (°) | 32.7 | 19.4 | 11.3 |
| $d_8$ | 9.37157 | 4.85881 | 0.89899 |
| $d_{14}$ | 1.10006 | 8.11201 | 1.30017 |
| $d_{16}$ | 3.67578 | 1.18818 | 11.94819 |

EXAMPLE 13

| $r_1 = -14.2761$ (Aspheric) | $d_1 = 5.1000$ | $n_{d1} = 1.50913$ | $v_{d1} = 56.20$ |
|---|---|---|---|
| $r_2 = \infty$ (Reflecting surface) | $d_2 = 5.7941$ | $n_{d2} = 1.50913$ | $v_{d2} = 56.20$ |
| $r_3 = \infty$ | $d_3 = 2.1000$ | | |
| $r_4 = -6.4892$ | $d_4 = 0.8000$ | $n_{d3} = 1.64000$ | $v_{d3} = 60.07$ |
| $r_5 = -84.1654$ | $d_5 = 1.935$ | $n_{d4} = 1.84666$ | $v_{d4} = 23.78$ |
| $r_6 = -16.8306$ | $d_6 =$ (Variable) | | |
| $r_7 = \infty$ (絞り) | $d_7 = 0.4000$ | | |
| $r_8 = 34.9225$ (Aspheric) | $d_8 = 1.4006$ | $n_{d5} = 1.74330$ | $v_{d5} = 49.33$ |
| $r_9 = -15.2934$ | $d_9 = 0.1500$ | | |
| $r_{10} = 6.1210$ | $d_{10} = 3.3481$ | $n_{d6} = 1.61800$ | $v_{d6} = 63.33$ |
| $r_{11} = 27.4556$ | $d_{11} = 0.8000$ | $n_{d7} = 1.84666$ | $v_{d7} = 23.78$ |
| $r_{12} = 4.9467$ | $d_{12} =$ (Variable) | | |
| $r_{13} = 13.6380$ | $d_{13} = 1.4415$ | $n_{d8} = 1.51633$ | $v_{d8} = 64.14$ |
| $r_{14} = -143.7586$ | $d_{14} =$ (Variable) | | |
| $r_{15} = -19.5436$ | $d_{15} = 1.3641$ | $n_{d9} = 1.58913$ | $v_{d9} = 61.25$ |
| $r_{16} = -7.1346$ (Aspheric) | $d_{16} = 0.8000$ | | |
| $r_{17} = \infty$ | $d_{17} = 1.0500$ | $n_{d10} = 1.54771$ | $v_{d10} = 62.84$ |
| $r_{18} = \infty$ | $d_{18} = 0.8000$ | | |
| $r_{19} = \infty$ | $d_{19} = 0.8000$ | $n_{d11} = 1.51633$ | $v_{d11} = 64.14$ |
| $r_{20} = \infty$ | $d_{20} = 0.9669$ | | |
| $r_{21} = \infty$ (Image Plane) | | | |

Aspherical Coefficients
1st Surface
K=0
$A_4=3.2165\times10^{-4}$
$A_6=-9.1756\times10^{-7}$
$A_8=4.1788\times10^{-9}$
$A_{10}=0.0000$
8th Surface
K=0
$A_4=-1.2083\times10^{-4}$
$A_6=1.1516\times10^{-7}$
$A_8=-2.9381\times10^{-8}$
$A_{10}=0.0000$
16th Surface
K=0
$A_4=1.3137\times10^{-3}$
$A_6=-2.0878\times10^{-5}$
$A_8=4.9397\times10^{-7}$
$A_{10}=0.0000$

| Zooming Data (∞) | | | |
|---|---|---|---|
| | WE | ST | TE |
| f (mm) | 5.02898 | 8.69474 | 14.52092 |
| $F_{NO}$ | 2.6544 | 3.5217 | 4.5079 |
| 2ω (°) | 64.0 | 40.8 | 24.2 |
| $d_6$ | 14.61860 | 7.39251 | 1.80000 |
| $d_{12}$ | 3.75585 | 8.20107 | 4.39975 |
| $d_{14}$ | 3.16733 | 5.96897 | 15.38987 |

Which of the zoom types a to d is used in Examples 1 to 13 is set out below with the values of conditions (1) to (31) and the values of $t_{LPF}$ and L concerning condition (32).

| Zoom Type | Example 1 a | Example 2 d | Example 3 c | Example 4 b | Example 5 b |
|---|---|---|---|---|---|
| (1) | 1.38822 | 1.41072 | 1.37082 | 1.45054 | 1.37212 |
| (2) | 1.66024 | 2.28107 | 2.01027 | 1.74028 | 1.58543 |
| (3) | 1.67612 | 1.52529 | 1.29028 | 1.28997 | 1.18812 |
| (4), (4C) | 0.34947 | *** | *** | *** | *** |
| (5), (5C), (10), (10C) | −0.48666 | *** | −1.00064 | *** | *** |
| (6), (6C), (11), (11C) | 27.79 | *** | 33.07 | *** | *** |
| (7), (7C) | −0.61816 | *** | *** | *** | *** |
| (8), (8C), (13), (13C), (18), (18C) | −0.72084 | 0.25142 | 0.21762 | 0.44850 | 0.53142 |
| (9), (9C), (14), (14C) | *** | 0.73100 | 0.73030 | 0.89173 | 0.88437 |
| (12), (12C), (17), (17C) | *** | −3.12101 | −0.79692 | −0.31222 | −0.47931 |
| (15), (15C) | *** | 1.35184 | *** | 0.81112 | 0.73000 |
| (16), (16C) | *** | 29.43 | *** | 25.56 | 25.56 |
| (19) | 0.40806 | 0.48761 | 0.38280 | 0.40516 | 0.44149 |
| (20) | 0.21992 | 0.15218 | 0.10734 | 0.14176 | −0.11046 |
| (21) | 0.70097 | 0.57446 | 0.67059 | 0.57052 | 0.60231 |
| (22) | 0.27038 | 0.27052 | 0.27044 | 0.27032 | 0.27034 |
| (23) | 1.41223 | 1.42456 | 1.42456 | 1.39716 | 1.39716 |
| (24) | 1.78590 | 1.78590 | 1.78590 | 1.78590 | 1.78592 |
| (25) | −0.19814 | −0.14934 | −0.16882 | −0.12548 | −0.14612 |
| (26) | 0.62425 | 0.43029 | 0.50182 | 0.35540 | 0.41694 |
| (27) | 1.11933 | 1.10145 | 1.13322 | 1.07061 | 1.13215 |
| (28) | 1.0 | 1.0 | 1.0 | 1.0 | 1.0 |
| (29) | 0.04 | 0.04 | 0.04 | 0.04 | 0.04 |
| (30) | 0.0 | 0.0 | 0.0 | 0.0 | 0.0 |
| (31) | 1.06 | 1.06 | 1.06 | 1.06 | 1.06 |
| a | 3.5 | 3.9 | 3.7 | 2.9 | 2.5 |
| $t_{LPF}$ | 0.55 | 0.58 | 0.52 | 0.38 | 0.30 |
| L | 7.30 | 7.30 | 7.30 | 7.30 | 7.30 |

| Zoom Type | Example 6 b | Example 7 b | Example 8 b | Example 9 a | Example 10 b |
|---|---|---|---|---|---|
| (1) | 1.36326 | 1.30842 | 1.37622 | 1.49634 | 1.15970 |
| (2) | 1.57780 | 1.51202 | 1.57269 | 1.88643 | 1.47797 |
| (3) | 1.16490 | 1.13951 | 1.14667 | 3.68738 | 1.41403 |
| (4), (4C) | *** | *** | *** | 0.49409 | *** |
| (5), (5C), (10), (10C) | *** | *** | *** | 0.00000 | *** |
| (6), (6C), (11), (11C) | *** | *** | *** | 24.04 | *** |
| (7), (7C) | *** | *** | *** | −0.72854 | *** |
| (8), (8C), (13), (13C), (18), (18C) | 0.51417 | 0.56419 | 0.52960 | −0.42385 | 0.46600 |
| (9), (9C), (14), (14C) | 0.91188 | 0.91652 | 0.93112 | *** | 0.93549 |
| (12), (12C), (17), (17C) | −0.24544 | −0.31721 | −0.31127 | *** | 0.16632 |
| (15), (15C) | 0.66364 | 0.56154 | 0.56154 | *** | 0.69524 |
| (16), (16C) | 25.56 | 25.56 | 25.56 | *** | 25.56 |
| (19) | 0.43615 | 0.40132 | 0.40923 | 0.40737 | 0.54841 |
| (20) | 0.10368 | 0.09281 | 0.09173 | 0.26966 | 0.17155 |
| (21) | 0.60543 | 0.63420 | 0.63699 | 0.67986 | 0.49871 |
| (22) | 0.27030 | 0.27035 | 0.27038 | 0.27043 | 0.27026 |
| (23) | 1.39716 | 1.39716 | 1.39716 | 1.36976 | 1.385301 |
| (24) | 1.78590 | 1.78590 | 1.78590 | 1.78590 | 1.83481 |
| (25) | −0.14430 | −0.16362 | −0.13904 | −0.20851 | −0.23197 |
| (26) | 0.40879 | 0.47549 | 0.39515 | 0.78065 | 0.79956 |
| (27) | 1.13895 | 1.18742 | 1.12882 | 1.03909 | 1.49131 |
| (28) | 1.0 | 1.0 | 1.0 | 1.0 | 1.0 |
| (29) | 0.04 | 0.04 | 0.04 | 0.04 | 0.04 |
| (30) | 0.0 | 0.0 | 0.0 | 0.0 | 0.0 |
| (31) | 1.06 | 1.06 | 1.06 | 1.06 | 1.06 |
| a | 2.8 | 2.7 | 2.6 | 3.3 | 3.1 |
| $t_{LPF}$ | 0.25 | 0.25 | 0.26 | 0.24 | 0.25 |
| L | 7.30 | 7.30 | 7.30 | 7.30 | 7.30 |

| Zoom Type | Example 11 b | Example 12 b | Example 13 a |
|---|---|---|---|
| (1) | 1.12846 | 1.06460 | 1.24661 |
| (2) | 1.43635 | 1.43051 | 1.49969 |
| (3) | 1.50110 | 1.23503 | 5.68083 |
| (4), (4C) | *** | *** | 0.80815 |
| (5), (5C), (10), (10C) | *** | *** | 0.21853 |
| (6), (6C), (11), (11C) | *** | *** | 39.55 |
| (7), (7C) | *** | *** | 0.39089 |
| (8), (8C), (13), (13C), (18), (18C) | 0.44082 | 0.56189 | 0.11923 |
| (9), (9C), (14), (14C) | 1.04989 | 0.90164 | *** |
| (12), (12C), (17), (17C) | 0.78258 | −0.31328 | *** |
| (15), (15C) | 0.44242 | 0.41684 | *** |
| (16), (16C) | 25.56 | 25.56 | *** |
| (19) | 0.52310 | 0.13339 | 0.30301 |
| (20) | 0.19211 | 0.07549 | 0.24793 |
| (21) | −0.50649 | −0.97637 | 0.95350 |
| (22) | 0.10425 | 0.11002 | 0.32739 |
| (23) | 1.40014 | 1.39808 | 1.20313 |
| (24) | 1.80610 | 1.7725 | 1.50913 |
| (25) | −0.35720 | −0.20746 | 0.27111 |
| (26) | 1.94314 | 0.59664 | 1.26698* |
| (27) | 1.53460 | 1.62493 | 1.36309 |
| (28) | 1.0 | 1.0 | 1.0 |
| (29) | 0.04 | 0.04 | 0.04 |
| (30) | 0.0 | 0.0 | 0.0 |
| (31) | 1.06 | 1.06 | 1.06 |
| a | 2.8 | 1.85 | 2.5 |
| $t_{LPF}$ | 0.25 | 0 | 1.20 |
| L | 7.30 | 3.96 | 6.0 |

When the entrance surface of the prism has refracting power, $f_{11}$ stands for the focal length from the surface nearest to the object side to the exit surface of the prism.

Referring to the numerical data about Examples 1 to 13, it is understood that the optical low-pass filter is composed of a plurality of filter elements, and the thickness of the infrared cut filter, etc. is included in such data. Thus, the maximum thickness corresponds to the value of $t_{LPF}$ in the above table, rather than the value of $t_{LPF}$.

Examples 14 to 16 of the zoom lens according to 5th to 9th aspects of the present invention are now explained.

EXAMPLE 14

Figure 15:
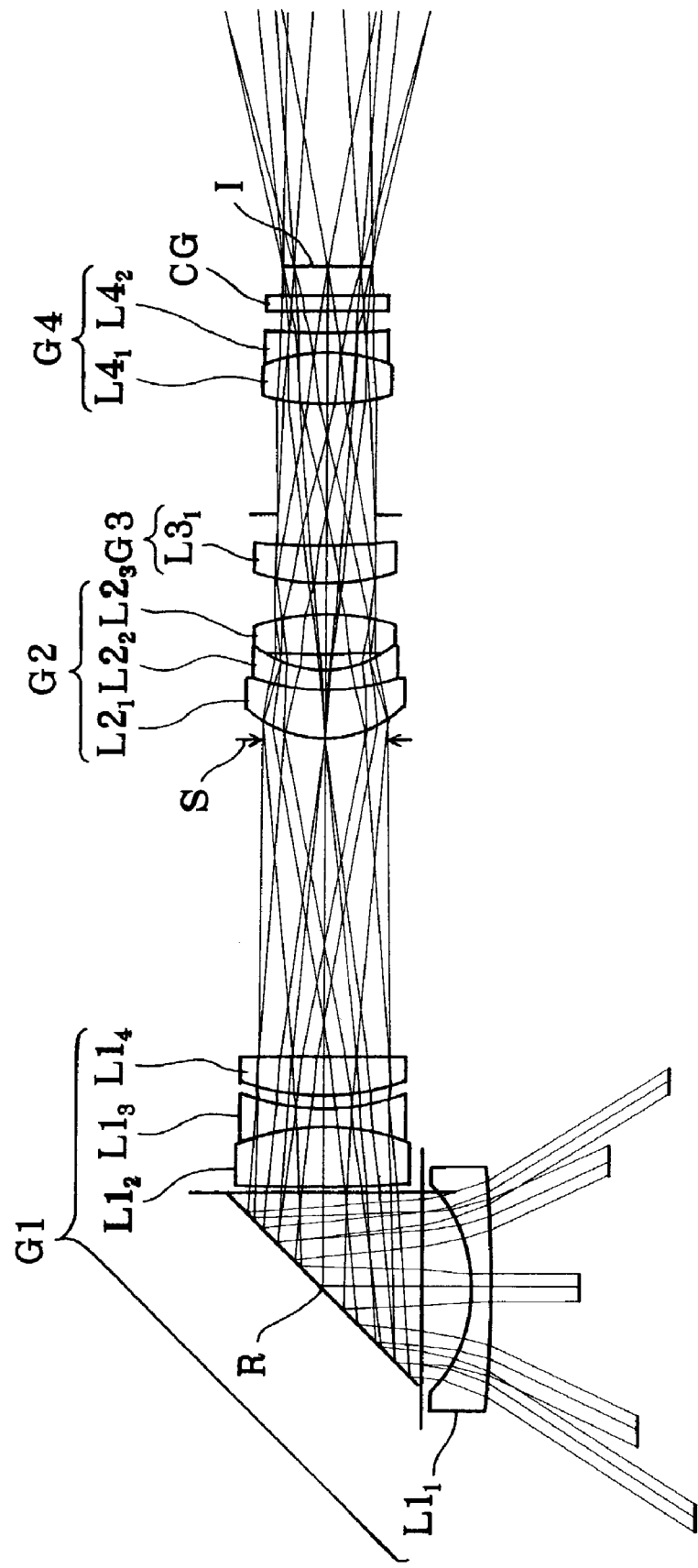
FIG. 15 is a sectional view illustrative along the optical axis of the optical construction of Example 14 of the zoom lens used with the electronic imaging system according to the present invention.
Figure 16A:
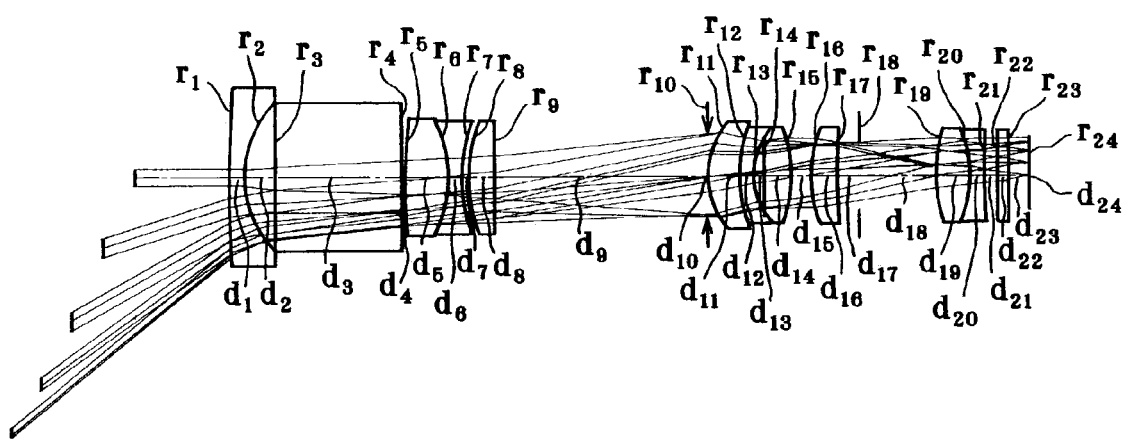
FIGS. 16(a), 16(b) and 16(c) are sectional views illustrative at the wide-angle end (a), in an intermediate state (b) and at the telephoto end (c) of the optical construction of Example 14 of the zoom lens when focused on an infinite object point.
Figure 16B:
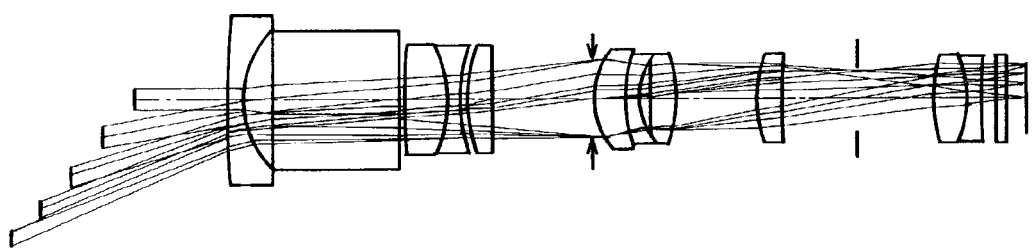
Figure 16C:
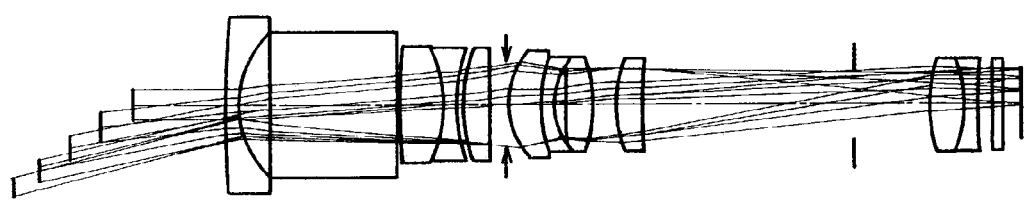

FIG. 15 is a sectional view illustrative of the optical construction of Example 14 of the zoom lens used with the electronic imaging system according to the present invention, as taken along the optical axis of the zoom lens, and shows in what state the optical path is bent upon focused on an infinite object point at the telephoto end of the zoom lens. FIGS. 16(a), 16(b) and 16(c) are illustrative in section of the optical construction of Example 14 of the zoom lens upon focused on an infinite object point, wherein (a), (b) and (c) show the states of the zoom lens at the wide-angle end, in an intermediate state and at the telephoto end, respectively.

As shown in FIG. 15, the electronic imaging system of Example 14 comprises, in order from its object side, a zoom lens and an electronic image pickup device CCD. In FIG. 15, the capital I indicates the image pickup plane of CCD. Between the zoom lens and the image pickup plane I there is provided a plane-parallel plate form of CCD cover glass CG.

The zoom lens comprises, in order from its object side, a first lens group G1, an aperture stop S, a second lens group G2, a third lens group G3 and a fourth lens group G4.

The first lens group G1 comprises, in order from its object side, a front subgroup, an optical path-bending, reflecting optical element R1 and a rear subgroup having negative refracting power, and has generally negative refracting power.

The front subgroup is composed of a negative meniscus lens element $L1_1$ convex on its object side. The rear subgroup is composed of, in order from its object side, a doublet consisting of a double-convex positive lens element $L1_2$ and a double-concave negative lens element $L1_3$ and having generally negative refracting power and a positive meniscus lens element $L1_4$ convex on its object side.

The reflecting optical element R1 is configured in the form of a reflecting prism for bending an optical path through 90°.

It is noted that the aspect ratio of the effective image pickup area in each example of the invention is 3:4 and the optical path is bent in the lateral direction.

The second lens group G2 is composed of, in order from its object side, a doublet consisting of a positive meniscus lens element $L2_1$ convex on its object side and a negative meniscus lens element $L2_2$ convex on its object side and a double-convex positive lens element $L2_3$, and has generally positive refracting power.

The third lens group G3 is composed of a positive meniscus lens element $L3_1$ convex on its object side.

The fourth lens group G4 is composed of, in order from its object side, a doublet consisting of a double-convex positive lens element $L4_1$ and a double-concave negative lens element $L4_2$.

For zooming from the wide-angle end to the telephoto end of the zoom lens upon focused on an infinite object point, the first lens group G1 and the fourth lens group G4 remain fixed in place, the second lens group G2 moves together with the aperture stop S only toward the object side of the zoom lens, and the third lens group G3 moves only toward the object side while the spacing between the third and second lens groups G3 and G2 becomes wide and then narrow.

For focusing purposes, the third lens group G3 moves on the optical axis of the zoom lens.

Upon focusing, too, the fourth lens group G4 remains fixed in place.

Three aspheric surfaces are used; one at the image side-surface of the negative meniscus lens element $L1_1$ convex on its object side in the first lens group G1, one at the object side-surface of the positive meniscus lens element $L2_1$ convex on its object side in the second lens group G2 and one at the object side-surface of the double-convex positive lens element $L4_1$ in the fourth lens group G4.

The numerical data on the optical members that form Example 14 of the zoom lens will be given later. The symbols used in the numerical data on Example 14 have the following meanings:

$r_1, r_2, \ldots$ : radius of curvature of each lens surface
$d_1, d_2, \ldots$ : thickness of or air separation in each lens
$n_{d1}, n_{d2}, \ldots$ : d-line refractive index of each lens element
$\nu_{d1}, \nu_{d2}, \ldots$ : Abbe number of each lens element
Fno.: F-number
f: focal length of the zoom lens
ω: half angle of view
D0: distance from object to the first surface
WE: wide-angle end
ST: intermediate state
TE: telephoto end Here let z be an optical axis direction and y be a direction perpendicular to the optical axis. Then, aspheric configuration is given by $$z=(y^2/r)/[1+\{1-(K+1)(y/r)^2\}^{1/2}]+A_4y^4+A_6y^6+A_8y^8+A_{10}y^{10}$$

where r is a paraxial radius of curvature, K is a conical coefficient, and $A_4$, $A_6$, $A_8$ and $A_{10}$ are the fourth, sixth, eighth and tenth aspheric coefficients, respectively.

It is to be noted that these symbols are common to the numerical data given on the following examples.

EXAMPLE 15

Figure 17:
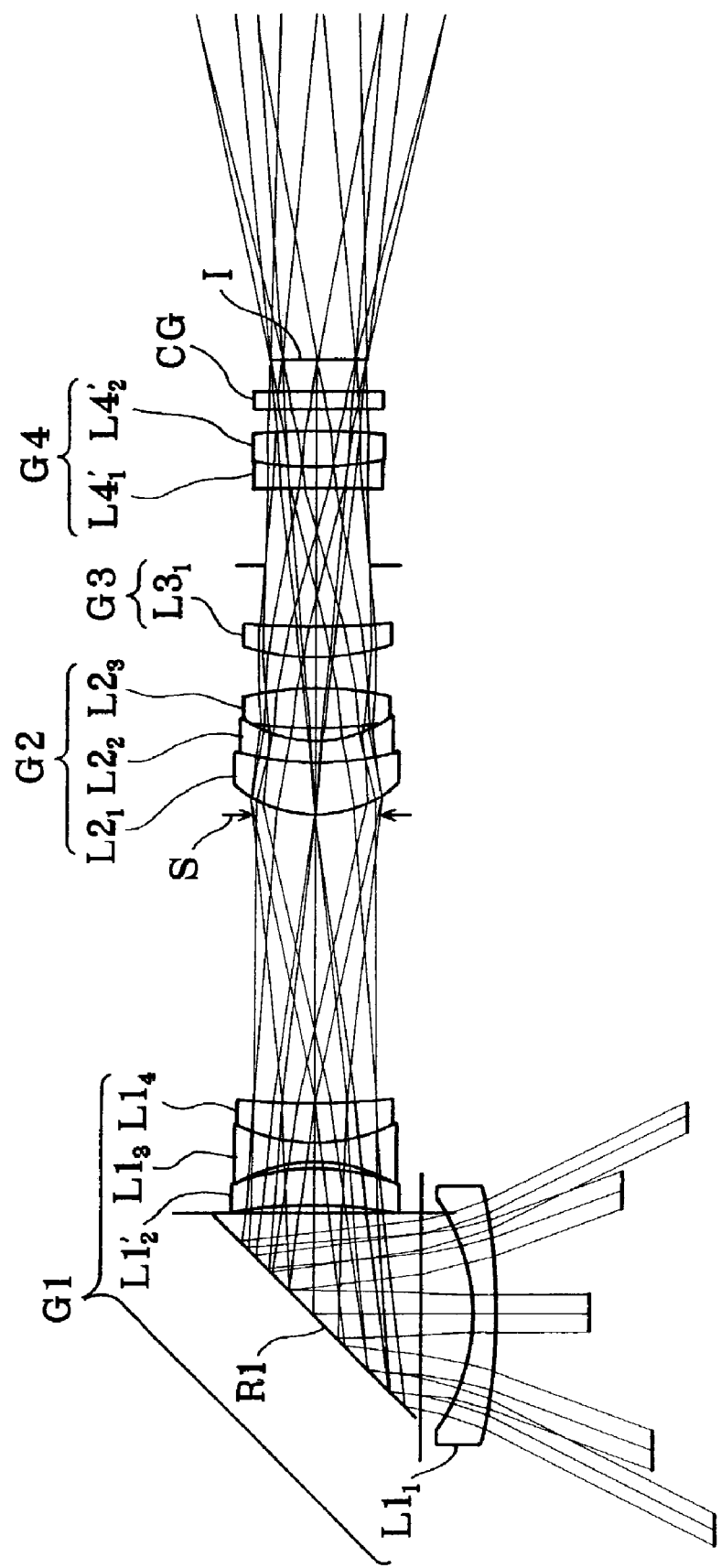
FIG. 17 is a sectional view illustrative along the optical axis of the optical construction of Example 15 of the zoom lens used with the electronic imaging system according to the present invention.
Figure 18A:
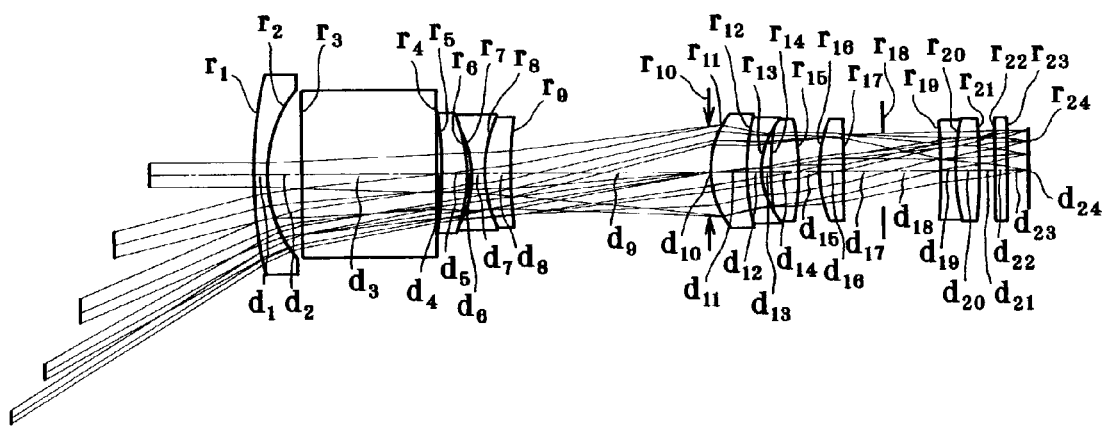
FIGS. 18(a), 18(b) and 18(c) are sectional views illustrative at the wide-angle end (a), in an intermediate state (b) and at the telephoto end (c) of the optical construction of Example 15 of the zoom lens when focused on an infinite object point.
Figure 18B:
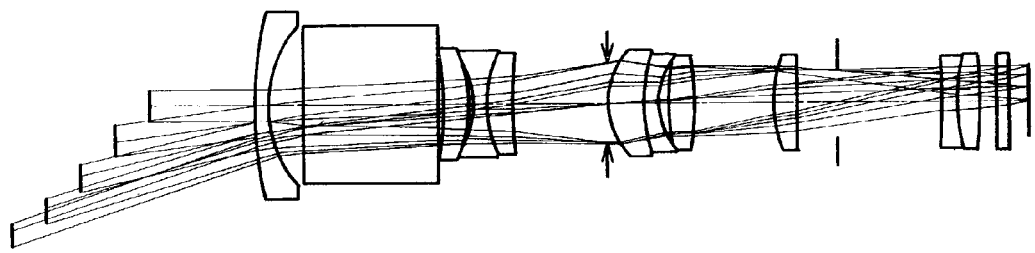
Figure 18C:
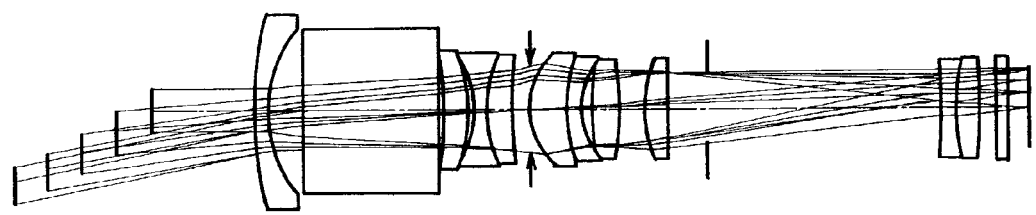

FIG. 17 is a sectional view illustrative of the optical construction of Example 15 of the zoom lens used with the electronic imaging system according to the present invention, as taken along the optical axis of the zoom lens, and shows in what state the optical path is bent upon focused on an infinite object point at the telephoto end of the zoom lens. FIGS. 18(a), 18(b) and 18(c) are illustrative in section of the optical construction of Example 15 of the zoom lens upon focused on an infinite object point, wherein (a), (b) and (c) show the states of the zoom lens at the wide-angle end, in an intermediate state and at the telephoto end, respectively.

As shown in FIG. 17, the electronic imaging system of Example 15 comprises, in order from its object side, a zoom lens and an electronic image pickup device CCD. In FIG. 17, the capital I indicates the image pickup plane of CCD. Between the zoom lens and the image pickup plane I there is provided a plane-parallel plate form of CCD cover glass CG.

The zoom lens comprises, in order from its object side, a first lens group G1, an aperture stop S, a second lens group G2, a third lens group G3 and a fourth lens group G4.

The first lens group G1 comprises, in order from its object side, a front subgroup, an optical path-bending, reflecting optical element R1 and a rear subgroup having negative refracting power, and has generally negative refracting power.

The front subgroup is composed of a negative meniscus lens element $L1_1$ convex on its object side. The rear subgroup is composed of, in order from its object side, a positive meniscus lens element $L1_2'$ concave on its object side and a doublet consisting of a double-concave negative lens element $L1_3$ and a positive meniscus lens element $L1_4$ convex on its object side and having generally negative refracting power.

The reflecting optical element R1 is configured in the form of a reflecting prism for bending an optical path through 90°.

It is noted that the aspect ratio of the effective image pickup area in each example of the invention is 3:4 and the optical path is bent in the lateral direction.

The second lens group G2 is composed of, in order from its object side, a doublet consisting of a positive meniscus lens element $L2_1$ convex on its object side and a negative meniscus lens element $L2_2$ convex on its object side and a double-convex positive lens element $L2_3$, and has generally positive refracting power.

The third lens group G3 is composed of a positive meniscus lens element $L3_1$ convex on its object side.

The fourth lens group G4 is composed of, in order from its object side, a doublet consisting of a double-concave negative lens element $L4_1'$ and a double-convex positive lens element $L4_2'$.

For zooming from the wide-angle end to the telephoto end of the zoom lens upon focused on an infinite object point, the first lens group G1 and the fourth lens group G4 remain fixed in place, the second lens group G2 moves together with the aperture stop S only toward the object side of the zoom lens, and the third lens group G3 moves only toward the object side while the spacing between the third and second lens groups G3 and G2 becomes wide and then narrow.

For focusing purposes, the third lens group G3 moves on the optical axis of the zoom lens.

Upon focusing, too, the fourth lens group G4 remains fixed in place.

Three aspheric surfaces are used; one at the image side-surface of the negative meniscus lens element $L1_1$ convex on its object side in the first lens group G1, one at the object side-surface of the positive meniscus lens element $L2_1$ convex on its object side in the second lens group G2 and one at the image side-surface of the double-convex positive lens element $L4_1'$ in the fourth lens group G4.

The numerical data on the optical members that form Example 15 of the zoom lens will be given later.

EXAMPLE 16

Figure 20A:
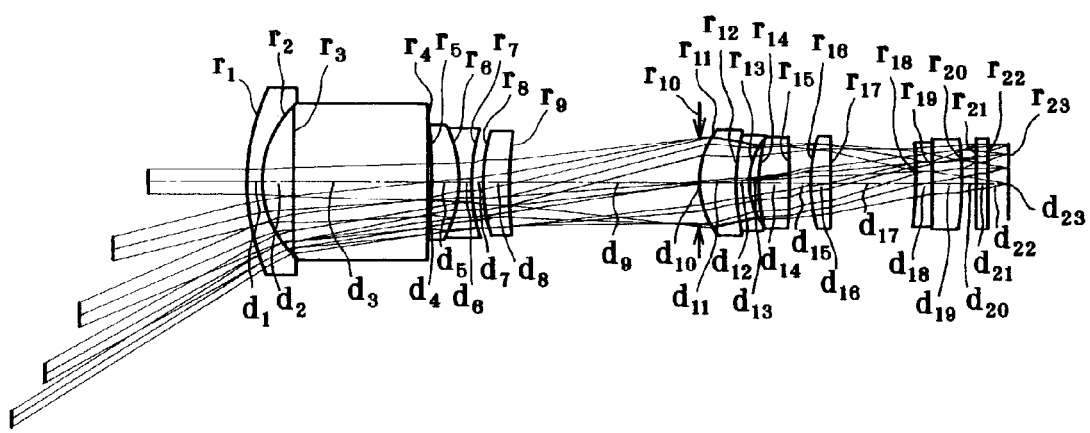
FIGS. 20(a), 20(b) and 20(c) are sectional views illustrative at the wide-angle end (a), in an intermediate state (b) and at the telephoto end (c) of the optical construction of Example 16 of the zoom lens when focused on an infinite object point.
Figure 20B:
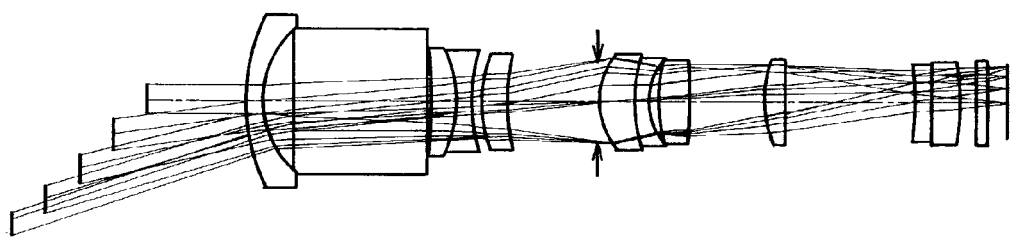
Figure 20C:
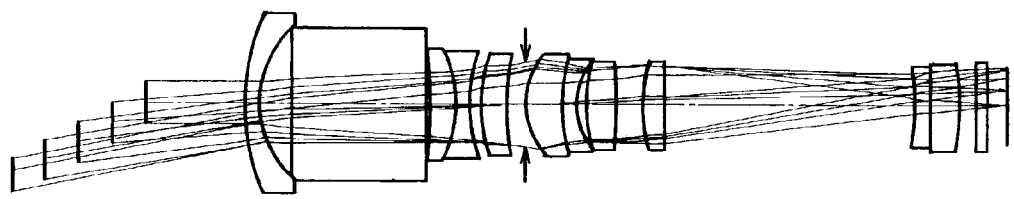

FIG. 19 is a sectional view illustrative of the optical construction of Example 16 of the zoom lens used with the electronic imaging system according to the present invention, as taken along the optical axis of the zoom lens, and shows in what state the optical path is bent upon focused on an infinite object point at the telephoto end of the zoom lens. FIGS. 20(*a*), 20(*b*) and 20(*c*) are illustrative in section of the optical construction of Example 16 of the zoom lens upon focused on an infinite object point, wherein (a), (b) and (c) show the states of the zoom lens at the wide-angle end, in an intermediate state and at the telephoto end, respectively.

As shown in FIG. 19, the electronic imaging system of Example 16 comprises, in order from its object side, a zoom lens and an electronic image pickup device CCD. In FIG. 17, the capital I indicates the image pickup plane of CCD. Between the zoom lens and the image pickup plane I there is provided a plane-parallel plate form of CCD cover glass CG.

The zoom lens comprises, in order from its object side, a first lens group G1, an aperture stop S, a second lens group G2, a third lens group G3 and a fourth lens group G4.

The first lens group G1 comprises, in order from its object side, a front subgroup, an optical path-bending, reflecting optical element R1 and a rear subgroup having negative refracting power, and has generally negative refracting power.

The front subgroup is composed of a negative meniscus lens element $L1_1$ convex on its object side. The rear subgroup is composed of, in order from its object side, a doublet consisting of a positive meniscus lens element $L1_2'$ concave on its object side and a double-concave negative lens element $L1_3$ and having generally negative refracting power and a positive meniscus lens element $L1_4$ convex on its object side.

The reflecting optical element R1 is configured in the form of a reflecting prism for bending an optical path through 90°.

It is noted that the aspect ratio of the effective image pickup area in each example of the invention is 3:4 and the optical path is bent in the lateral direction.

The second lens group G2 is composed of, in order from its object side, a doublet consisting of a positive meniscus lens element $L2_1$ convex on its object side and a negative meniscus lens element $L2_2$ convex on its object side and a double-convex positive lens element $L2_3$, and has generally positive refracting power.

The third lens group G3 is composed of a double-convex positive lens element $L3_1'$.

The fourth lens group G4 is composed of, in order from its object side, a doublet consisting of a negative lens element $L4_1''$ having a concave surface on its object side and a planar surface on its image side and a positive lens element $L4_2''$ having a planar surface on its object side and a convex surface on its image side.

For zooming from the wide-angle end to the telephoto end of the zoom lens upon focused on an infinite object point, the first lens group G1 and the fourth lens group G4 remain fixed in place, the second lens group G2 moves together with the aperture stop S only toward the object side of the zoom lens, and the third lens group G3 moves only toward the object side while the spacing between the third and second lens groups G3 and G2 becomes wide and then narrow.

For focusing purposes, the third lens group G3 moves on the optical axis of the zoom lens.

Upon focusing, too, the fourth lens group G4 remains fixed in place.

Three aspheric surfaces are used; one at the image side-surface of the negative meniscus lens element $L1_1$ convex on its object side in the first lens group G1, one at the object side-surface of the positive meniscus lens element $L2_1$ convex on its object side in the second lens group G2 and one at the image side-surface of the positive lens element $L4_2''$ having a planar surface on its object side and a convex surface on its image surface in the fourth lens group G4.

The numerical data on the optical members that form Examples 14 to 16 of the zoom lens are enumerated just below.

EXAMPLE 14

| | | | |
|---|---|---|---|
| $r_1 = 69.3459$ | | | |
| | $d_1 = 0.7000$ | $n_{d1} = 1.80610$ | $\nu_{d1} = 40.92$ |
| $r_2 = 4.6083$(Aspheric) | | | |
| | $d_2 = 1.7000$ | | |
| $r_3 = \infty$ | | | |
| | $d_3 = 6.8000$ | $n_{d3} = 1.80610$ | $\nu_{d3} = 40.92$ |
| $r_4 = \infty$ | | | |
| | $d_4 = 0.1500$ | | |
| $r_5 = 54.8200$ | | | |
| | $d_5 = 2.2000$ | $n_{d5} = 1.71736$ | $\nu_{d5} = 29.52$ |
| $r_6 = -8.5000$ | | | |
| | $d_6 = 0.7000$ | $n_{d6} = 1.80610$ | $\nu_{d6} = 40.92$ |
| $r_7 = 8.4123$ | | | |
| | $d_7 = 0.3500$ | | |
| $r_8 = 8.8098$ | | | |
| | $d_8 = 1.4000$ | $n_{d8} = 1.71736$ | $\nu_{d8} = 29.52$ |
| $r_9 = 131.4438$ | | | |
| | $d_9 = D9$ | | |
| $r_{10} = \infty$ (Stop) | | | |
| | $d_{10} = 0$ | | |
| $r_{11} = 3.6905$(Aspheric) | | | |
| | $d_{11} = 1.8000$ | $n_{d11} = 1.69350$ | $\nu_{d11} = 53.21$ |
| $r_{12} = 6.9000$ | | | |
| | $d_{12} = 0.7000$ | $n_{d12} = 1.84666$ | $\nu_{d12} = 23.78$ |
| $r_{13} = 3.5205$ | | | |
| | $d_{13} = 0.6000$ | | |
| $r_{14} = 41.4060$ | | | |
| | $d_{14} = 1.5000$ | $n_{d14} = 1.48749$ | $\nu_{d14} = 70.23$ |
| $r_{15} = -7.8730$ | | | |
| | $d_{15} = D15$ | | |
| $r_{16} = 7.3983$ | | | |
| | $d_{16} = 1.4000$ | $n_{d16} = 1.48749$ | $\nu_{d16} = 70.23$ |
| $r_{17} = 22.6658$ | | | |
| | $d_{17} = D17$ | | |
| $r_{18} = \infty$ (Variable Transmittance Means or Shutter) | | | |
| | $d_{18} = 4.0000$ | | |
| $r_{19} = 8.8186$(Aspheric) | | | |
| | $d_{19} = 1.8000$ | $n_{d19} = 1.69350$ | $\nu_{d19} = 53.21$ |
| $r_{20} = -6.0000$ | | | |
| | $d_{20} = 0.7000$ | $n_{d20} = 1.84666$ | $\nu_{d20} = 23.78$ |
| $r_{21} = 24.3642$ | | | |
| | $d_{21} = 0.7000$ | | |
| $r_{22} = \infty$ | | | |
| | $d_{22} = 0.6000$ | $n_{d22} = 1.51633$ | $\nu_{d22} = 64.14$ |
| $r_{23} = \infty$ | | | |
| | $d_{23} = D23$ | | |
| $r_{24} = \infty$ (Image Pick-up Plane) | | | |
| | $d_{24} = 0$ | | |

Aspherical Coefficients

2nd surface
$K = 0$
$A_2 = 0$  $A_4 = -1.3839 \times 10^{-3}$  $A_6 = -4.9944 \times 10^{-6}$
$A_8 = -3.2538 \times 10^{-6}$  $A_{10} = 0$ 11th surface
$K = 0$
$A_2 = 0$  $A_4 = -1.1930 \times 10^{-3}$  $A_6 = -2.3404 \times 10^{-5}$
$A_8 = -8.1742 \times 10^{-6}$  $A_{10} = 0$ 19th surface
$K = 0$
$A_2 = 0$  $A_4 = -1.3986 \times 10^{-4}$  $A_6 = -1.5479 \times 10^{-4}$
$A_8 = 1.5996 \times 10^{-5}$  $A_{10} = 0$ Zooming Data

| | WE | ST | TE |
|---|---|---|---|
| When D0 (distance from object to the first surface) is infinity($\infty$), | | | |
| f (mm) | 2.50881 | 4.33366 | 7.49747 |
| Fno. | 2.6859 | 3.4516 | 4.5092 |
| $\omega$ (°) | 39.7 | 24.8 | 14.5 |
| D0 | $\infty$ | $\infty$ | $\infty$ |
| D9 | 11.53831 | 5.32706 | 0.89925 |
| D15 | 1.10008 | 4.40521 | 1.29951 |
| D17 | 1.08630 | 4.00010 | 11.52593 |
| D23 | 1.00000 | 1.00000 | 1.00000 |
| When D0 (distance from object to the first surface) is near distance(16 cm), | | | |
| D0 | 162.6560 | 162.6560 | 162.6560 |
| D9 | 11.53831 | 5.32706 | 0.89925 |
| D15 | 1.02955 | 4.22279 | 0.81871 |
| D17 | 1.15683 | 4.18253 | 12.00672 |
| D23 | 1.00000 | 1.00000 | 1.00000 |

EXAMPLE 15

| | | | |
|---|---|---|---|
| $r_1 = 18.1048$ | | | |
| | $d_1 = 0.7000$ | $n_{d1} = 1.80610$ | $\nu_{d1} = 40.92$ |
| $r_2 = 5.9446$ (Aspheric) | | | |
| | $d_2 = 1.7000$ | | |
| $r_3 = \infty$ | | | |
| | $d_3 = 6.8000$ | $n_{d3} = 1.80610$ | $\nu_{d3} = 40.92$ |
| $r_4 = \infty$ | | | |
| | $d_4 = 0.2500$ | | |
| $r_5 = -15.8755$ | | | |
| | $d_5 = 1.2000$ | $n_{d5} = 1.77250$ | $\nu_{d5} = 49.60$ |
| $r_6 = -7.9342$ | | | |
| | $d_6 = 0.2000$ | | |
| $r_7 = -5.4811$ | | | |
| | $d_7 = 0.7000$ | $n_{d7} = 1.57099$ | $\nu_{d7} = 50.80$ |
| $r_8 = 6.5000$ | | | |
| | $d_8 = 1.3000$ | $n_{d8} = 1.80518$ | $\nu_{d8} = 25.42$ |
| $r_9 = 21.9926$ | | | |
| | $d_9 = D9$ | | |
| $r_{10} = \infty$ (Stop) | | | |
| | $d_{10} = 0$ | | |
| $r_{11} = 3.8249$ (Aspheric) | | | |
| | $d_{11} = 1.8000$ | $n_{d11} = 1.74320$ | $\nu_{d11} = 49.34$ |
| $r_{12} = 8.7000$ | | | |
| | $d_{12} = 0.7000$ | $n_{d12} = 1.84666$ | $\nu_{d12} = 23.78$ |
| $r_{13} = 3.5665$ | | | |
| | $d_{13} = 0.5000$ | | |
| $r_{14} = 14.6834$ | | | |
| | $d_{14} = 1.3000$ | $n_{d14} = 1.72916$ | $\nu_{d14} = 54.68$ |
| $r_{15} = -14.3114$ | | | |
| | $d_{15} = D15$ | | |
| $r_{16} = 7.2299$ | | | |
| | $d_{16} = 1.0500$ | $n_{d16} = 1.48749$ | $\nu_{d16} = 70.23$ |
| $r_{17} = 37.5176$ | | | |
| | $d_{17} = 2.0000$ | | |
| $r_{18} = \infty$ | | | |
| | $d_{18} = D18$ | | |
| $r_{19} = -39.6012$ | | | |
| | $d_{19} = 0.7000$ | $n_{d19} = 1.84666$ | $\nu_{d19} = 23.78$ |
| $r_{20} = 10.0000$ | | | |
| | $d_{20} = 1.2000$ | $n_{d20} = 1.74320$ | $\nu_{d20} = 49.34$ |
| $r_{21} = -17.1302$ (Aspheric) | | | |
| | $d_{21} = 0.7000$ | | |
| $r_{22} = \infty$ | | | |
| | $d_{22} = 0.6000$ | $n_{d22} = 1.51633$ | $\nu_{d22} = 64.14$ |

-continued

| | |
|---|---|
| $r_{23} = \infty$ | |
| | $d_{23} = D23$ |
| $r_{24} = \infty$ (Image Pick-up Plane) | |
| | $d_{24} = 0$ |

Aspherical Coefficients

2nd surface
$K = 0$
$A_2 = 0$   $A_4 = -2.5409 \times 10^{-4}$   $A_6 = -1.8273 \times 10^{-5}$
$A_8 = -3.9239 \times 10^{-7}$   $A_{10} = 0$ 11th surface
$K = 0$
$A_2 = 0$   $A_4 = -1.0303 \times 10^{-3}$   $A_6 = -2.5041 \times 10^{-5}$
$A_8 = -5.4268 \times 10^{-6}$   $A_{10} = 0$ 21th surface
$K = 0$
$A_2 = 0$   $A_4 = 7.1492 \times 10^{-4}$   $A_6 = 3.4398 \times 10^{-4}$
$A_8 = -3.5902 \times 10^{-5}$   $A_{10} = 0$ Zooming Data

| | WE | ST | TE |
|---|---|---|---|
| When D0 (distance from object to the first surface) is infinity($\infty$), | | | |
| f (mm) | 3.25250 | 5.64370 | 9.74816 |
| Fno. | 2.7058 | 3.4789 | 4.5017 |
| $\omega$ (°) | 32.6 | 19.5 | 11.3 |
| D0 | $\infty$ | $\infty$ | $\infty$ |
| D9 | 9.75120 | 4.59700 | 0.89810 |
| D15 | 1.09986 | 3.92831 | 1.29837 |
| D18 | 2.66550 | 4.99975 | 11.32016 |
| D23 | 1.00000 | 1.00000 | 1.00000 |
| When D0 (distance from object to the first surface) is near distance(16 cm), | | | |
| D0 | 162.6560 | 162.6560 | 162.6560 |
| D9 | 9.75120 | 4.59700 | 0.89810 |
| D15 | 1.01401 | 3.70564 | 0.72133 |
| D18 | 2.75134 | 5.22242 | 11.89720 |
| D23 | 1.00000 | 1.00000 | 1.00000 |

EXAMPLE 16

| | |
|---|---|
| $r_1 = 10.9287$ | |
| | $d_1 = 0.7000$   $n_{d1} = 1.80610$   $\nu_{d1} = 40.92$ |
| $r_2 = 4.8122$(Aspheric) | |
| | $d_2 = 1.5500$ |
| $r_3 = \infty$ | |
| | $d_3 = 6.8000$   $n_{d3} = 1.80610$   $\nu_{d3} = 40.92$ |
| $r_4 = \infty$ | |
| | $d_4 = 0.1500$ |
| $r_5 = -79.5466$ | |
| | $d_5 = 1.3000$   $n_{d5} = 1.75520$   $\nu_{d5} = 27.51$ |
| $r_6 = -6.5000$ | |
| | $d_6 = 0.7000$   $n_{d6} = 1.80610$   $\nu_{d6} = 40.92$ |
| $r_7 = 8.2436$ | |
| | $d_7 = 0.5000$ |

-continued

| | |
|---|---|
| $r_8 = 7.4880$ | |
| | $d_8 = 1.3000$   $n_{d8} = 1.84666$   $\nu_{d8} = 23.78$ |
| $r_9 = 13.0280$ | |
| | $d_9 = D9$ |
| $r_{10} = \infty$ (Stop) | |
| | $d_{10} = 0$ |
| $r_{11} = 3.7669$(Aspheric) | |
| | $d_{11} = 1.8000$   $n_{d11} = 1.74320$   $\nu_{d11} = 49.34$ |
| $r_{12} = 8.0000$ | |
| | $d_{12} = 0.7000$   $n_{d12} = 1.84666$   $\nu_{d12} = 23.78$ |
| $r_{13} = 3.3737$ | |
| | $d_{13} = 0.5000$ |
| $r_{14} = 8.4174$ | |
| | $d_{14} = 1.5000$   $n_{d14} = 1.72916$   $\nu_{d14} = 54.68$ |
| $r_{15} = -28.9216$ | |
| | $d_{15} = D15$ |
| $r_{16} = 7.6784$ | |
| | $d_{16} = 1.0500$   $n_{d16} = 1.48749$   $\nu_{d16} = 70.23$ |
| $r_{17} = -1722.3948$ | |
| | $d_{17} = D17$ |
| $r_{18} = -12.1628$ | |
| | $d_{18} = 0.7000$   $n_{18} = 1.84666$   $\nu_{d18} = 23.78$ |
| $r_{19} = \infty$ | |
| | $d_{19} = 1.6000$   $n_{d19} = 1.74320$   $\nu_{d19} = 49.34$ |
| $r_{20} = -11.2101$(Aspheric) | |
| | $d_{20} = 0.7000$ |
| $r_{21} = \infty$ | |
| | $d_{21} = 0.6000$   $n_{d21} = 1.51633$   $\nu_{d21} = 64.14$ |
| $r_{22} = \infty$ | |
| | $d_{22} = D22$ |
| $r_{23} = \infty$ (Image Pick-up Plane) | |
| | $d_{23} = 0$ |

Aspherical Coefficients

2nd surface
$K = 0$
$A_2 = 0$   $A_4 = -3.2755 \times 10^{-5}$   $A_6 = -3.4477 \times 10^{-5}$
$A_8 = 9.7425 \times 10^{-8}$   $A_{10} = 0$ 11th surface
$K = 0$
$A_2 = 0$   $A_4 = -1.0080 \times 10^{-3}$   $A_6 = -1.8736 \times 10^{-5}$
$A_8 = -6.2191 \times 10^{-6}$   $A_{10} = 0$ 20th surface
$K = 0$
$A_2 = 0$   $A_4 = 4.2956 \times 10^{-4}$   $A_6 = 5.2969 \times 10^{-4}$
$A_8 = -5.4664 \times 10^{-5}$   $A_{10} = 0$ Zooming Data

| | WE | ST | TE |
|---|---|---|---|
| When D0 (distance from object to the first surface) is infinity($\infty$), | | | |
| f (mm) | 3.25606 | 5.64124 | 9.74748 |
| Fno. | 2.7505 | 3.5079 | 4.5204 |
| $\omega$ (°) | 32.6 | 19.5 | 11.3 |
| D0 | $\infty$ | $\infty$ | $\infty$ |
| D9 | 9.41588 | 4.43316 | 0.89783 |
| D15 | 1.10006 | 3.71349 | 1.29897 |
| D17 | 4.24487 | 6.62213 | 12.56406 |
| D22 | 1.00000 | 1.00000 | 1.00000 |

-continued

Zooming Data

| | WE | ST | TE |
|---|---|---|---|
| When D0 (distance from object to the first surface) is near distance(16 cm), | | | |
| D0 | 162.6560 | 162.6560 | 162.6560 |
| D9 | 9.41588 | 4.43316 | 0.89783 |
| D15 | 1.02958 | 3.53180 | 0.80556 |
| D17 | 4.31535 | 6.80382 | 13.05747 |
| D22 | 1.00000 | 1.00000 | 1.00000 |

The values of L, conditions (41) to (53) and (28) to (31) and a in Examples 14 to 16 are now tabulated below.

TABLE

| | 絞り14 | 絞り15 | 絞り16 |
|---|---|---|---|
| L | 3.96 | 3.96 | 3.96 |
| $\beta_{Rt}$ | −1.44704 | −1.71738 | −1.85432 |
| $R_{21R}/R_{21F}$ | 0.95394 | 0.93244 | 0.89562 |
| $L/R_{21C}$ | 0.57391 | 0.45517 | 0.49500 |
| $\nu_{21F} - \nu_{21R}$ | 29.43 | 25.56 | 25.56 |
| L/fD | 0.09555 | 0.05099 | 0.01058 |
| $\nu_{4P} - \nu_{4N}$ | 29.43 | 25.56 | 25.56 |
| $(R_{11F} + R_{11R})/(R_{11F} - R_{11R})$ | 1.14237 | 1.97764 | 2.57351 |
| $f_{11}/f_{12}$ | 0.08793 | 0.62729 | 0.72786 |
| $(R_{12R}/R_{13F})^P$ | 0.95488 | 0.69082 | 1.10091 |
| $\nu_{A2N} - \nu_{A2P}$ | 11.4 | 25.38 | 13.41 |
| $Q \cdot L/R_{A2C}$ | 0.46588 | 0.60923 | 0.60923 |
| fT/fw | 2.98846 | 2.99713 | 2.99364 |
| τ 600/τ 550 | 1.0 | 1.0 | 1.0 |
| τ 700/τ 550 | 0.04 | 0.04 | 0.04 |
| τ 400/τ 550 | 0.0 | 0.0 | 0.0 |
| τ 440/τ 550 | 1.06 | 1.06 | 1.06 |
| a (μm) | 2.0 | 2.0 | 2.0 |

Throughout Examples 14 to 16 of the present invention, the optical path is bent in the long side (horizontal) direction of the electronic image pickup device. Although the bending of the optical path in the short side (vertical) direction is advantageous for size reductions because the space for bending becomes small, it is preferable to bend the optical path not only in the short side direction but also in the long side direction, because the freedom in designing a camera with a built-in zoom lens becomes high.

Although any low-pass filter is not built in each example, it is acceptable to use the low-pass filter.

Figure 21:
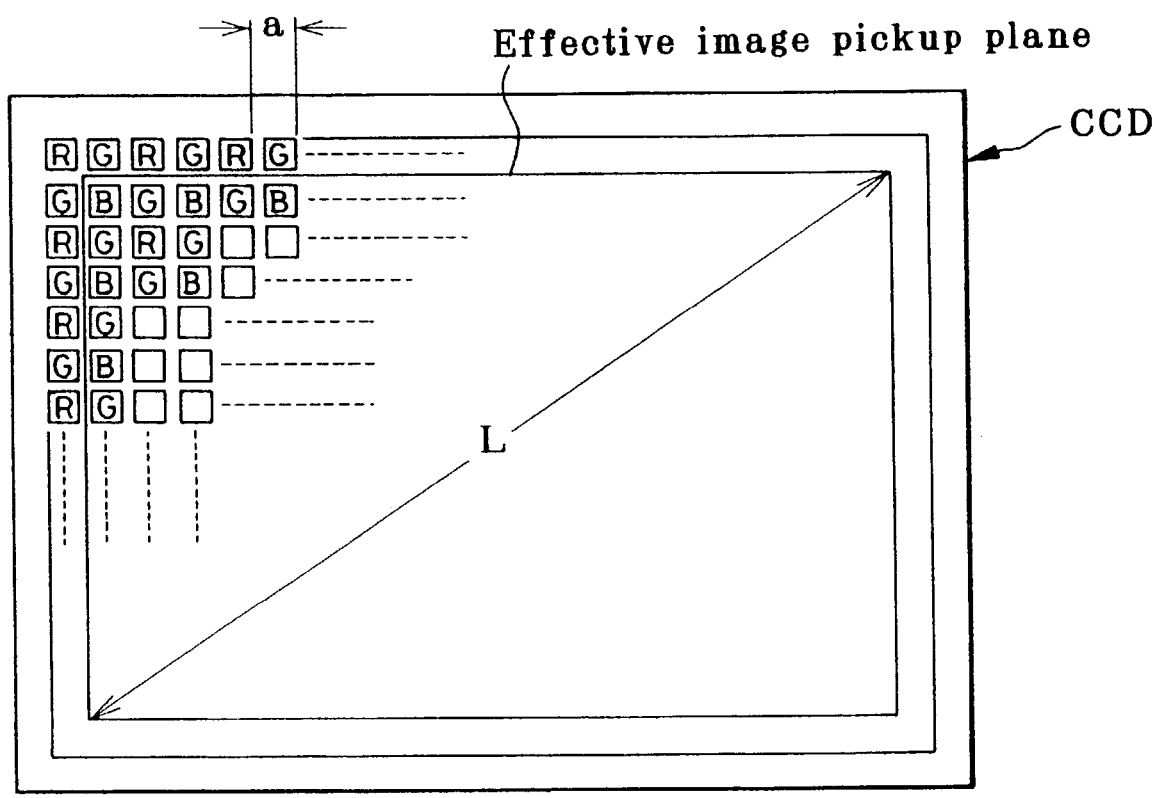
FIG. 21 is illustrative of the diagonal length of the effective image pickup plane of an electronic image pickup device upon phototaking.

Here the diagonal length L of the effective image pickup plane of the electronic image pickup device and the pixel spacing a are explained. FIG. 21 is illustrative of one exemplary pixel array for the electronic image pickup device, wherein R (red), G (green) and B (blue) pixels or four pixels, i.e., cyan, magenta, yellow and green (G) pixels (see FIG. 24) are mosaically arranged at the pixel spacing a. The "effective image pickup plane" used herein is understood to mean a certain area in the photoelectric conversion surface on an image pickup device used for the reproduction of a phototaken image (on a personal computer or by a printer). The effective image pickup plane shown in FIG. 21 is set at an area narrower than the total photoelectric conversion surface on the image pickup device, depending on the performance of the optical system used (an image circle that can be ensured by the performance of the optical system). The diagonal length L of an effective image pickup plane is thus defined by that of the effective image pickup plane. Although the image pickup range used for image reproduction may be variable, it is noted that when the zoom lens of the present invention is used on an image pickup apparatus having such functions, the diagonal length L of its effective image pickup plane varies. In that case, the diagonal length L of the effective image pickup plane according to the present invention is defined by the maximum value in the widest possible range for L.

In each example of the present invention, on the image side of the final lens group there is provided a near-infrared cut filter or an optical low-pass filter LF with a near-infrared cut coat surface applied on its entrance side. This near-infrared cut filter or near-infrared cut coat surface is designed to have a transmittance of at least 80% at 600 nm wavelength and a transmittance of up to 10% at 700 nm wavelength. More specifically, the near-infrared cut filter or the near-infrared sharp cut coat has a multilayer structure made up of such 27 layers as mentioned below; however, the design wavelength is 780 nm.

| Substrate | Material | Physical Thickness (nm) | λ/4 |
|---|---|---|---|
| 1st layer | $Al_2O_3$ | 58.96 | 0.50 |
| 2nd layer | $TiO_2$ | 84.19 | 1.00 |
| 3rd layer | $SiO_2$ | 134.14 | 1.00 |
| 4th layer | $TiO_2$ | 84.19 | 1.00 |
| 5th layer | $SiO_2$ | 134.14 | 1.00 |
| 6th layer | $TiO_2$ | 84.19 | 1.00 |
| 7th layer | $SiO_2$ | 134.14 | 1.00 |
| 8th layer | $TiO_2$ | 84.19 | 1.00 |
| 9th layer | $SiO_2$ | 134.14 | 1.00 |
| 10th layer | $TiO_2$ | 84.19 | 1.00 |
| 11th layer | $SiO_2$ | 134.14 | 1.00 |
| 12th layer | $TiO_2$ | 84.19 | 1.00 |
| 13th layer | $SiO_2$ | 134.14 | 1.00 |
| 14th layer | $TiO_2$ | 84.19 | 1.00 |
| 15th layer | $SiO_2$ | 178.41 | 1.33 |
| 16th layer | $TiO_2$ | 101.03 | 1.21 |
| 17th layer | $SiO_2$ | 167.67 | 1.25 |
| 18th layer | $TiO_2$ | 96.82 | 1.15 |
| 19th layer | $SiO_2$ | 147.55 | 1.05 |
| 20th layer | $TiO_2$ | 84.19 | 1.00 |
| 21st layer | $SiO_2$ | 160.97 | 1.20 |
| 22nd layer | $TiO_2$ | 84.19 | 1.00 |
| 23rd layer | $SiO_2$ | 154.26 | 1.15 |
| 24th layer | $TiO_2$ | 95.13 | 1.13 |
| 25th layer | $SiO_2$ | 160.97 | 1.20 |
| 26th layer | $TiO_2$ | 99.34 | 1.18 |
| 27th layer | $SiO_2$ | 87.19 | 0.65 |

Air

Figure 22:
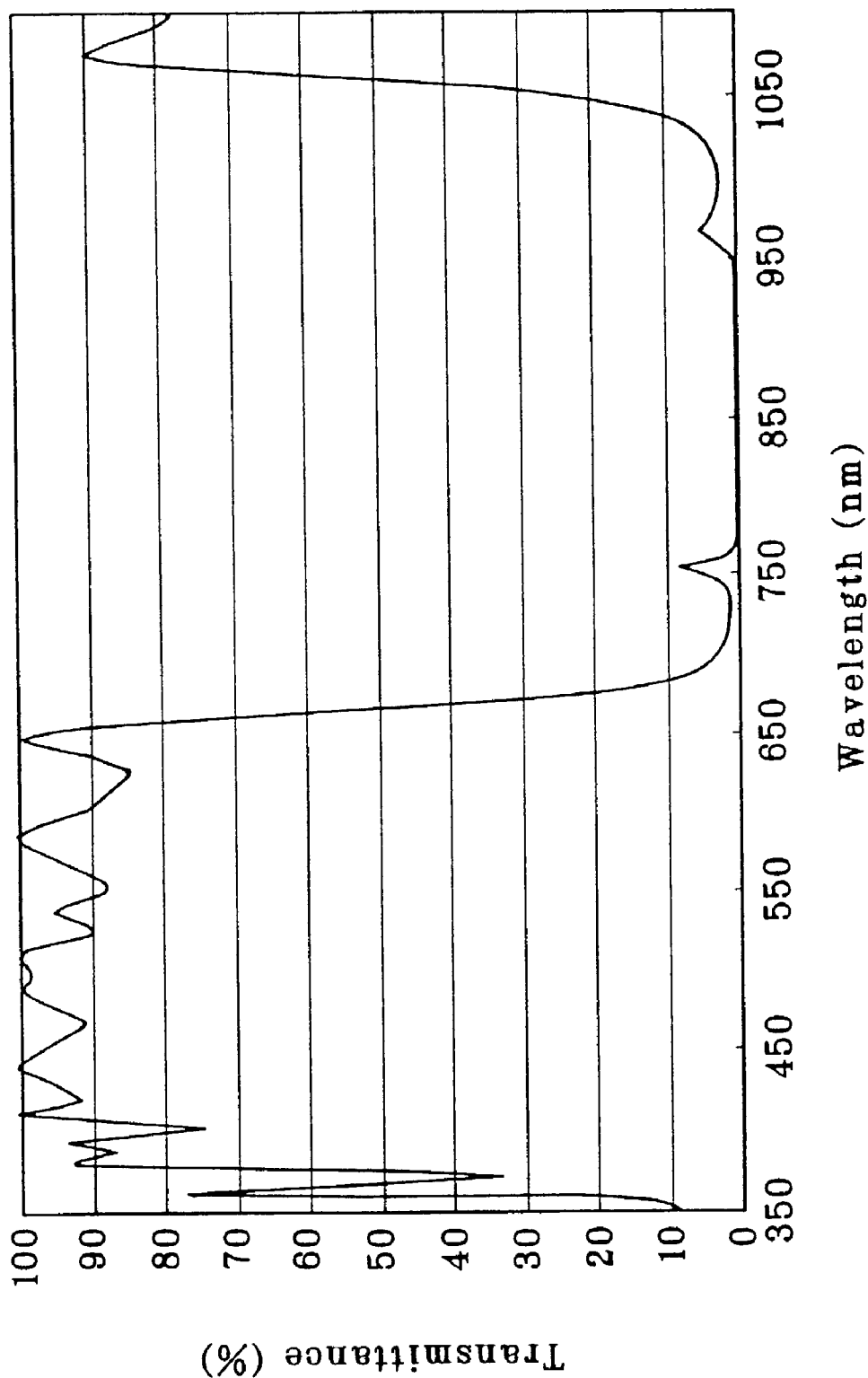
FIG. 22 is a diagram indicative of the transmittance characteristics of one example of the near-infrared sharp cut coat.

The aforesaid near-infrared sharp cut coat has such transmittance characteristics as shown in FIG. 22.

Figure 23:
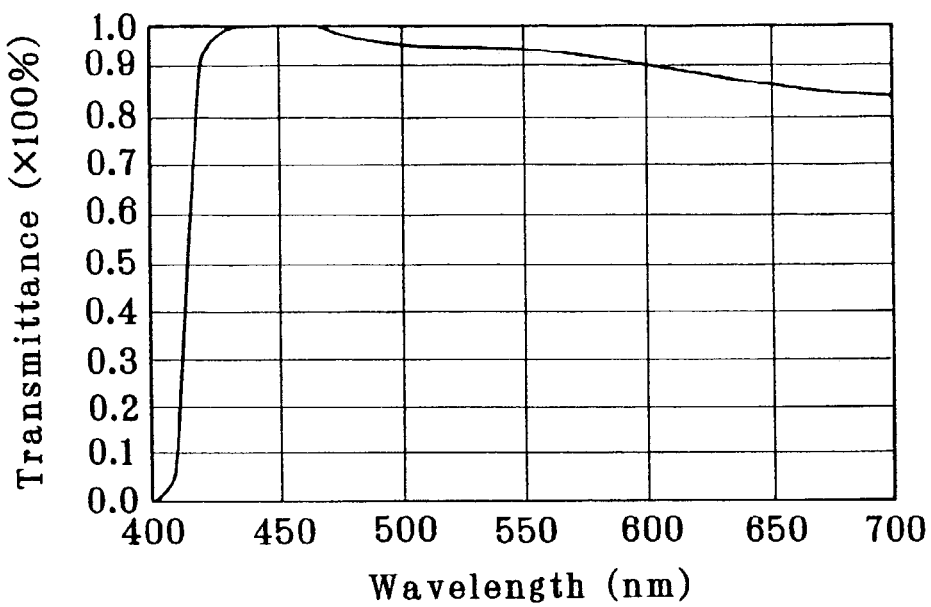
FIG. 23 is a diagram indicative of the transmittance characteristics of one example of the color filter located on the exit surface side of the low-pass filter.

The low-pass filter LF is provided on its exit surface side with a color filter or coat for reducing the transmission of colors at such a short wavelength region as shown in FIG. 23, thereby making the color reproducibility of an electronic image much higher.

Preferably, that filter or coat should be designed such that the ratio of the transmittance of 420 nm wavelength with respect to the transmittance of a wavelength in the range of 400 nm to 700 nm at which the highest transmittance is found is at least 15% and that the ratio of 400 nm wavelength with respect to the highest wavelength transmittance is up to 6%.

It is thus possible to reduce a discernible difference between the colors perceived by the human eyes and the colors of the image to be picked up and reproduced. In other words, it is possible to prevent degradation in images due to the fact that a color of short wavelength less likely to be perceived through the human sense of sight can be readily seen by the human eyes.

When the ratio of the 400 nm wavelength transmittance is greater than 6%, the short wavelength region less likely to be perceived by the human eyes would be reproduced with perceivable wavelengths. Conversely, when the ratio of the 420 nm wavelength transmittance is less than 15%, a wavelength region perceivable by the human eyes is less likely to be reproduced, putting colors in an ill-balanced state.

Such means for limiting wavelengths can be more effective for imaging systems using a complementary colors mosaic filter.

In each of the aforesaid examples, coating is applied in such a way that, as shown in FIG. 23, the transmittance for 400 nm wavelength is 0%, the transmittance for 420 nm is 90%, and the transmittance for 440 nm peaks or reaches 100%.

With the synergistic action of the aforesaid near-infrared sharp cut coat and that coating, the transmittance for 400 nm is set at 0%, the transmittance for 420 nm at 80%, the transmittance for 600 nm at 82%, and the transmittance for 700 nm at 2% with the transmittance for 450 nm wavelength peaking at 99%, thereby ensuring more faithful color reproduction.

The low-pass filter LF is made up of three different filter elements stacked one upon another in the optical axis direction, each filter element having crystal axes in directions where, upon projected onto the image plane, the azimuth angle is horizontal (=0°) and ±45° therefrom. Three such filter elements are mutually displaced by a µm in the horizontal direction and by SQRT(½)×a in the ±45° direction for the purpose of moiré control, wherein SQRT means a square root.

Figure 24:
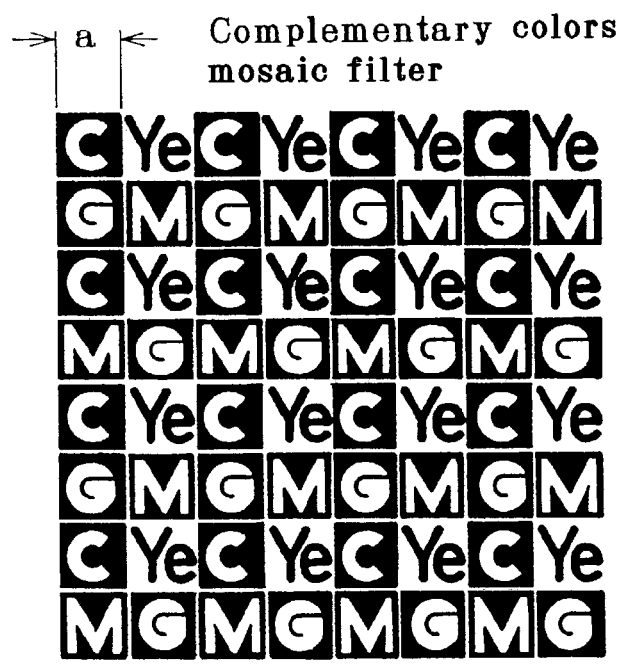
FIG. 24 is a schematic illustrative of how the color filter elements are arranged in the complementary colors mosaic filter.

The image pickup plane I of a CCD is provided thereon with a complementary colors mosaic filter wherein, as shown in FIG. 24, color filter elements of four colors, cyan, magenta, yellow and green are arranged in a mosaic fashion corresponding to image pickup pixels. More specifically, these four different color filter elements, used in almost equal numbers, are arranged in such a mosaic fashion that neighboring pixels do not correspond to the same type of color filter elements, thereby ensuring more faithful color reproduction.

To be more specific, the complementary colors mosaic filter is composed of at least four different color filter elements as shown in FIG. 24, which should preferably have such characteristics as given below.

Each green color filter element G has a spectral strength peak at a wavelength $G_P$, each yellow filter element $Y_e$ has a spectral strength peak at a wavelength $Y_P$, each cyan filter element C has a spectral strength peak at a wavelength $C_P$, and each magenta filter element M has spectral strength peaks at wavelengths $M_{P1}$ and $M_{P2}$, and these wavelengths satisfy the following conditions.

510 nm<$G_P$<540 nm 5 nm<$Y_P$−$G_P$<35 nm

−100 nm<$C_P$−$G_P$<−5 nm 430 nm<$M_{P1}$<480 nm 580 nm<$M_{P2}$<640 nm

To ensure higher color reproducibility, it is preferred that the green, yellow and cyan filter elements have a strength of at least 80% at 530 nm wavelength with respect to their respective spectral strength peaks, and the magenta filter elements have a strength of 10% to 50% at 530 nm wavelength with their spectral strength peak.

Figure 25:
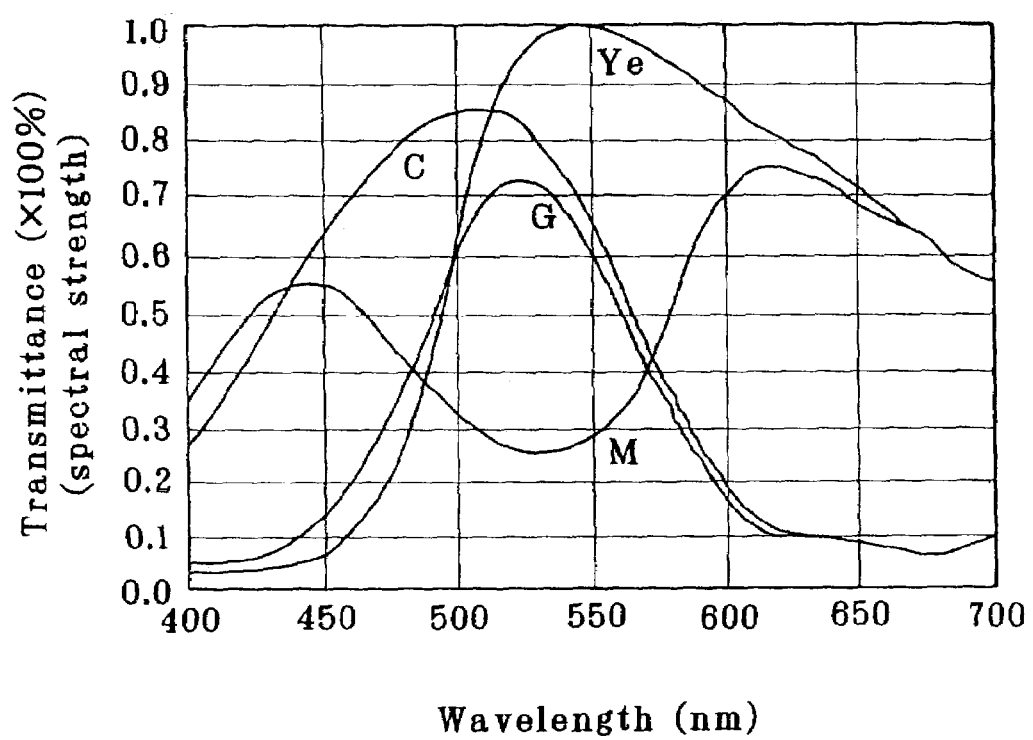
FIG. 25 is a diagram indicative of one example of the wavelength characteristics of the complementary colors mosaic filter.

One example of the wavelength characteristics in the aforesaid respective examples is shown in FIG. 25. The green filter element G has a spectral strength peak at 525 nm. The yellow filter element $Y_e$ has a spectral strength peak at 555 nm. The cyan filter element C has a spectral strength peak at 510 nm. The magenta filter element M has peaks at 445 nm and 620 nm. At 530 nm, the respective color filter elements have, with respect to their respective spectral strength peaks, strengths of 99% for G, 95% for $Y_e$, 97% for C and 38% for M.

For such a complementary colors filter, such signal processing as mentioned below is electrically carried out by means of a controller (not shown) (or a controller used with digital cameras).

For luminance signals, $$Y=|G+M+Y_e+C\times|\frac{1}{4}$$

For chromatic signals, $$R-Y=|(M+Y_e)-(G+C)|$$

$$B-Y=|(M+C)-(G+Y_e)|$$

Through this signal processing, the signals from the complementary colors filter are converted into R (red), G (green) and B (blue) signals.

In this regard, it is noted that the aforesaid near-infrared sharp cut coat may be located anywhere on the optical path, and that the number of low-pass filters LF may be either two as mentioned above or one.

Figure 26:
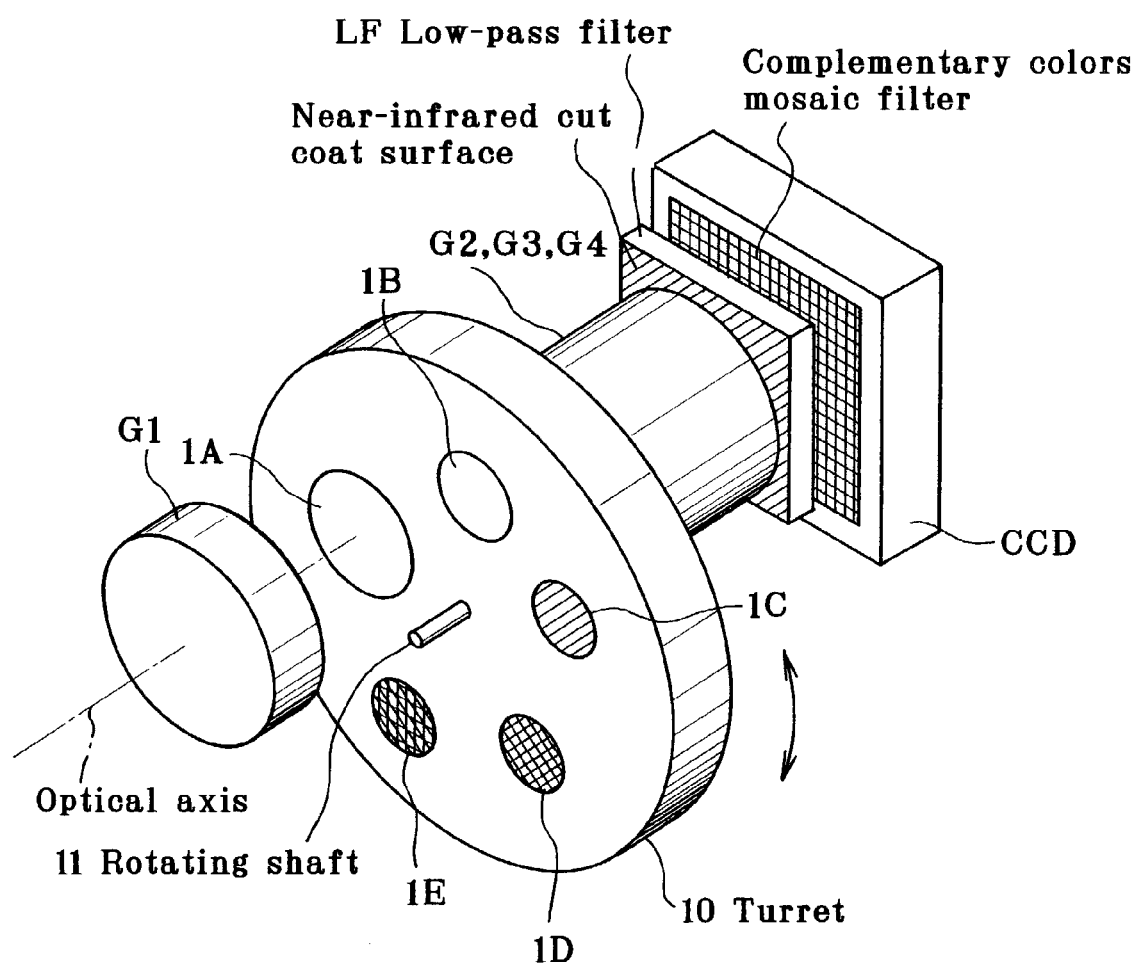
FIG. 26 is a perspective view of details of one example of an aperture stop portion used in each example.

Details of the aperture stop portion in each example are shown in FIG. 26 in conjunction with a four-group arrangement, wherein the first lens group G1 excepting the optical path-bending prism P is shown. At a stop position on the optical axis between the first lens group G1 and the second lens group G2 in the phototaking optical system, there is located a turret 10 capable of brightness control at 0 stage, −1 stage, −2 stage, −3 state and −4 stage. The turret 10 is composed of an aperture 1A for 0 stage control, which is defined by a circular fixed space of about 4 mm in diameter (with a transmittance of 100% with respect to 550 nm wavelength), an aperture 1B for −1 stage correction, which is defined by a transparent plane-parallel plate having a fixed aperture shape with an aperture area nearly half that of the aperture 1A (with a transmittance of 99% with respect to 550 nm wavelength), and circular apertures 1C, 1D and 1E for −2, −3 and −4 stage corrections, which have the same aperture area as that of the aperture 1B and are provided with ND filters having the respective transmittances of 50%, 25% and 13% with respect to 550 nm wavelength.

By turning of the turret 10 around a rotating shaft 11, any one of the apertures is located at the stop position, thereby controlling the quantity of light.

The turret 10 is also designed that when the effective F-number $F_{no}'$ is $F_{no}'$>a/0.4 µm, an ND filter with a transmittance of less than 80% with respect to 550 nm wavelength is inserted in the aperture. Referring specifically to Example 1, the effective F-number at the telephoto end satisfies the following condition when the effective F-number becomes 9.0 at the −2 stage with respect to the stop-in (0) stage, and the then corresponding aperture is 1C, whereby any image degradation due to a diffraction phenomenon by the stop is prevented.

Figure 27A:
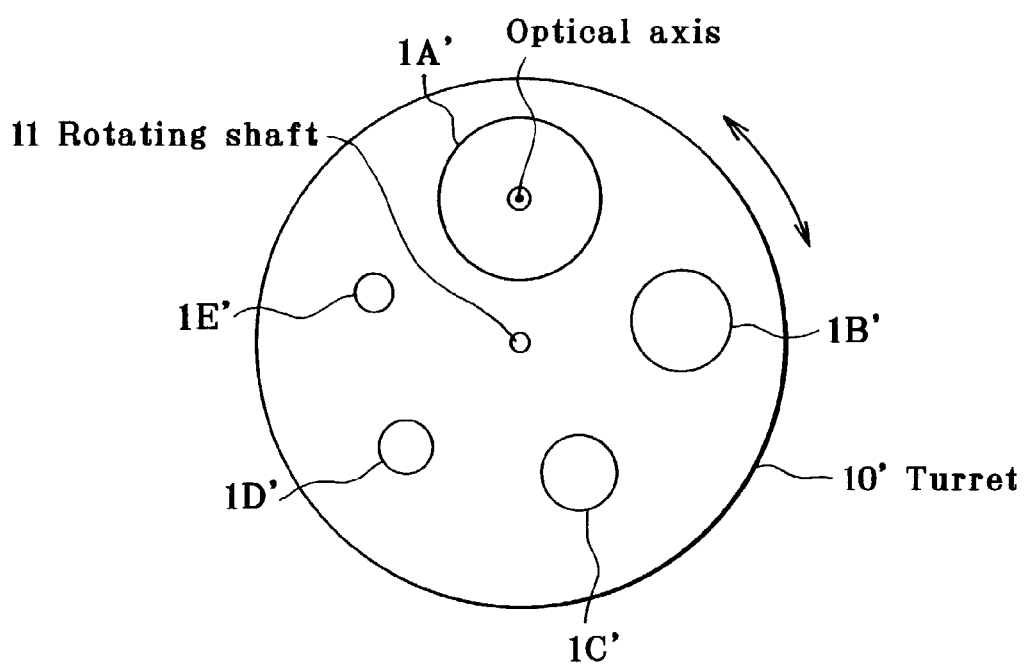
FIG. 27 is illustrative in detail of another example of the aperture stop portion used in each example.

Instead of the turret 10 shown in FIG. 26, it is acceptable to use a turret 10' shown in FIG. 27(a). This turret 10' capable of brightness control at 0 stage, −1 stage, −2 stage, −3 stage and −4 stage is located at the aperture stop position on the optical axis between the first lens group G1 and the second lens group G2 in the phototaking optical system. The turret 10' is composed of an aperture 1A' for 0 stage control, which is defined by a circular fixed space of about 4 mm in diameter, an aperture 1B' for −1 stage correction, which is of a fixed aperture shape with an aperture area nearly half that of the aperture 1A', and apertures 1C', 1D' and 1E' for −2, −3 and −4 stage corrections, which are of fixed shape with decreasing areas in this order. By turning of the turret 10' around a rotating shaft 11, any one of the apertures is located at the stop position thereby controlling the quantity of light.

Figure 27B:
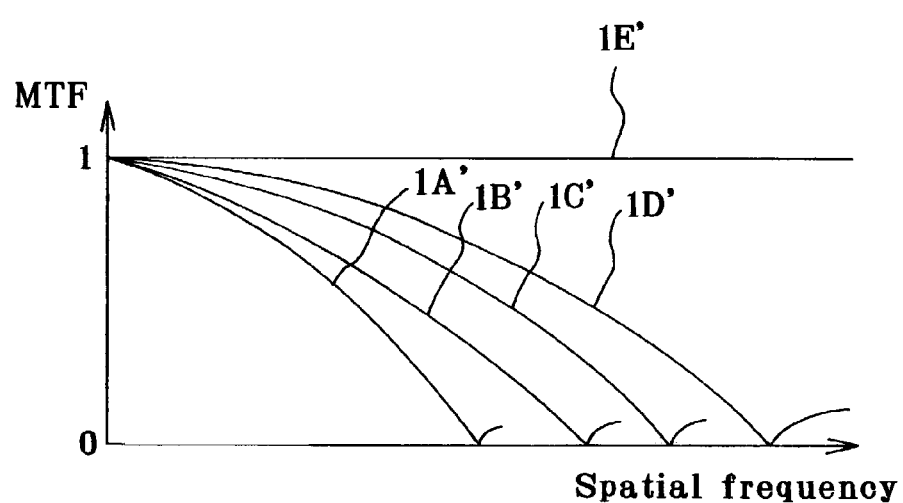

Further, optical low-pass filters having varying spatial frequency characteristics are located in association with 1A' to 1D' of plural such apertures. Then, as shown in FIG. 27(b), the spatial frequency characteristics of the optical filters are designed in such a way that as the aperture diameter becomes small, they become high, thereby preventing image degradations due to a diffraction phenomenon by stop-down. Each curve in FIG. 27(b) is indicative of the spatial frequency characteristics of the low-pass filters alone, wherein all the characteristics including diffraction by the stop are set in such a way as to be equal to one another.

The present electronic imaging system constructed as described above may be applied to phototaking systems where object images formed through zoom lenses are received at image pickup devices such as CCDs or silver-halide films, inter alia, digital cameras or video cameras as well as PCs and telephone sets which are typical information processors, in particular, easy-to-carry cellular phones. Given below are some such embodiments.

Figure 28:
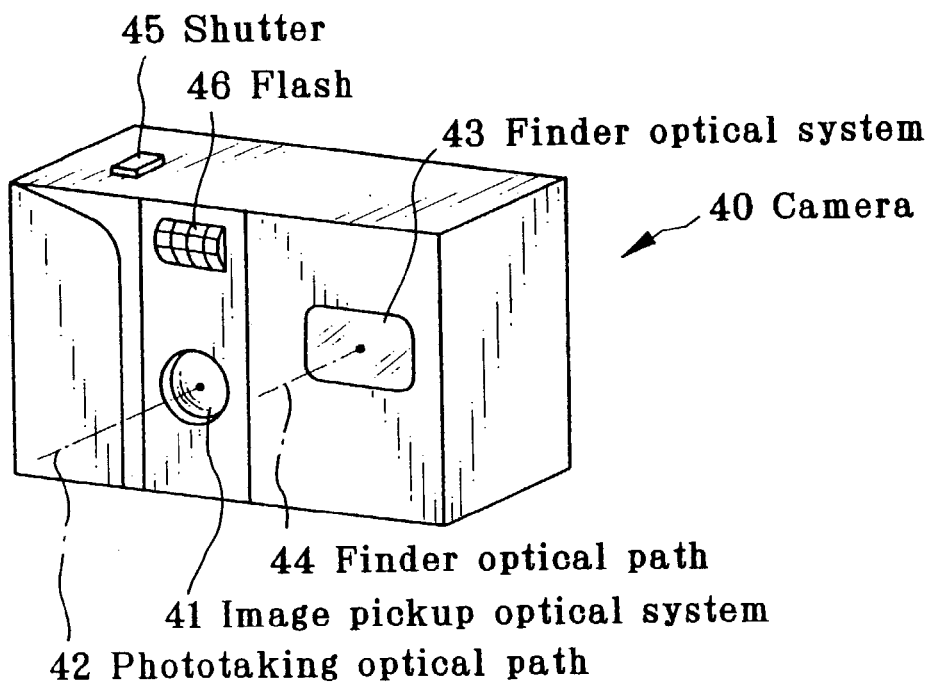
FIG. 28 is a front perspective schematic illustrative of the outside shape of a digital camera in which the optical path-bending zoom optical system of the present invention is built.
Figure 29:
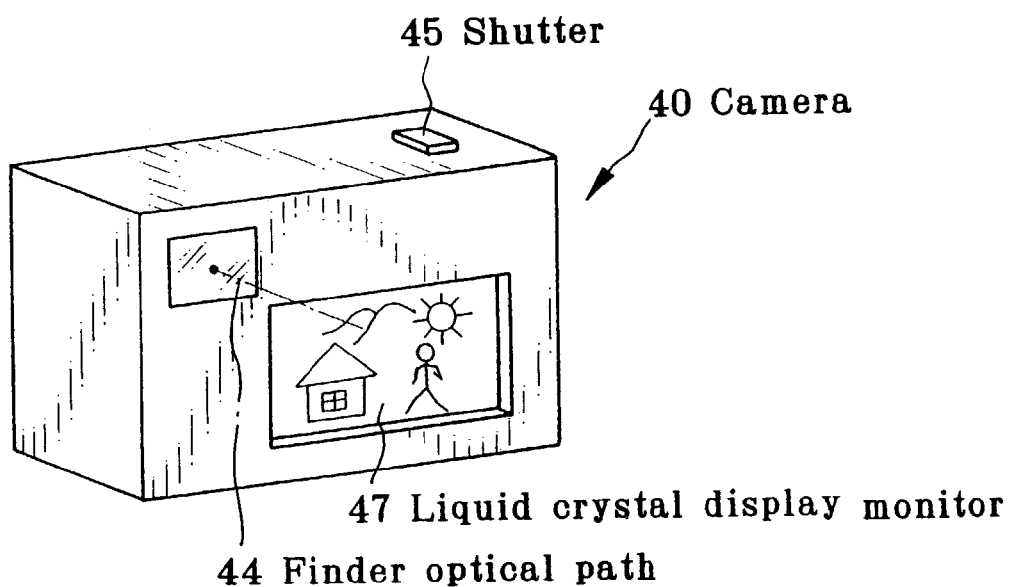
FIG. 29 is a rear perspective schematic of the digital camera of FIG. 28.
Figure 30:
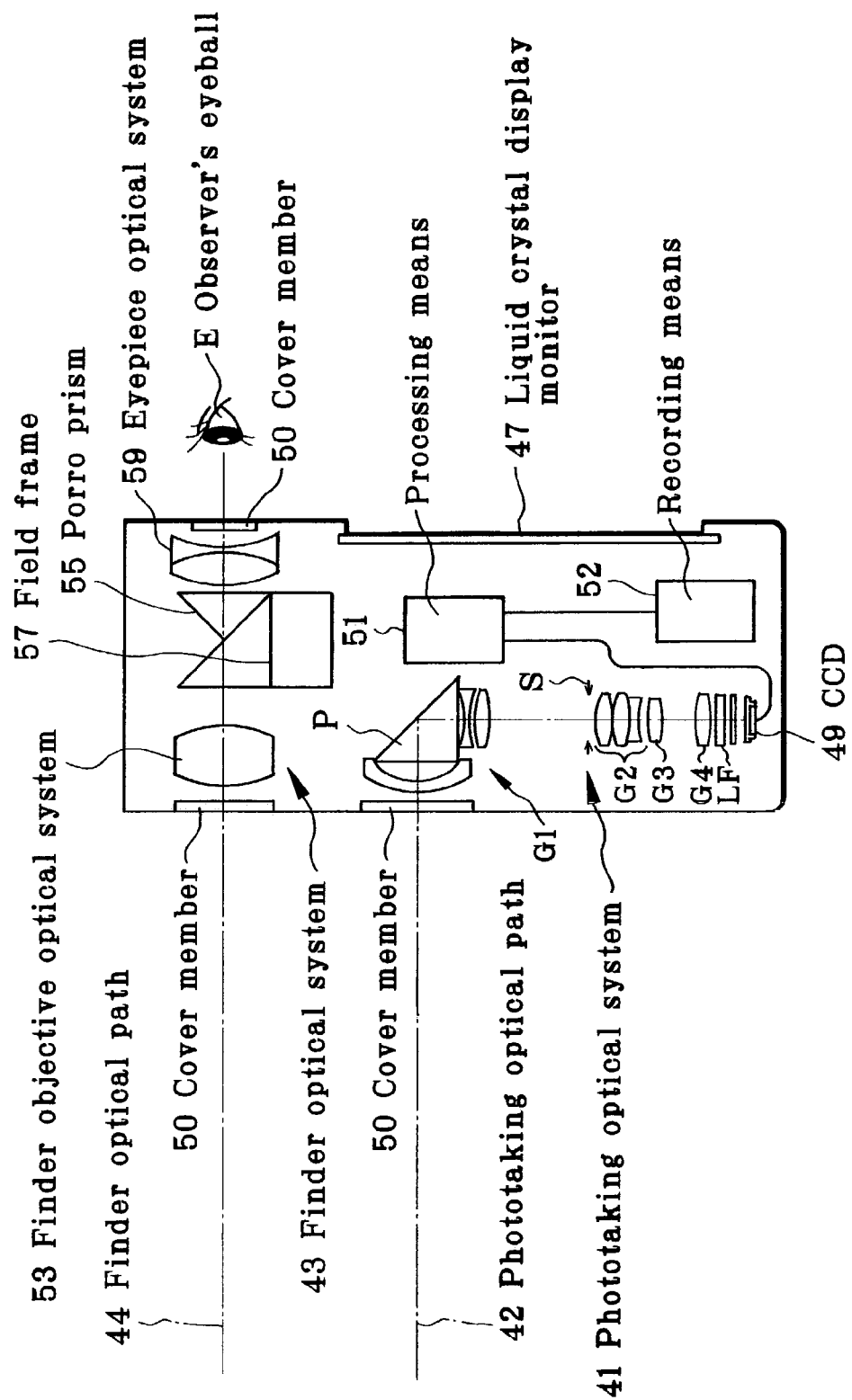
FIG. 30 is a sectional schematic of the digital camera of FIG. 28.

FIGS. 28, 29 and 30 are conceptual illustrations of a phototaking optical system 41 for digital cameras, in which the zoom lens of the present invention is built. FIG. 28 is a front perspective view of the outside shape of a digital camera 40, and FIG. 29 is a rear perspective view of the same. FIG. 30 is a sectional view of the construction of the digital camera 40. In this embodiment, the digital camera 40 comprises a phototaking optical system 41 including a phototaking optical path 42, a finder optical system 43 including a finder optical path 44, a shutter 45, a flash 46, a liquid crystal monitor 47 and so on. As the shutter 45 mounted on the upper portion of the camera 40 is pressed down, phototaking takes place through the phototaking optical system 41, for instance, the zoom lens according to Example 1. An object image formed by the phototaking optical system 41 is formed on the image pickup plane of a CCD 49 via an optical low-pass filter LF comprising a dummy transparent plane plate provided thereon with a near-infrared cut coat and an optical low-pass filter LF. The object image received at CCD 49 is shown as an electronic image on the liquid crystal monitor 47 via processing means 51, which monitor is mounted on the back of the camera. This processing means 51 is connected with recording means 52 in which the phototaken electronic image may be recorded. It is here noted that the recording means 52 may be provided separately from the processing means 51 or, alternatively, it may be constructed in such a way that images are electronically recorded and written therein by means of floppy discs, memory cards, MOs or the like. This camera may also be constructed in the form of a silver halide camera using a silver halide film in place of CCD 49.

Moreover, a finder objective optical system 53 is located on the finder optical path 44. An object image formed by the finder objective optical system 53 is in turn formed on the field frame 57 of a Porro prism 55 that is an image erecting member. In the rear of the Porro prism 55 there is located an eyepiece optical system 59 for guiding an erected image into the eyeball E of an observer. It is here noted that cover members 50 are provided on the entrance sides of the phototaking optical system 41 and finder objective optical system 53 as well as on the exit side of the eyepiece optical system 59.

With the thus constructed digital camera 40, it is possible to achieve high performance and cost reductions, because the phototaking optical system 41 is constructed of a fast zoom lens having a high zoom ratio at the wide-angle end with satisfactory aberrations and a back focus large enough to receive a filter, etc. therein.

In the embodiment of FIG. 30, plane-parallel plates are used as the cover members 50; however, it is acceptable to use powered lenses.

Figure 31:
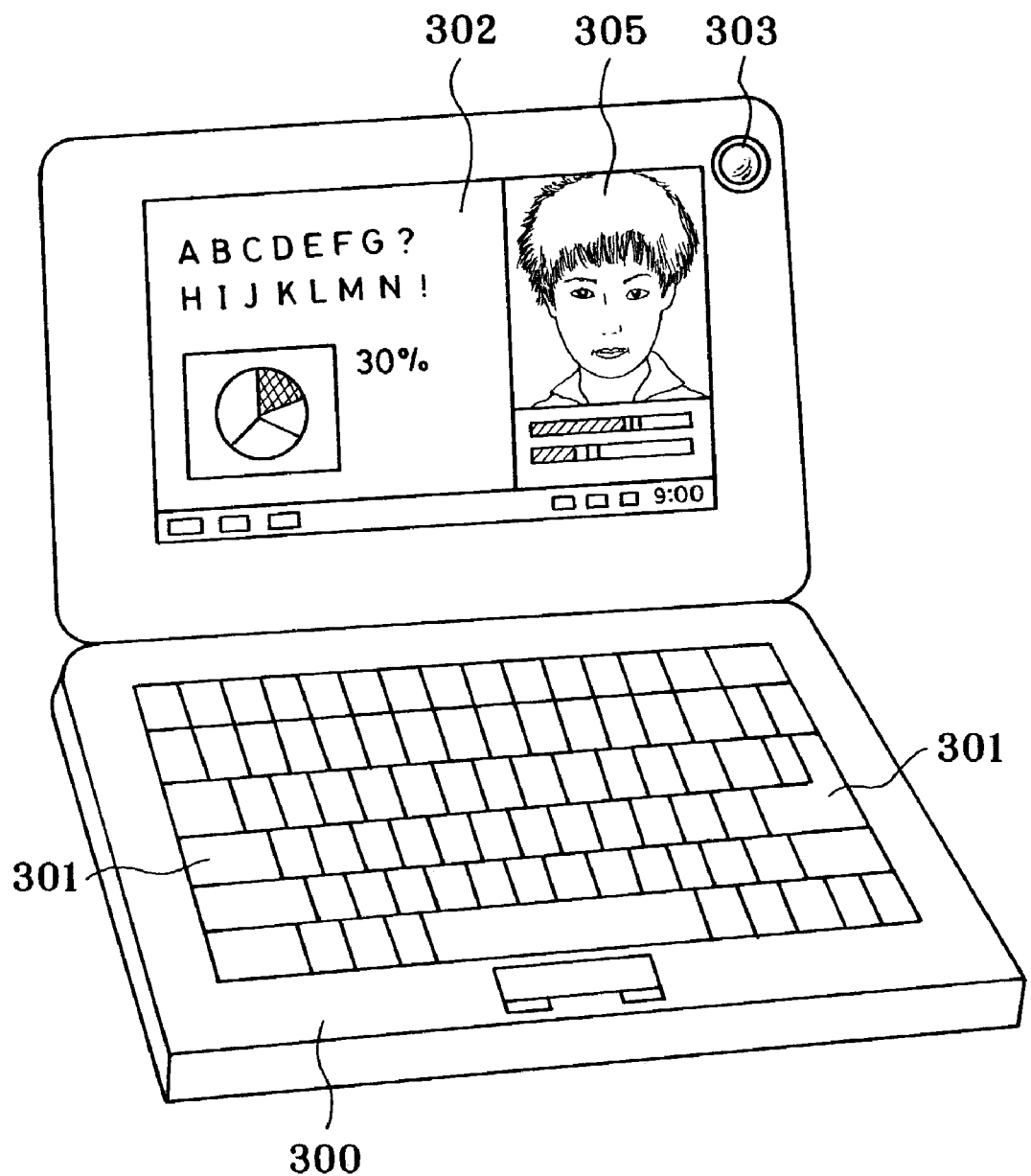
FIG. 31 is a front perspective view of an uncovered personal computer in which the optical path-bending zoom optical system of the present invention is built.
Figure 32:
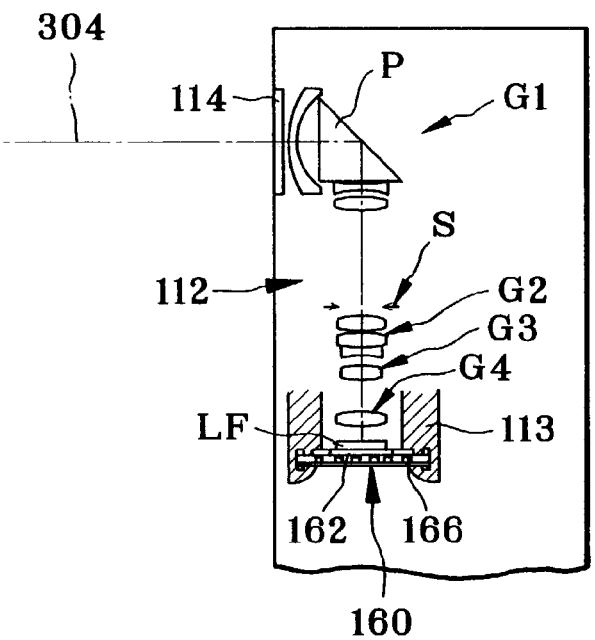
FIG. 32 is a sectional view of a phototaking optical system for a personal computer.
Figure 33:
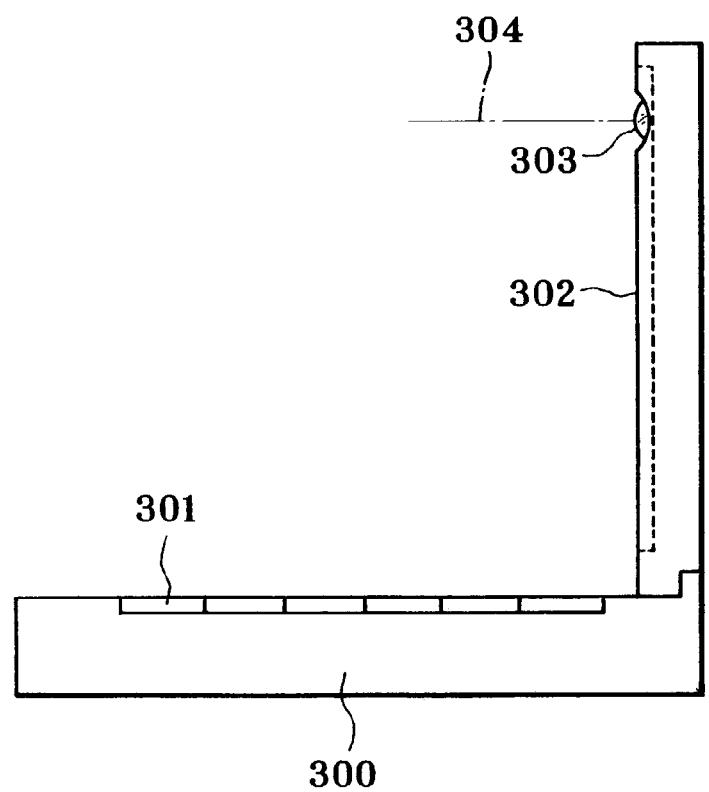
FIG. 33 is a sectional view of the state shown in FIG. 31.

FIGS. 31, 32 and 33 are illustrative of a personal computer that is one example of the information processor in which the image-formation optical system of the present invention is built as an objective optical system. FIG. 31 is a front perspective view of a personal computer 300 that is in an uncovered state, FIG. 32 is a sectional view of a phototaking optical system 303 in the personal computer 300, and FIG. 33 is a side view of the state of FIG. 31. As shown in FIGS. 31, 32 and 33, the personal computer 300 comprises a keyboard 301 via which an operator enters information therein from outside, information processing or recording means (not shown), a monitor 302 on which the information is shown for the operator, and a phototaking optical system 303 for taking an image of the operator and surrounding images. For the monitor 302, use may be made of a transmission type liquid crystal display device illuminated by backlight (not shown) from the back surface, a reflection type liquid crystal display device in which light from the front is reflected to show images, or a CRT display device. While the phototaking optical system 303 is shown as being built in the right upper portion of the monitor 302, it may be located on somewhere around the monitor 302 or keyboard 301.

This phototaking optical system 303 comprises on a phototaking optical path 304 and an objective lens 112 such as one represented by Example 1 of the optical path-bending zoom lens according to the present invention an image pickup device chip 162 for receiving an image.

Here an optical low-pass filter LF is additionally applied onto the image pickup device chip 162 to form an integral imaging unit 160, which can be fitted into the rear end of a lens barrel 113 of the objective lens 112 in one-touch operation. Thus, the assembly of the objective lens 112 and image pickup device chip 162 is facilitated because of no need of alignment or control of surface-to-surface spacing. The lens barrel 113 is provided at its end (not shown) with a cover glass 114 for protection of the objective lens 112. It is here noted that driving mechanisms for the zoom lens, etc. contained in the lens barrel 113 are not shown.

An object image received at the image pickup device chip 162 is entered via a terminal 166 in the processing means of the personal computer 300, and displayed as an electronic image on the monitor 302. As an example, an image 305 taken of the operator is shown in FIG. 31. This image 305 may be displayed on a personal computer on the other end via suitable processing means and the Internet or telephone line.

Figure 34A:
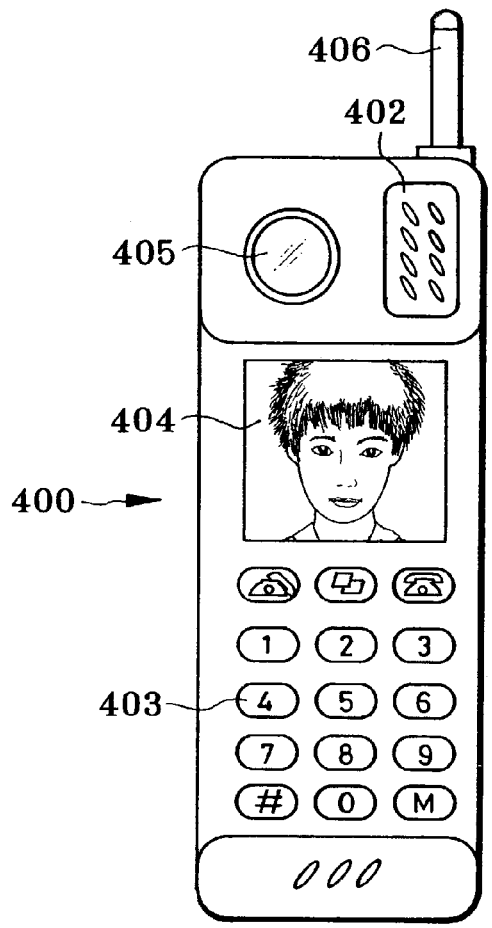
FIGS. 34(a) and 34(b) are a front and a side view of a cellular phone in which the optical path-bending zoom optical system of the present invention is built.
Figure 34B:
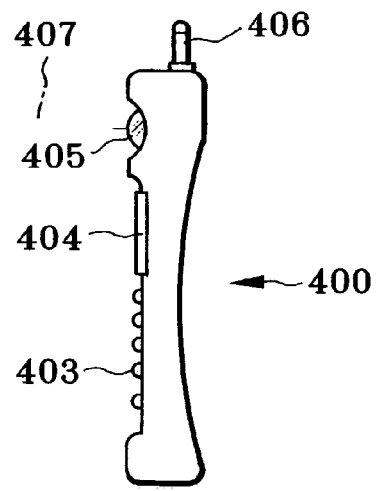
Figure 34C:
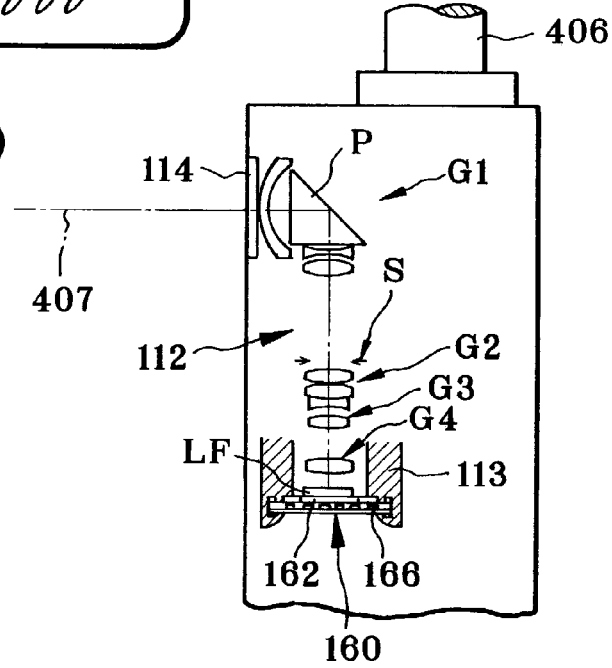
FIG. 34(c) is a sectional view of a phototaking optical system for the same.

FIGS. 34(a), 34(b) and 34(c) are illustrative of a telephone set that is one example of the information processor in which the image-formation optical system of the present invention is built in the form of a photo-taking optical system, especially a convenient-to-carry cellular phone. FIG. 34(a) and FIG. 34(b) are a front and a side view of a cellular phone 400, respectively, and the FIG. 34(c) is a sectional view of a phototaking optical system 405. As shown in FIGS. 34(a), 34(b) and 34(c), the cellular phone 400 comprises a microphone 401 for entering the voice of an operator therein as information, a speaker 402 for producing the voice of the person on the other end, an input dial 403 via which the operator enters information therein, a monitor 404 for displaying an image taken of the operator or the person on the other end and indicating information such as telephone numbers, a photo-taking optical system 405, an antenna 406 for transmitting and receiving communication waves, and processing means (not shown) for processing image information, communication information, input signals, etc. Here the monitor 404 is a liquid crystal display device. It is noted that the components are not necessarily arranged as shown. The phototaking optical system 405 comprises on a phototaking optical path 407 an objective lens 112 such as one represented by Example 1 of the optical path-bending zoom lens according to the present invention and an image pickup device chip 162 for receiving an object image. These are built in the cellular phone 400.

Here an optical low-pass filter LF is additionally applied onto the image pickup device chip 162 to form an integral imaging unit 160, which can be fitted into the rear end of a lens barrel 113 of the objective lens 112 in one-touch operation. Thus, the assembly of the objective lens 112 and image pickup device chip 162 is facilitated because of no need of alignment or control of surface-to-surface spacing. The lens barrel 113 is provided at its end (not shown) with a cover glass 114 for protection of the objective lens 112. It is here noted that driving mechanisms for the zoom lens, etc. contained in the lens barrel 113 are not shown.

An object image received at the image pickup device chip 162 is entered via a terminal 166 in processing means (not shown), so that the object image can be displayed as an electronic image on the monitor 404 and/or a monitor at the other end. The processing means also include a signal processing function for converting information about the object image received at the image pickup device chip 162 into transmittable signals, thereby sending the image to the person at the other end.

As described above, the present invention provides an optical system, especially a zoom lens system wherein the reflecting optical element such as a mirror is located as closely to the object side thereof as possible, so that an optical path can be bent, with various contrivances added thereto. While having high optical performance specifications such as high zoom ratios, wide angles of view, reduced F-numbers and limited aberrations, the zoom lens of the present invention enables a camera to be immediately put into the ready state unlike a collapsible lens mount camera, makes the camera preferable for water- and dust-proofing purposes, and enables the depth dimension of the camera to be reduced as much as possible.

What we claim is:

1. A zoom lens, comprising a moving lens group B that has positive refracting power and moves only toward an object side of the zoom lens upon zooming from a wide-angle end to a telephoto end of the zoom lens, and a lens group A remaining fixed during the zooming, which is located on an object side of the zoom lens with respect to the moving lens group B and has negative refracting power, wherein:

the moving lens group B consists of, in order from an object side thereof, a double-convex positive lens element, a positive lens element and a negative lens element concave on its image side, three lens elements in all.

2. A zoom lens, comprising a moving lens group B that has positive refracting power and moves only toward an object side of the zoom lens upon zooming from a wide-angle end to a telephoto end of the zoom lens, and a lens group A remaining fixed during the zooming, which is located on an object side of the zoom lens with respect to the moving lens group B and has negative refracting power, wherein:

the moving lens group B consists of, in order from an object side thereof, a positive lens element, a positive lens element and a negative lens element concave on its image side, three lens elements in all, and the negative lens element in the moving lens group B is cemented to the positive lens element adjacent to the object side of the zoom lens.

3. The zoom lens according to claim 1 or 2, which further comprises a third lens group C on an image side of the moving lens group B with a variable air separation interposed therebetween.

4. The zoom lens according to claim 3, wherein the third lens group C moves during focusing.

5. The zoom lens according to claim 3, wherein the third lens group C has positive refracting power.

6. The zoom lens according to claim 3, which further comprises a fourth lens group D having an aspheric surface on an image side of the zoom lens with respect to the third lens group C.

7. The zoom lens according to claim 6, wherein the fourth lens group D remains fixed during the zooming or during focusing.

8. The zoom lens according to claim 6, wherein the fourth lens group D remains fixed during the zooming or during focusing.

9. The zoom lens according to claim 3, wherein the third lens group C consists of one single lens element.

10. The zoom lens according to claim 3, wherein the third lens group C moves toward the image object side at the telephoto end rather than at the wide-angle end.

11. The zoom lens according to claim 10, which further satisfies the following condition (27):

$$0.8 < -\beta_{Rt} < 2.1 \quad (27)$$

where $\beta_{Rt}$ is a composite magnification of the moving lens group B and subsequent lens group or groups at the telephoto end upon focused on an infinite object point.

12. The zoom lens according to claim 1 or 2, wherein lens groups that move during the zooming or during focusing are defined by only two lens groups inclusive of the moving lens group B throughout the zoom lens.

13. The zoom lens according to claim 1 or 2, wherein the lens group A that remains fixed during zooming further comprises a reflecting optical element for bending an optical path.

14. The zoom lens according to claim 13, wherein the lens group A that remains fixed during zooming comprises, in order from an object side thereof, an object side-subgroup A1 comprising a negative meniscus lens element convex on an object side thereof, the reflecting optical element, and an image side-subgroup A2 comprising a positive lens element.

15. The zoom lens according to claim 13, wherein the lens group A that remains fixed during zooming comprises an optical path-bending prism A1 having a transmitting surface concave on an object side thereof and a subgroup A2 comprising at least one positive lens element.

16. The zoom lens according to claim 13, wherein the lens group A that remains fixed during zooming comprises, in order from an object side thereof, an object side-subgroup A1, the reflecting optical element, and an image side-subgroup A2.

17. An electronic imaging system, which comprises a zoom lens as recited in claim 16 and an electronic image pickup device located on an image side of the zoom lens, and satisfies the following condition (23):

$$0.8 < d/L < 2.0 \quad (23)$$

where d is a length, as calculated on an air basis, from a refracting surface having refracting power, located just before a reflecting surface of the reflecting optical element in the lens group A that remains fixed during zooming to a refracting surface having refracting power, located just after that reflecting surface, and L is a diagonal length of an effective image pickup area of the electronic image pickup device.

18. The zoom lens according to claim 16, wherein the image side-subgroup A2 in the lens group A that remains fixed during zooming consists of, in order from an object side thereof, a negative lens element and a positive lens element, two lens elements in all.

19. An electronic imaging system, which comprises a zoom lens as recited in claim 16 and an electronic image pickup device located on an image side of the zoom lens, and satisfies the following condition (25):

$$-0.5 < L/f_{12} < 0 \quad (25)$$

where L is a diagonal length of an effective image pickup area of the electronic image pickup device, and $f_{12}$ is a focal length of the image side-subgroup A2 in the lens group A that remains fixed during zooming.

20. The zoom lens according to claim 16, wherein the object side-subgroup A1 in the lens group A that remains fixed during zooming consists of only one negative lens element convex on an object side thereof.

21. The zoom lens according to claim 20, which further satisfies the following condition (26):

$$0 < -f_{11}/f_{12} < 1.6 \quad (26)$$

where $f_{11}$, is a focal length of the object side-subgroup A1 in the lens group A that remains fixed during zooming, and $f_{12}$ is a focal length of the image side-subgroup A2 in that lens group A.

22. The zoom lens according to claim 13, wherein the reflecting optical element is constructed of a prism that satisfies the following condition (24):

$$1.5 < n_{pri} \quad (24)$$

where $n_{pri}$ is a d-line refractive index of a prism medium.

23. The zoom lens according to claim 1 or 2, wherein the lens group A that remains fixed during zooming further comprises a prism for bending an optical path.

24. The zoom lens according to claim 23, wherein at least one of transmitting surfaces of the prism has a curvature.

25. The zoom lens according to claim 23, wherein the prism is located nearest to an object side of the lens group A.

26. The zoom lens according to claim 23, wherein an entrance surface of the prism is concave on an object side thereof.

27. The zoom lens according to claim 23, wherein an entrance surface of the prism is defined by an aspheric surface.

28. The zoom lens according to claim 23, wherein an exit surface of the prism is defined by a planar surface.

29. The zoom lens according to claim 1 or 2, which further satisfies the following conditions (1) and (2):

$$0.9 < -f_A/\sqrt{(f_W \cdot f_T)} < 2.0 \quad (1)$$

$$1.0 < -fB/\sqrt{(f_W \cdot f_T)} < 3.0 \quad (2)$$

where $f_A$ is a focal length of the lens group A, $f_B$ is a focal length of the lens group B, $f_W$ is a focal length of the zoom lens at the wide-angle end, and $f_T$ is a focal length of the zoom lens at the telephoto end.

30. The zoom lens according to claim 29, which further satisfies the following condition (3):

$$0.9 < \log \gamma_B / \log \gamma < 10 \quad (3)$$

where $\gamma = f_T/f_W$, and $\gamma_B$ is a ratio of a magnification of the lens group B at the telephoto end/a magnification of the lens group B at the wide-angle end.

31. The zoom lens according to claim 1 or 2,
wherein the lens group A that remains fixed during zooming is positioned nearest to the object side of the zoom lens.

32. An electronic imaging system, which comprises
a zoom lens as recited in claim 1 or 2, and an electronic image pickup device located on an image side of the zoom lens.

33. The zoom lens according to claim 1 or 2,
wherein a reflecting optical element for bending an optical path is located on the object side of the zoom lens with respect to all lens groups that move during zooming or focusing.

34. A zoom lens, comprising a moving lens group B that has positive refracting power and moves only toward an object side of the zoom lens upon zooming from a wide-angle end to a telephoto end of the zoom lens, and a lens group A remaining fixed during the zooming, which is located on an object side of the zoom lens with respect to the moving lens group B and has negative refracting power, wherein:

the moving lens group B consists of, in order from an object side thereof, a positive lens element, a negative lens element and a positive lens element, three lens elements in all; and the negative lens element in the moving lens group B is cemented to the positive element adjacent to the object side thereof or the positive lens element adjacent to an image side thereof.

35. The zoom lens according to claim 34, which further comprises a third lens group C on an image side of the moving lens group B with a variable air separation interposed therebetween.

36. The zoom lens according to 34, wherein lens groups that move during the zooming or during focusing are defined by only two lens groups inclusive of the moving lens group B throughout the zoom lens.

37. The zoom lens according to claim 34, wherein the lens group A that remains fixed during zooming further comprises a reflecting optical element for bending an optical path.

38. The zoom lens according to claim 34, which further satisfies the following conditions (1) and (2):

$$0.9 < -f_A/\sqrt{(f_W \cdot f_T)} < 2.0 \quad (1)$$

$$1.0 < -f_B/\sqrt{(f_W \cdot f_T)} < 3.0 \quad (2)$$

where $f_A$ is a focal length of the lens group A, $f_B$ is a focal length of the lens group B, $f_W$ is a focal length of the zoom lens at the wide-angle end, and $f_T$ is a focal length of the zoom lens at the telephoto end.

39. The zoom lens according to claim 34,
wherein the lens group A that remains fixed during zooming is positioned nearest to the object side of the zoom lens.

40. An electronic imaging system, which comprises
a zoom lens as recited in claim 34, and an electronic image pickup device located on an image side of the zoom lens.

41. The zoom lens according to claim 34,
wherein a reflecting optical element for bending an optical path is located on the object side of the zoom lens with respect to all lens groups that move during zooming or focusing.

42. A zoom lens, comprising:
a moving lens group B that has positive refracting power and moves only toward an object side of the zoom lens upon zooming from a wide-angle end to a telephoto end of the zoom lens, and a lens group A remaining fixed during the zooming, which is located on an object side of the zoom lens with respect to the moving lens group B and has negative refracting power, wherein:
the moving lens group B consists of, in order from an object side thereof, a positive lens element, a positive lens element and a negative lens element, three lens elements in all; and
a reflecting optical element for bending an optical path is located on the object side of the zoom lens with respect to all lens groups that move during zooming or focusing.

43. A zoom lens, comprising a moving lens group B that has positive refracting power and moves only toward an object side of the zoom lens upon zooming from a wide-angle end to a telephoto end of the zoom lens, and a lens group A remaining fixed during the zooming, which is located on an object side of the zoom lens with respect to the moving lens group B and has negative refracting power, wherein:
the zoom lens further comprises a third lens group C on an image side of the moving lens group B with a variable air separation interposed therebetween,
the moving lens group B consists of a positive lens element and a negative lens element, two lens elements in all, and
the third lens group C consists of, in order from an object side thereof, a positive lens element, a positive lens element and a negative lens element, three lens elements in all.

44. The zoom lens according to claim 43, wherein the negative lens element in the third lens group C is cemented to the positive lens element adjacent to the object side thereof.

45. The zoom lens according to claim 43, wherein the third lens group C moves during focusing.

46. The zoom lens according to claim 43,
wherein the third lens group C has positive refracting power.

47. The zoom lens according to claim 43, which further comprises a fourth lens group D having an aspheric surface on an image side of the zoom lens with respect to the third lens group C.

48. The zoom lens according to claim 47, wherein the fourth lens group D remains fixed during the zooming or during focusing.

49. The zoom lens according to 43, wherein lens groups that move during the zooming or during focusing are defined by only two lens groups inclusive of the moving lens group B throughout the zoom lens.

50. The zoom lens according to claim 43, wherein the lens group A that remains fixed during zooming further comprises a reflecting optical element for bending an optical path.

51. The zoom lens according to claim 43, which further satisfies the following conditions (1) and (2):

$$0.9 < -f_A/\sqrt{(f_W \cdot f_T)} < 2.0 \quad (1)$$

$$1.0 < -f_B/\sqrt{(f_W \cdot f_T)} < 3.0 \quad (2)$$

where $f_A$ is a focal length of the lens group A, $f_B$ is a focal length of the lens group B, $f_W$ is a focal length of the zoom lens at the wide-angle end, and $f_T$ is a focal length of the zoom lens at the telephoto end.

52. The zoom lens according to claim 43,
wherein the lens group A that remains fixed during zooming is positioned nearest to the object side of the zoom lens.

53. An electronic imaging system, which comprises
a zoom lens as recited in claim 43, and an electronic image pickup device located on an image side of the zoom lens.

54. The zoom lens according to claim 43,
wherein a reflecting optical element for bending an optical path is located on the object side of the zoom lens with respect to all lens groups that move during zooming or focusing.

55. A zoom lens, comprising a moving lens group B that has positive refracting power and moves only toward an object side of the zoom lens upon zooming from a wide-angle end to a telephoto end of the zoom lens, and a lens group A remaining fixed during the zooming, which is located on an object side of the zoom lens with respect to the moving lens group B and has negative refracting power, wherein:
the zoom lens further comprises a third lens group C on an image side of the moving lens group B with a variable air separation interposed therebetween,
the moving lens group B consists of a positive lens element and a negative lens element, two lens elements in all, and
the third lens group C consists of, in order from an object side thereof, a positive lens element, a negative lens element and a positive lens element, three lens elements in all.

56. The zoom lens according to claim 55, wherein the negative lens element in the moving lens group B is cemented to the positive element adjacent to the object side thereof or the positive lens element adjacent to an image side thereof.

57. The zoom lens according to claim 55, wherein lens groups that move during the zooming or during focusing are defined by only two lens groups inclusive of the moving lens group B throughout the zoom lens.

58. The zoom lens according to claim 55, wherein the third lens group C moves during focusing.

59. The zoom lens according to claim 55, wherein the third lens group C has positive refracting power.

60. The zoom lens according to claim 55, which further comprises a fourth lens group D having an aspheric surface on an image side of the zoom lens with respect to the third lens group C.

61. The zoom lens according to claim 55, wherein the lens group A that remains fixed during zooming further comprises a reflecting optical element for bending an optical path.

62. The zoom lens according to claim 55 which further satisfies the following conditions (1) and (2):

$$0.9 < -f_A/\sqrt{(f_W \cdot f_T)} < 2.0 \quad (1)$$

$$1.0 < -f_B/\sqrt{(f_W \cdot f_T)} < 3.0 \quad (2)$$

where $f_A$ is a focal length of the lens group A, $f_B$ is a focal length of the lens group B, $f_W$ is a focal length of the zoom lens at the wide-angle end, and $f_T$ is a focal length of the zoom lens at the telephoto end.

63. The zoom lens according to claim 55, wherein the lens group A that remains fixed during zooming is positioned nearest to the object side of the zoom lens.

64. An electronic imaging system, which comprises a zoom lens as recited in claim 55, and an electronic image pickup device located on an image side of the zoom lens.

65. The zoom lens according to claim 55, wherein a reflecting optical element for bending an optical path is located on the object side of the zoom lens with respect to all lens groups that move during zooming or focusing.

66. A zoom lens, comprising in order from an object side thereof,
a first lens group that has negative refracting power, includes a reflecting optical element for bending an optical path, and remains fixed during zooming,
a second lens group that has positive refracting power and moves only toward the object side of the zoom lens upon zooming from a wideangle end to a telephoto end of the zoom lens,
a third lens group that moves in a locus different from that of the second lens group upon the zooming, and a fourth lens group having an aspheric surface, wherein:
two lens groups defined by the second lens group and the third lens group comprise a total of up to three lens components including at least one double component, and
the following condition (41) is satisfied:

$$1.0 < -\beta_{Rt} < 2.6 \quad (41)$$

where $\beta_{Rt}$ is a composite magnification of the second lens group and subsequent lens group or groups at the telephoto end upon focused on an infinite object point.

67. An electronic imaging system, comprising:
a zoom lens as recited in claim 66, wherein the first lens group comprises, in order from an object side thereof, a front subgroup comprising a negative lens element convex on an object side thereof, the reflecting optical element for bending an optical path and a rear subgroups having negative refracting power and the following conditions (47) and (48) are satisfied, $$0.5 < (F_{11F} + R_{11R})/(R_{11F} - R_{11R}) < 5.0 \quad (47)$$

$$0 < -f_{11}/f_{12} < 1.2 \quad (48)$$

where $R_{11F}$ is an axial radius of curvature of an object side-surface of the negative lens element in the front subgroup in the first lens group, $R_{11R}$ is an axial radius of curvature of an image side-surface of the negative lens element in the front subgroup in the first lens group, $f_{11}$ is a focal length of the front subgroup in the first lens group, and $f_{12}$ is a focal length of the rear subgroup in the first lens group, and
an electronic image pickup device located on an image side of the zoom lens.

68. An electronic imaging system, comprising:
a zoom lens as recited in claim 67, wherein the front subgroup comprises a negative lens element having one aspheric surface, the rear subgroup comprises two lens components whose refracting powers have opposite signs, and the following conditions (49) is satisfied, $$0.4 < (R_{12R}/R_{13F})^P < 1.6 \quad (49)$$

where $R_{12R}$ is an axial radius of curvature of an object side-surface of an air lens defined between the two lens components in the rear subgroup in the first lens group, $R_{13F}$ is an axial radius of curvature of an image side-surface of the air lens defined between the two lens components in the rear subgroup in the first lens group, and P is P=−1 where the negative lens component and the positive lens component are located in this order as viewed from an object side of the rear subgroup, and P=−1 where the positive lens component and the negative lens component are located in this order as viewed from the object side of the rear subgroup, and
an electronic image pickup device located on an image side of the zoom lens.

69. The zoom lens according to claim 66, wherein the first lens group consists of a prism A1 having a transmitting surface concave on an object side thereof for bending an optical path and a subgroup A2 including at least one positive lens element.

70. A zoom lens, comprising in order from an object side thereof,
a first lens group that has negative refracting power, includes a reflecting optical element for bending an optical path, and remains fixed during zooming,
a second lens group that has positive refracting power and moves only toward the object side of the zoom lens upon zooming from a wide-angle end to a telephoto end of the zoom lens,
a third lens group that moves in a locus different from that of the second lens group upon the zooming, and
a fourth lens group having an aspheric surface, wherein:
the first lens group comprises, in order from an object side thereof, a front subgroup comprising a negative lens element,
the reflecting optical element for bending an optical path, and a rear subgroup having negative refracting power, and
the following conditions (47) and (48) are satisfied:

$$0.5 < (F_{11F} + R_{11R})/(R_{11F} - R_{11R}) < 5.0 \quad (47)$$

$$0 < -f_{11}/f_{12} < 1.2 \quad (48)$$

where $R_{11F}$ is an axial radius of curvature of an object side-surface of the negative lens element in the front subgroup in the first lens group, $R_{11R}$ is an axial radius of curvature of an image side-surface of the negative lens element in the front subgroup in the first lens group, $f_{11}$ is a focal length of the front subgroup in the first lens group, and $f_{12}$ is a focal length of the rear subgroup in the first lens group.

71. An electronic imaging system, comprising:
a zoom lens as recited in claim 70, wherein the front subgroup comprises a negative lens element having one aspheric surface, the rear subgroup comprises two lens components whose refracting powers have opposite signs, and the following conditions (49) is satisfied, $$0.4 < (R_{12R}/R_{13F})^P < 1.6 \quad (49)$$

where $R_{12R}$ is an axial radius of curvature of an object side-surface of an air lens defined between the two lens components in the rear subgroup in the first lens group,
$R_{13F}$ is an axial radius of curvature of an image side-surface of the air lens defined between the two lens components in the rear subgroup in the first lens group, and P is P=−1 where the negative lens component and the positive lens component are located in this order as viewed from an object side of the rear subgroup, and P=−1 where the positive lens component and the negative lens component are located in this order as viewed from the object side of the rear subgroup, and
an electronic image pickup device located on an image side of the zoom lens.

72. A zoom lens, comprising a moving lens group B that has positive refracting power and moves only toward an object side of the zoom lens upon zooming from a wide-angle end to a telephoto end of the zoom lens, and a lens group A remaining fixed during the zooming, which is located on an object side of the zoom lens with respect to the moving lens group B and has negative refracting power, wherein:
the moving lens group B consists of, in order from an object side thereof, a positive lens element, a positive lens element and a negative lens element, three lens elements in all;
the zoom lens further comprises a third lens group C on an image side of the moving lens group B with a variable air separation interposed therebetween; and
the zoom lens further comprises a fourth lens group D having an aspheric surface on an image side of the zoom lens with respect to the third lens group C.

73. The zoom lens according to claim 72, wherein the fourth lens group D remains fixed during the zooming or during focusing.

74. A zoom lens, comprising a moving lens group B that has positive refracting power and moves only toward an object side of the zoom lens upon zooming from a wide-angle end to a telephoto end of the zoom lens, and a lens group A remaining fixed during the zooming, which is located on an object side of the zoom lens with respect to the moving lens group B and has negative refracting power, wherein:
the moving lens group B consists of, in order from an object side thereof, positive lens element, a positive lens element and a negative lens element, three lens elements in all; and
the lens group A that remains fixed during zooming further comprises a reflecting optical element for bending an optical path.

75. The zoom lens according to claim 74, wherein the lens group A that remains fixed during zooming comprises, in order from an object side thereof, an object side-subgroup A1 comprising a negative meniscus lens element convex on an object side thereof, the reflecting optical element, and an image side-subgroup A2 comprising a positive lens element.

76. The zoom lens according to claim 74, wherein the lens group A that remains fixed during zooming comprises an optical path-bending prism A1 having a transmitting surface concave on an object side thereof and a subgroup A2 comprising at least one positive lens element.

77. The zoom lens according to claim 74, wherein the lens group A that remains fixed during zooming comprises, in order from an object side thereof, an object side-subgroup A1, the reflecting optical element, and an image side-subgroup A2.

78. The zoom lens according to claim 77, wherein the image side-subgroup A2 in the lens group A that remains fixed during zooming consists of, in order from an object side thereof, a negative lens element and a positive lens element, two lens elements in all.

79. The zoom lens according to claim 77, wherein the object side-subgroup A1 in the lens group A that remains fixed during zooming consists of only one negative lens element convex on an object side thereof.

80. The zoom lens according to claim 74, wherein the reflecting optical element is constructed of a prism that satisfies the following condition (24):

$$1.5 < n_{pri} \quad (24)$$

where $n_{pri}$ is a d-line refractive index of a prism medium.

81. A zoom lens, comprising a moving lens group B that has positive refracting power and moves only toward an object side of the zoom lens upon zooming from a wide-angle end to a telephoto end of the zoom lens, and a lens group A remaining fixed during the zooming, which is located on an object side of the zoom lens with respect to the moving lens group B and has negative refracting power, wherein:
the moving lens group B consists of, in order from an object side thereof, positive lens element, a positive lens element and a negative lens element, three lens elements in all; and
the lens group A that remains fixed during zooming further comprises a prism for bending an optical path.

82. The zoom lens according to claim 81, wherein at least one of transmitting surfaces of the prism has a curvature.

83. The zoom lens according to claim 81, wherein the prism is located nearest to an object side of the lens group A.

84. The zoom lens according to claim 81, wherein an entrance surface of the prism is concave on an object side thereof.

85. The zoom lens according to claim 81, wherein an entrance surface of the prism is defined by an aspheric surface.

86. The zoom lens according to claim 81, wherein an exit surface of the prism is defined by a planar surface.

87. A zoom lens, comprising a moving lens group B that has positive refracting power and moves only toward an object side of the zoom lens upon zooming from a wide-angle end to a telephoto end of the zoom lens, and a lens group A remaining fixed during the zooming, which is located on an object side of the zoom lens with respect to the moving lens group B and has negative refracting power, wherein:
the moving lens group B consists of, in order from an object side thereof, a positive lens element, a positive lens element and a negative lens element, three lens elements in all; and the zoom lens further satisfies the following conditions (1) and (2):

$$0.9 < -f_A/\sqrt{(f_W \cdot f_T)} < 2.0 \quad (1)$$

$$1.0 < -f_B/\sqrt{(f_W \cdot f_T)} < 3.0 \quad (2)$$

where $f_A$ is a focal length of the lens group A, $f_B$ is a focal length of the lens group B, $f_W$ is a focal length of the zoom lens at the wide-angle end, and $f_T$ is a focal length of the zoom lens at the telephoto end.

88. The zoom lens according to claim 87, which further satisfies the following condition (3):

$$0.9 < \log \gamma_B / \log \gamma < 10 \quad (3)$$

where $\gamma = f_T/f_W$, and $\gamma_B$ is a ratio of a magnification of the lens group B at the telephoto end/a magnification of the lens group B at the wide-angle end.

89. A zoom lens, comprising a moving lens group B that has positive refracting power and moves only toward an object side of the zoom lens upon zooming from a wide-angle end to a telephoto end of the zoom lens, and a lens group A remaining fixed during the zooming, which is located on an object side of the zoom lens with respect to the moving lens group B and has negative refracting power, wherein:
the moving lens group B consists of, in order from an object side thereof, a double-convex positive lens element, a positive lens element and a negative lens element concave on its image side, three lens elements in all; and
the lens group A that remains fixed during zooming is positioned nearest to the object side of the zoom lens.

90. A zoom lens, comprising a moving lens group B that has positive refracting power and moves only toward an object side of the zoom lens upon zooming from a wide-angle end to a telephoto end of the zoom lens, and a lens group A remaining fixed during the zooming, which is located on an object side of the zoom lens with respect to the moving lens group B and has negative refracting power, wherein:
the moving lens group B consists of, in order from an object side thereof, a positive lens element, a positive lens element and a negative lens element, three lens elements in all;
the zoom lens further comprises a third lens group C on an image side of the moving lens group B with a variable air separation interposed therebetween; and
the third lens group C consists of one single lens element.

91. A zoom lens, comprising a moving lens group B that has positive refracting power and moves only toward an object side of the zoom lens upon zooming from a wide-angle end to a telephoto end of the zoom lens, and a lens group A remaining fixed during the zooming, which is located on an object side of the zoom lens with respect to the moving lens group B and has negative refracting power, wherein:
the moving lens group B consists of, in order from an object side thereof, a positive lens element, a positive lens element and a negative lens element, three lens elements in all;
the zoom lens further comprises a third lens group C on an image side of the moving lens group B, the third lens group C being adjacent to the moving lens group B with a variable air separation interposed therebetween; and
the third lens group C has positive refracting power and moves toward the object side at the telephoto end rather than at the wide-angle end.

92. An electronic imaging system comprising:
a. a zoom lens, comprising a moving lens group B that has positive refracting power and moves only toward an object side of the zoom lens upon zooming from a wide-angle end to a telephoto end of the zoom lens, and a lens group A remaining fixed during the zooming, which is located on an object side of the zoom lens with respect to the moving lens group B and has negative refracting power, wherein the moving lens group B consists of, in order from an object side thereof, positive lens element, a positive lens element and a negative lens element, three lens elements in all; and
b. an electronic image pickup device located on an image side of the zoom lens.

93. A zoom lens, comprising a moving lens group B that has positive refracting power and moves only toward an object side of the zoom lens upon zooming from a wide-angle end to a telephoto end of the zoom lens, and a lens group A remaining fixed during the zooming, which is located on an object side of the zoom lens with respect to the moving lens group B and has negative refracting power, wherein:
the moving lens group B consists of, in order from an object side thereof, a double-convex positive lens element, a positive lens element and a negative lens element, three lens elements in all; and
lens groups that move during the zooming or during focusing are defined by only two lens groups, both having positive refracting power, inclusive of the moving lens group B throughout the zoom lens.

94. A zoom lens, comprising a moving lens group B that has positive refracting power and moves only toward an object side of the zoom lens upon zooming from a wide-angle end to a telephoto end of the zoom lens, a lens group A remaining fixed during the zooming, which is located on an object side of the zoom lens with respect to the moving lens group B and has negative refracting power, and a third lens group C on an image side of the moving lens group B with a variable air separation interposed therebetween, wherein:
the moving lens group B consists of, in order from an object side thereof, a double-convex positive lens element, a positive lens element and a negative lens element, three lens elements in all; and
the third lens group C moves during focusing.

95. A zoom lens, comprising a moving lens group B that has positive refracting power and moves only toward an object side of the zoom lens upon zooming from a wide-angle end to a telephoto end of the zoom lens, a lens group A remaining fixed during the zooming, which is located on an object side of the zoom lens with respect to the moving lens group B and has negative refracting power, and a third lens group C on an image side of the moving lens group B, the third lens group C being adjacent to the moving lens group B with a variable air separation interposed therebetween, wherein:
the moving lens group B consists of, in order from an object side thereof, a double-convex positive lens element, a positive lens element and a negative lens element, three lens elements in all; and
the third lens group C has positive refracting power.

96. A zoom lens, comprising a moving lens group B that has positive refracting power and moves only toward an object side of the zoom lens upon zooming from a wide-angle end to a telephoto end of the zoom lens, a lens group A remaining fixed during the zooming, which is located on an object side of the zoom lens with respect to the moving lens group B and has negative refracting power, a third lens group C on an image side of the moving lens group B with a variable air separation interposed therebetween and a fourth lens group D having an aspheric surface on an image side of the zoom lens with respect to the third lens group C., wherein:

the moving lens group B consists of, in order from an object side thereof, a double-convex positive lens element, a positive lens element and a negative lens element, three lens elements in all.

97. A zoom lens, comprising a moving lens group B that has positive refracting power and moves only toward an object side of the zoom lens upon zooming from a wide-angle end to a telephoto end of the zoom lens, and a lens group A remaining fixed during the zooming, which is located on an object side of the zoom lens with respect to the moving lens group B and has negative refracting power, wherein:

the moving lens group B consists of, in order from an object side thereof, a double-convex positive lens element, a positive lens element and a negative lens element, three lens elements in all; and the lens group A that remains fixed during zooming further comprises a reflecting optical element for bending an optical path.

98. The zoom lens according to claim 97, wherein the lens group A that remains fixed during zooming comprises, in order from an object side thereof, an object side-subgroup A1 comprising a negative meniscus lens element convex on an object side thereof, the reflecting optical element, and an image side-subgroup A2 comprising a positive lens element.

99. The zoom lens according to claim 97, wherein the lens group A that remains fixed during zooming comprises an optical path-bending prism A1 having a transmitting surface concave on an object side thereof and a subgroup A2 comprising at least one positive lens element.

100. The zoom lens according to claim 97, wherein the lens group A that remains fixed during zooming comprises, in order from an object side thereof, an object side-subgroup A1, the reflecting optical element, and an image side-subgroup A2.

101. An electronic imaging system, which comprises a zoom lens as recited in claim 100 and an electronic image pickup device located on an image side of the zoom lens, and satisfies the following condition (23):

$$0.8 < d/L < 2.0 \quad (23)$$

where d is a length, as calculated on an air basis, from a refracting surface having refracting power, located just before a reflecting surface of the reflecting optical element in the lens group A that remains fixed during zooming to a refracting surface having refracting power, located just after that reflecting surface, and L is a diagonal length of an effective image pickup area of the electronic image pickup device.

102. The zoom lens according to claim 100, wherein the image side-subgroup A2 in the lens group A that remains fixed during zooming consists of, in order from an object side thereof, a negative lens element and a positive lens element, two lens elements in all.

103. An electronic imaging system, which comprises a zoom lens as recited in claim 100 and an electronic image pickup device located on an image side of the zoom lens, and satisfies the following condition (25):

$$-0.5 < L/f_{12} < 0 \quad (25)$$

where L is a diagonal length of an effective image pickup area of the electronic image pickup device, and $f_{12}$ is a focal length of the image side-subgroup A2 in the lens group A that remains fixed during zooming.

104. The zoom lens according to claim 100, wherein the object side-subgroup A1 in the lens group A that remains fixed during zooming consists of only one negative lens element convex on an object side thereof.

105. The zoom lens according to claim 104, which further satisfies the following condition (26):

$$0 < -f_{11}/f_{12} < 1.6 \quad (26)$$

where $f_{11}$, is a focal length of the object side-subgroup A1 in the lens group A that remains fixed during zooming, and $f_{12}$ is a focal length of the image side-subgroup A2 in that lens group A.

106. The zoom lens according to claim 97, wherein the reflecting optical element is constructed of a prism that satisfies the following condition (24):

$$1.5 < n_{pri} \quad (24)$$

where $n_{pri}$ is a d-line refractive index of a prism medium.

107. A zoom lens, comprising a moving lens group B that has positive refracting power and moves only toward an object side of the zoom lens upon zooming from a wide-angle end to a telephoto end of the zoom lens, and a lens group A remaining fixed during the zooming, which is located on an object side of the zoom lens with respect to the moving lens group B and has negative refracting power, wherein:

the moving lens group B consists of, in order from an object side thereof, a double-convex positive lens element, a positive lens element and a negative lens element, three lens elements in all; and the lens group A that remains fixed during zooming further comprises a prism for bending an optical path.

108. The zoom lens according to claim 107, wherein at least one of transmitting surfaces of the prism has a curvature.

109. The zoom lens according to claim 107, wherein the prism is located nearest to an object side of the lens group A.

110. The zoom lens according to claim 107, wherein an entrance surface of the prism is concave on an object side thereof.

111. The zoom lens according to claim 107, wherein an entrance surface of the prism is defined by an aspheric surface.

112. The zoom lens according to claim 107, wherein an exit surface of the prism is defined by a planar surface.

113. A zoom lens, comprising a moving lens group B that has positive refracting power and moves only toward an object side of the zoom lens upon zooming from a wide-angle end to a telephoto end of the zoom lens, a lens group A remaining fixed during the zooming, which is located on an object side of the zoom lens with respect to the moving lens group B and has negative refracting power, and a third lens group C on an image side of the moving lens group B with a variable air separation interposed therebetween, wherein:

the moving lens group B consists of, in order from an object side thereof, a double-convex positive lens element, a positive lens element and a negative lens element, three lens elements in all; and the third lens group C consists of one single lens element.

114. A zoom lens, comprising a moving lens group B that has positive refracting power and moves only toward an object side of the zoom lens upon zooming from a wide-angle end to a telephoto end of the zoom lens, a lens group A remaining fixed during the zooming, which is located on an object side of the zoom lens with respect to the moving lens group B and has negative refracting power, and a third lens group C on an image side of the moving lens group B, the third lens group C being adjacent to the moving lens group B with a variable air separation interposed therebetween, wherein:

the moving lens group B consists of, in order from an object side thereof, a double-convex positive lens element, a positive lens element and a negative lens element, three lens elements in all; and the third lens group C has positive refracting power and moves toward the object side at the telephoto end rather than at the wide-angle end.

115. The zoom lens according to claim 114, which further satisfies the following condition (27):

$$0.8 < -\beta_{Rt} < 2.1 \tag{27}$$

where $\beta_{Rt}$ is a composite magnification of the moving lens group B and subsequent lens group or groups at the telephoto end upon focused on an infinite object point.

116. A zoom lens, comprising a moving lens group B that has positive refracting power and moves only toward an object side of the zoom lens upon zooming from a wide-angle end to a telephoto end of the zoom lens, and a lens group A remaining fixed during the zooming, which is located on an object side of the zoom lens with respect to the moving lens group B and has negative refracting power, wherein:

the moving lens group B consists of, in order from an object side thereof, a double-convex positive lens element, a positive lens element and a negative lens element, three lens elements in all; and a reflecting optical element for bending an optical path is located on the object side of the zoom lens with respect to all lens groups that move during zooming or focusing.

117. A zoom lens, comprising a moving lens group B that has positive refracting power and moves only toward an object side of the zoom lens upon zooming from a wide-angle end to a telephoto end of the zoom lens, and a lens group A remaining fixed during the zooming, which is located on an object side of the zoom lens with respect to the moving lens group B and has negative refracting power, wherein:

the moving lens group B consists of, in order from an object side thereof, a positive lens element, a negative lens element and a positive lens element, three lens elements in all; and the lens group A that remains fixed during zooming further comprises a reflecting optical element for bending an optical path.

118. A zoom lens, comprising a moving lens group B that has positive refracting power and moves only toward an object side of the zoom lens upon zooming from a wide-angle end to a telephoto end of the zoom lens, and a lens group A remaining fixed during the zooming, which is located on an object side of the zoom lens with respect to the moving lens group B and has negative refracting power, wherein:

the moving lens group B consists of, in order from an object side thereof, a positive lens element, a negative lens element and a positive lens element, three lens elements in all; and said zoom lens further satisfies the following conditions (1) and (2):

$$0.9 < -f_A/\sqrt{(f_W \cdot f_T)} < 2.0 \tag{1}$$

$$1.0 < -f_B/\sqrt{(f_W \cdot f_T)} < 3.0 \tag{2}$$

where $f_A$ is a focal length of the lens group A, $f_B$ is a focal length of the lens group B, $f_W$ is a focal length of the zoom lens at the wide-angle end, and $f_T$ is a focal length of the zoom lens at the telephoto end.

119. A zoom lens, comprising a moving lens group B that has positive refracting power and moves only toward an object side of the zoom lens upon zooming from a wide-angle end to a telephoto end of the zoom lens, and a lens group A remaining fixed during the zooming, which is located on an object side of the zoom lens with respect to the moving lens group B and has negative refracting power, wherein:

the moving lens group B consists of, in order from an object side thereof, a positive lens element, a negative lens element and a positive lens element, three lens elements in all; and a reflecting optical element for bending an optical path is located on the object side of the zoom lens with respect to all lens groups that move during zooming or focusing.

120. A zoom lens, comprising a moving lens group B that has positive refracting power and moves only toward an object side of the zoom lens upon zooming from a wide-angle end to a telephoto end of the zoom lens, and a lens group A remaining fixed during the zooming, which is located on an object side of the zoom lens with respect to the moving lens group B and has negative refracting power, wherein:

the moving lens group B consists of, in order from an object side thereof, a double-convex positive lens element, a positive lens element and a negative lens element, three lens elements in all: and zoom lens further satisfies the following conditions (1) and (2):

$$0.9 < -f_A/\sqrt{(f_W \cdot f_T)} < 2.0 \tag{1}$$

$$1.0 < -f_B/\sqrt{(f_W \cdot f_T)} < 3.0 \tag{2}$$

where $f_A$ is a focal length of the lens group A, $f_B$ is a focal length of the lens group B, $f_W$ is a focal length of the zoom lens at the wide-angle end, and $f_T$ is a focal length of the zoom lens at the telephoto end.

121. The zoom lens according to claim 120, which further satisfies the following condition (3):

$$0.9 < \log \gamma_B/\log \gamma < 10 \tag{3}$$

where $\gamma = f_T/f_W$, and $\gamma_B$ is a ratio of a magnification of the lens group B at the telephoto end/a magnification of the lens group B at the wide-angle end.

122. A zoom lens, comprising a moving lens group B that has positive refracting power and moves only toward an object side of the zoom lens upon zooming from a wide-angle end to a telephoto end of the zoom lens, a lens group A remaining fixed during the zooming, which is located on an object side of the zoom lens with respect to the moving lens group B and has negative refracting power, and a third lens group C on an image side of the moving lens group B with a variable air separation interposed therebetween, wherein:

the moving lens group B consists of, in order from an object side thereof, a double-convex positive lens element, a positive lens element and a negative lens element, three lens elements in all;

the third lens group C moves toward the object side at the telephoto end rather than at the wide-angle end; and the zoom lens satisfying the following condition (27):

$$0.8 < -\beta_{Rt} < 2.1 \tag{27}$$

where $\beta_{Rt}$ is a composite magnification of the moving lens group B and subsequent lens group or groups at the telephoto end upon focused on an infinite object point.

123. The zoom lens according to any one of claims 91, 95 or 114, further satisfy the following condition:

$$0.0 < M_3/M_2 < 1.6 \tag{21}$$

where $M_2$ and $M_3$ are amounts of movement of the moving lens group B and the third lens group C, respectively, at the telephoto end with respect to the wide-angle end upon focused on an infinite object point, provided that movement of each group toward the image side is positive.

* * * * *

UNITED STATES PATENT AND TRADEMARK OFFICE
CERTIFICATE OF CORRECTION

PATENT NO. : 7,177,094 B2
APPLICATION NO. : 10/406497
DATED : February 13, 2007
INVENTOR(S) : Shinichi Mihara et al.

It is certified that error appears in the above-identified patent and that said Letters Patent is hereby corrected as shown below:

Column 70, line 45, change "toward the image object side" to --toward the object side-- and Column 75, line 42, change "wideangle end" to --wide-angle end--.

Signed and Sealed this

Twenty-first Day of August, 2007

JON W. DUDAS
*Director of the United States Patent and Trademark Office*